United States Patent
Bauer et al.

(10) Patent No.: US 6,297,610 B1
(45) Date of Patent: Oct. 2, 2001

(54) CONTROL SYSTEM FOR CONTROLLING PLURAL ELECTRICAL DEVICES

(75) Inventors: Michael John Bauer; Edward John Fregon, both of Victoria (AU)

(73) Assignee: Bytecraft Research Pty, Ltd., Mordialloc (AU)

( * ) Notice: Subject to any disclaimer, the term of this patent is extended or adjusted under 35 U.S.C. 154(b) by 0 days.

(21) Appl. No.: 08/983,386

(22) PCT Filed: Jul. 18, 1996

(86) PCT No.: PCT/AU96/00456

§ 371 Date: May 8, 1998

§ 102(e) Date: May 8, 1998

(87) PCT Pub. No.: WO97/04512

PCT Pub. Date: Feb. 6, 1997

(30) Foreign Application Priority Data

Jul. 18, 1995 (AU) .................... PN 4222

(51) Int. Cl.[7] .................... G05B 11/32; H02J 1/00; H05B 37/02
(52) U.S. Cl. .................... 318/562; 318/625; 318/34; 318/105; 307/29; 307/38; 362/85; 315/295; 315/317
(58) Field of Search .................... 318/562, 625, 318/34, 50, 105, 106; 362/85; 315/291, 292, 295, 297, 301, 316, 317; 307/18, 29, 38–42, 85

(56) References Cited

U.S. PATENT DOCUMENTS

| | | | |
|---|---|---|---|
| 3,755,686 | * | 8/1973 | Woods .................... 307/18 |
| 4,047,003 | * | 9/1977 | LaRocca et al. .................... 364/138 |
| 4,149,096 | * | 4/1979 | Holzner et al. .................... 307/115 |
| 4,195,236 | * | 3/1980 | Kalinichenko et al. .................... 363/124 X |
| 4,257,103 | * | 3/1981 | Suzuki et al. .................... 364/474.11 |
| 4,371,921 | * | 2/1983 | Cushman .................... 364/138 |
| 4,422,027 | * | 12/1983 | Mohlere .................... 318/687 |
| 4,480,193 | * | 10/1984 | Blahous et al. .................... 307/19 |
| 4,641,069 | * | 2/1987 | Fujioka et al. .................... 318/625 |
| 4,827,195 | * | 5/1989 | Newell et al. .................... 318/49 |
| 4,908,822 | * | 3/1990 | Wroblewski .................... 370/276 |
| 4,931,712 | * | 6/1990 | DiGiulio et al. .................... 318/625 |
| 4,962,687 | * | 10/1990 | Belliveau et al. .................... 84/464 R |
| 5,113,123 | * | 5/1992 | Noser et al. .................... 318/106 |
| 5,126,640 | * | 6/1992 | Leroy .................... 318/34 |
| 5,181,178 | * | 1/1993 | Sasaki et al. .................... 364/474.11 |
| 5,212,430 | * | 5/1993 | Jartyn .................... 318/34 |
| 5,222,017 | * | 6/1993 | Yellowley et al. .................... 364/132 |
| 5,237,250 | * | 8/1993 | Zeile et al. .................... 318/562 |
| 5,268,898 | * | 12/1993 | Kazato .................... 370/85.6 |
| 5,274,311 | * | 12/1993 | Littlejohn et al. .................... 318/562 |
| 5,347,270 | * | 9/1994 | Matsuda et al. .................... 340/825.8 |
| 5,371,495 | * | 12/1994 | Sturges et al. .................... 340/825.79 |
| 5,388,042 | * | 2/1995 | Schiltz .................... 364/167.01 |
| 5,406,176 | * | 4/1995 | Sugden .................... 315/292 |
| 5,574,343 | * | 11/1996 | Leiber et al. .................... 318/291 |
| 5,619,111 | * | 4/1997 | Katagiri et al. .................... 318/625 |
| 5,621,650 | * | 4/1997 | Agrawal et al. .................... 340/825.83 X |
| 5,769,527 | * | 6/1998 | Taylor et al. .................... 362/85 |
| 5,788,365 | * | 8/1998 | Hunt et al. .................... 362/301 |
| 5,818,349 | * | 10/1998 | Dayton .................... 340/825.79 |
| 6,031,709 | * | 2/2000 | Ziemkowski .................... 361/191 |

\* cited by examiner

Primary Examiner—Brian Sircus
(74) Attorney, Agent, or Firm—Seed IP Law Group PLLC

(57) ABSTRACT

A control system for controlling a plurality of electrical devices (6) the system including a central controller (2) for controlling functions of the devices, a network (4) coupled between the central controller (2) and the devices, the network including a plurality of device drivers (10) for providing drive signals to the electrical devices, the number of drivers being less than the number of devices characterized in that the network includes intelligent devices (8) which enable communication through the network from the central controller (2) to the devices (6).

31 Claims, 49 Drawing Sheets

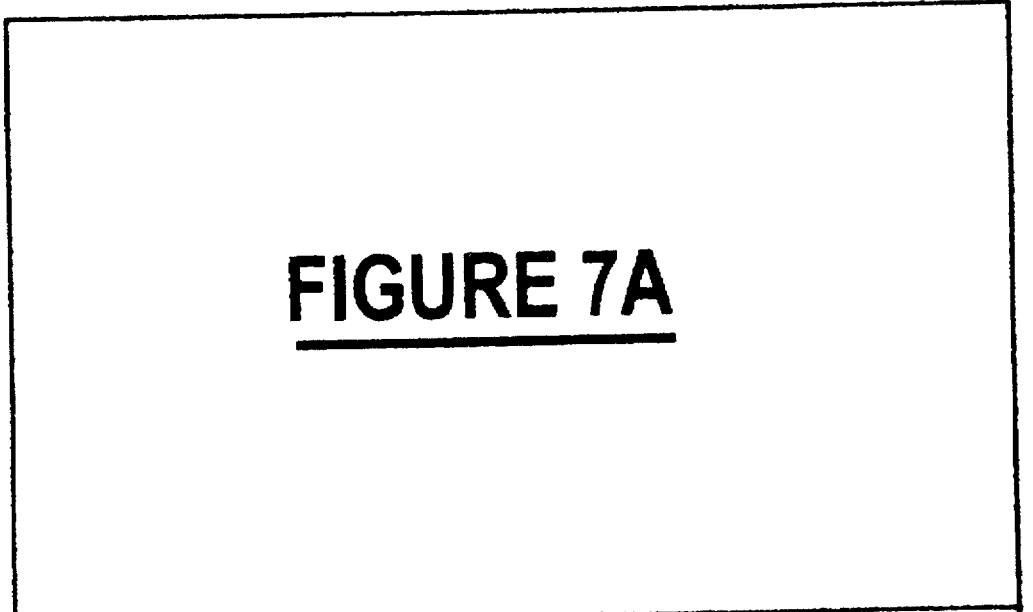
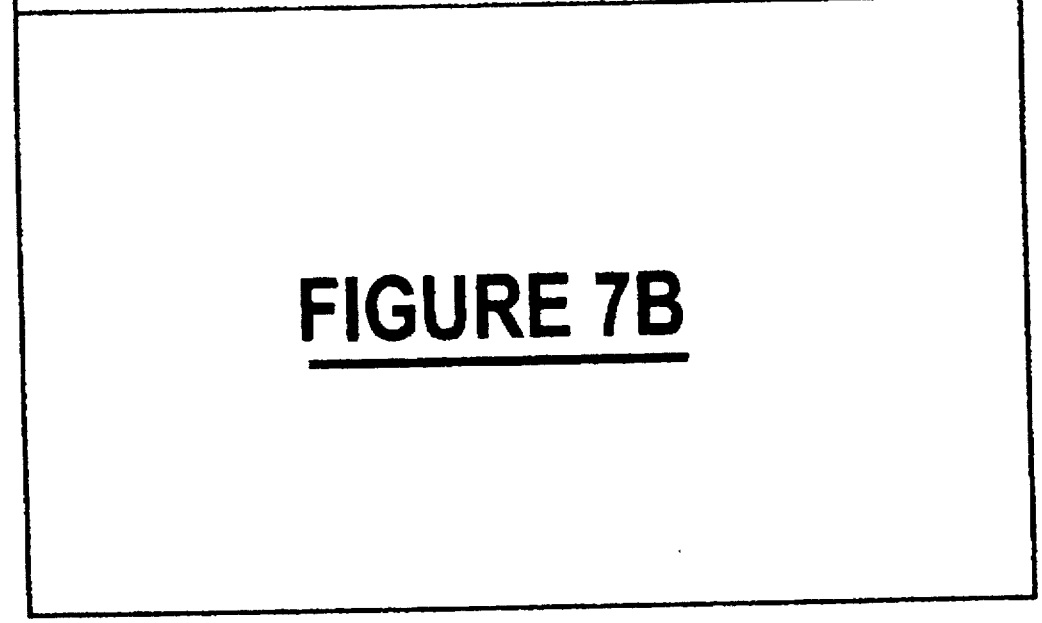
FIGURE 7

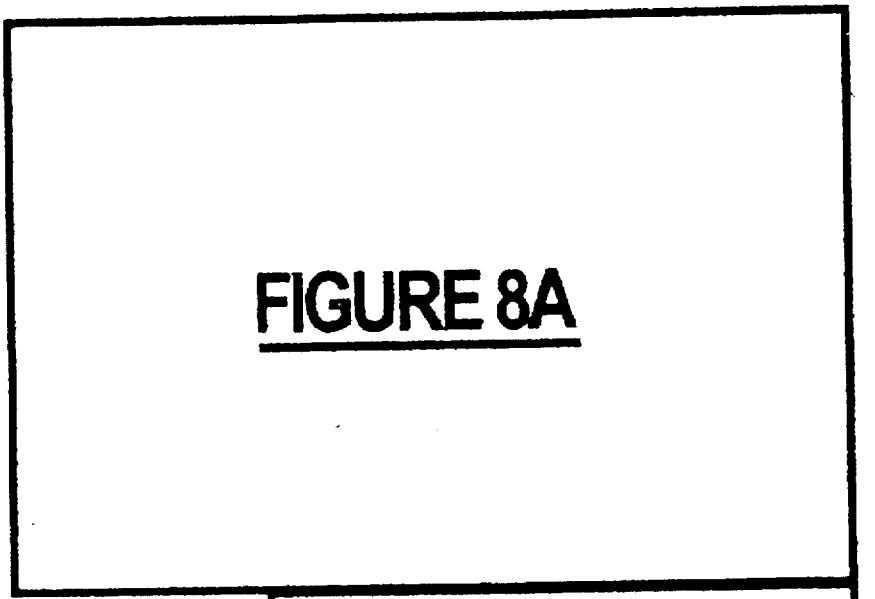
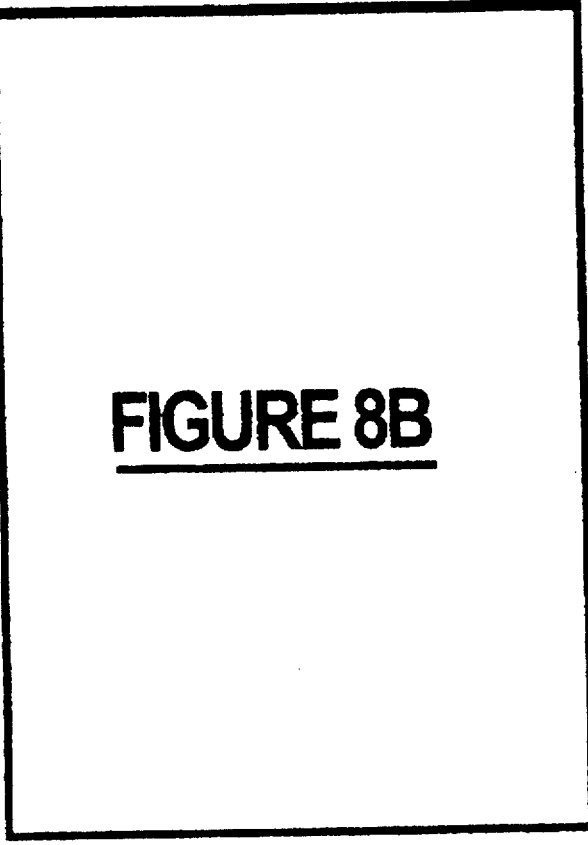
FIGURE 8

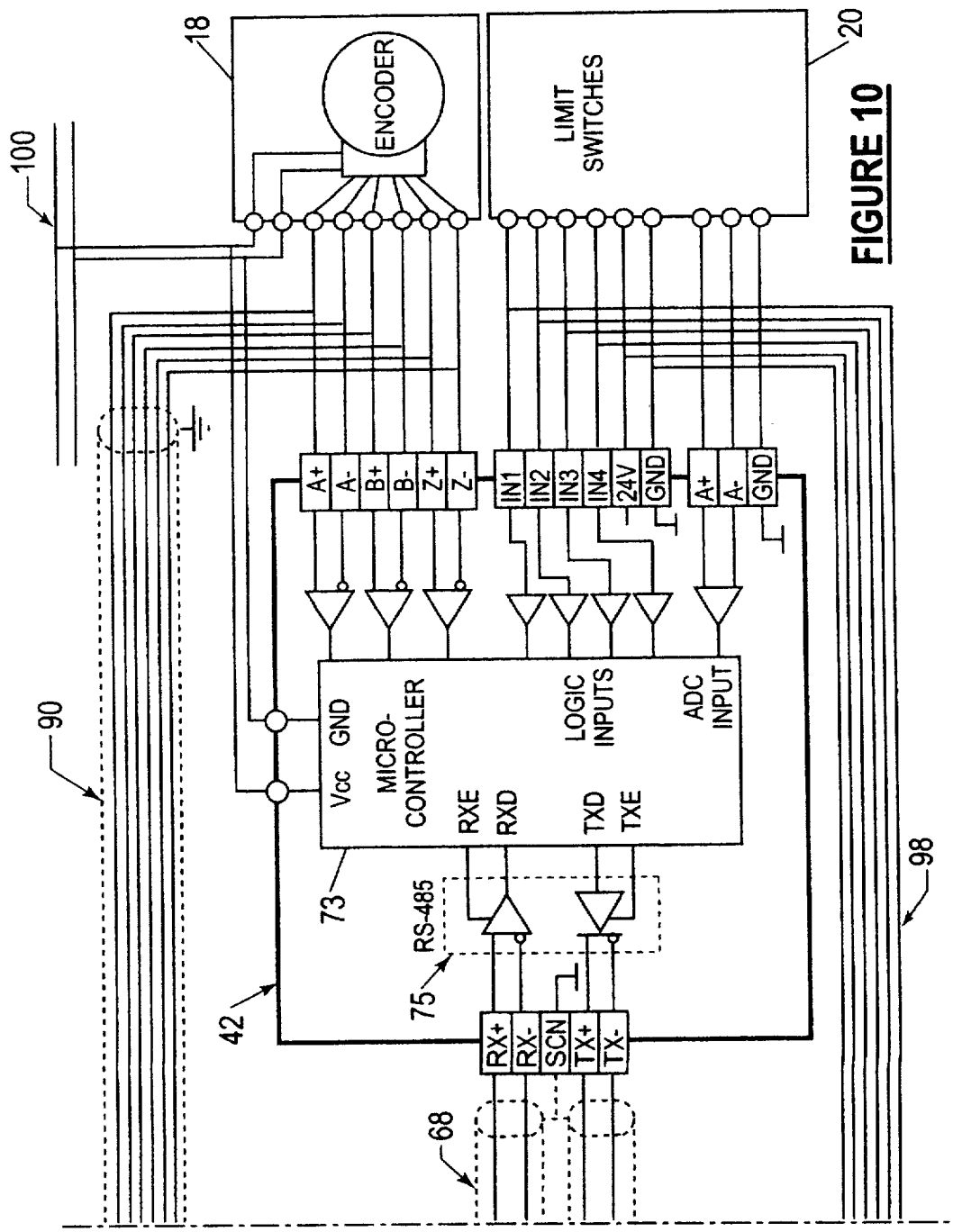

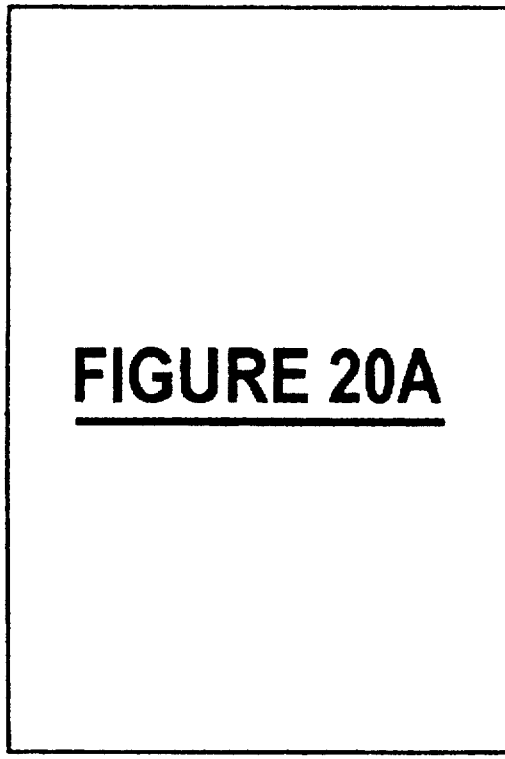 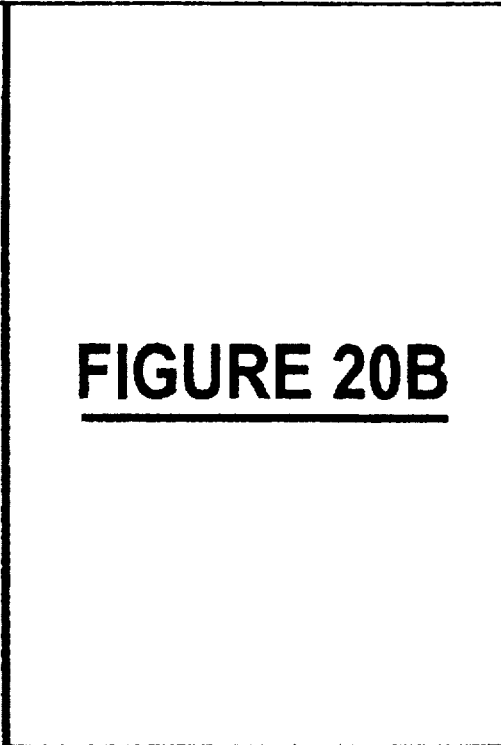
FIGURE 20

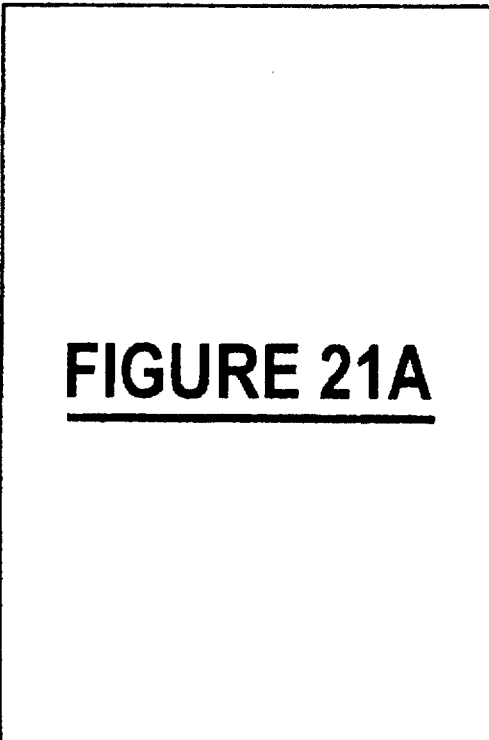 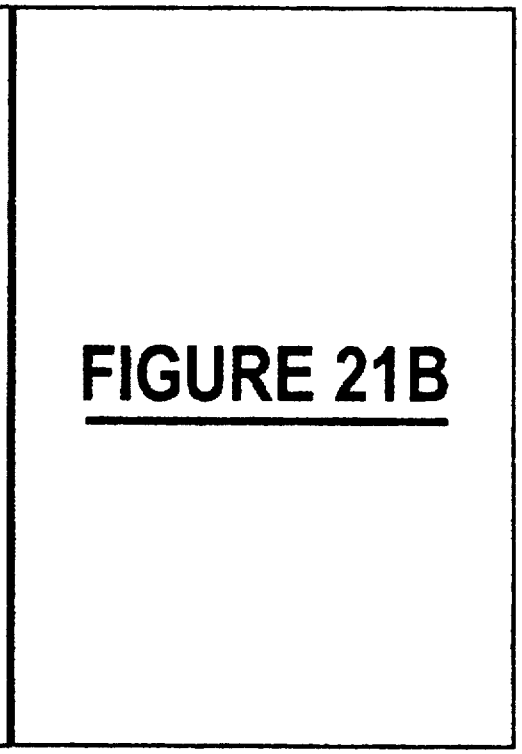
FIGURE 21

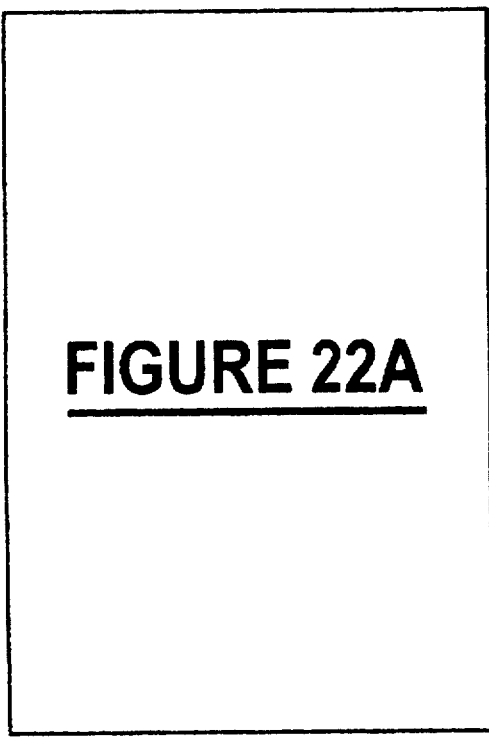
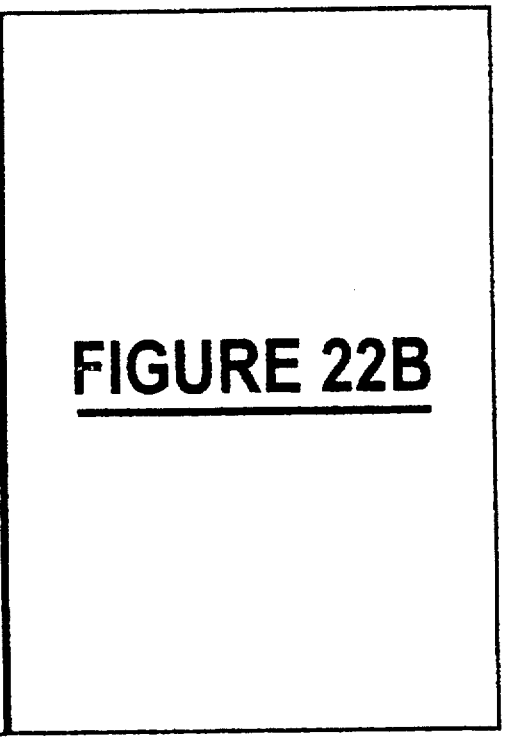
FIGURE 22

CONTROL SYSTEM FOR CONTROLLING PLURAL ELECTRICAL DEVICES

The present invention relates to a control system for controlling a plurality of electrical devices.

The invention is particularly but not exclusively applicable to the control of electrical devices such as electric motors especially those used for control of stage equipment.

In the control of stage equipment in a theater there is a need for precise and synchronized control of a plurality of motors which may be used for moving and/or wincing stage equipment. In these applications safety considerations are paramount because any fault may result in serious injuries to equipment or personnel. Typically the motors required to drive winches and the like are coupled to a variable speed drive (VSD) which in turn is coupled to a central computer usually via an axis controller. The VSD provides output power to the motor to control its speed in a precise way. The motors may for example be DC or AC either single or three phase. The drives must provide the correct control voltage, current or frequency input to the motor to achieve the desired speed. The axis controller generates control signals which are coupled to the VSD and controls such things as the rate of acceleration, maximum speed, duration of maximum speed, rate of deceleration and precise end-point positioning. The central controller on the other hand provides the highest level control and it usually comprises a computer which is programmed to select which pieces of stage equipment are moved, where they are moved to and when they are moved. The central controller provides appropriate control signals to the axis controllers.

In an ideal system, there would be an axis controller and VSD for each motor. In this way the central controller can effectively control all of the motors so that all of the motors can be simultaneously operated. Whilst this may be appropriate for relatively small theaters it is not usually appropriate for large theaters where there may be more than 60 motors to be controlled. It is not appropriate in the larger systems because of the substantial expense involved in providing separate axis controllers and VSDs for each motor. Further, there would be a substantial amount of cabling required to couple the components together.

Economies can be realized if the number of motors required to run simultaneously is lower or substantially lower than the total number of motors and this is frequently the case. In this case, the number of VSDs can be reduced to the number of motors required to run at the same time. However, a mechanism needs to be put in place which can variously connect a group of motors required at any given time to available VSDS.

In the theater flying system application area, the connection of a group of motors to their designated VSDs must be made quickly, i.e. in less than half of one second, This precludes the use of a "manual patch" in which an operator plugs a cable from each required motor into an available VSD. Some form of "automatic patch" is needed, where the connections of all power and signal routes between motors and VSDs can be made using controlled switches such as relays, contactors, solid-state switches, etc.

Conceptually, an automatic patch can be represented by a rectangular matrix. Ideally, a "switch" (actually a set of switches, because there are many conductors required to be routed between a winch and its associated drive) would be located at each cross point in the matrix to enable any combination of motors (up to the total number of VSDs) to be connected to a drive each. In practice, this is not economically feasible and would cost more than a system having one VSD per motor.

As an acceptable compromise, a subset of matrix cross points are populated with switches. The number of switches allocated to each motor, i.e. cross points populated in each row of the matrix, will determine the probability of being able to assign a given motor in a group to an available VSD. The probability decreases, of course, as the group size increases. This probability can be quite high for small group sizes, e.g. up to 100%, but it drops sharply as the group size approaches the number of VSDs.

One automatic motor-drive patch system has been proposed but it tended to be over complicated and cumbersome to implement. In this system the central controller is coupled to each of the patch switches so that the central controller acting through the patch switches determines which of the motors are coupled to which of the VSDS. This of course requires considerable cabling and also reliability is not optimized. An example of such a system is the scenery flying system implemented at The Olivier Theater, London and reference is made to a paper entitled *The National Theater's Scenery Hoist Matrix Scheme* by S. K. Das and R. H. Keenan.

An object of the present invention is to provide a novel control system which is particularly applicable to an automatic motor-drive patch system.

The invention herein concerns the architecture of the patch and control logic, i.e. the method by which the patch switches are inter-connected and controlled.

In the system of the invention, the control logic is distributed in the network which couples the central controller to the electrical devices to be controlled.

According to the present invention there is also provided a control system for controlling a plurality of electrical devices, a central controller for controlling selected functions of said devices, a plurality of device drivers for providing drive signals to said electrical devices, the number of device drivers being less than the number of devices and a network coupled between said device drivers and said devices, said network including logic elements which determine which devices are coupled to respective device drivers.

Preferably the logic elements are operable to determine which devices are coupled to respective drivers without direct coupling between the central controller and said logic elements.

Preferably, the central controller comprises a computer which coordinates network activity.

According to a further aspect of the invention there is provided a stage apparatus control system including a central controller, a plurality of motors and a patch network including patch buses for coupling the central controller to the motors characterized in that elements of the patch network are coupled to the central controller through the patch buses and are not independently connected thereto.

The invention also provides a stage control system comprising a central computer, a patch network, a plurality of motors characterized in that a satellite processor is provided for each motor.

The invention also provides a stage control system comprising a central computer, a patch network, a plurality of motors characterized in that the system includes a plurality of axis controllers and wherein the axis controllers include logic elements which cooperate in the control of the patch network.

Examples of the invention will now be further described with reference to the accompanying drawings, in which:

FIGS. 7, 7A and 7B is a more detailed diagram of the patch switch logic circuitry;

FIGS. 8, 8A and 8B is a block diagram of an axis controller;

FIG. 10 is a block diagram of a satellite processor module;

Figure 13:
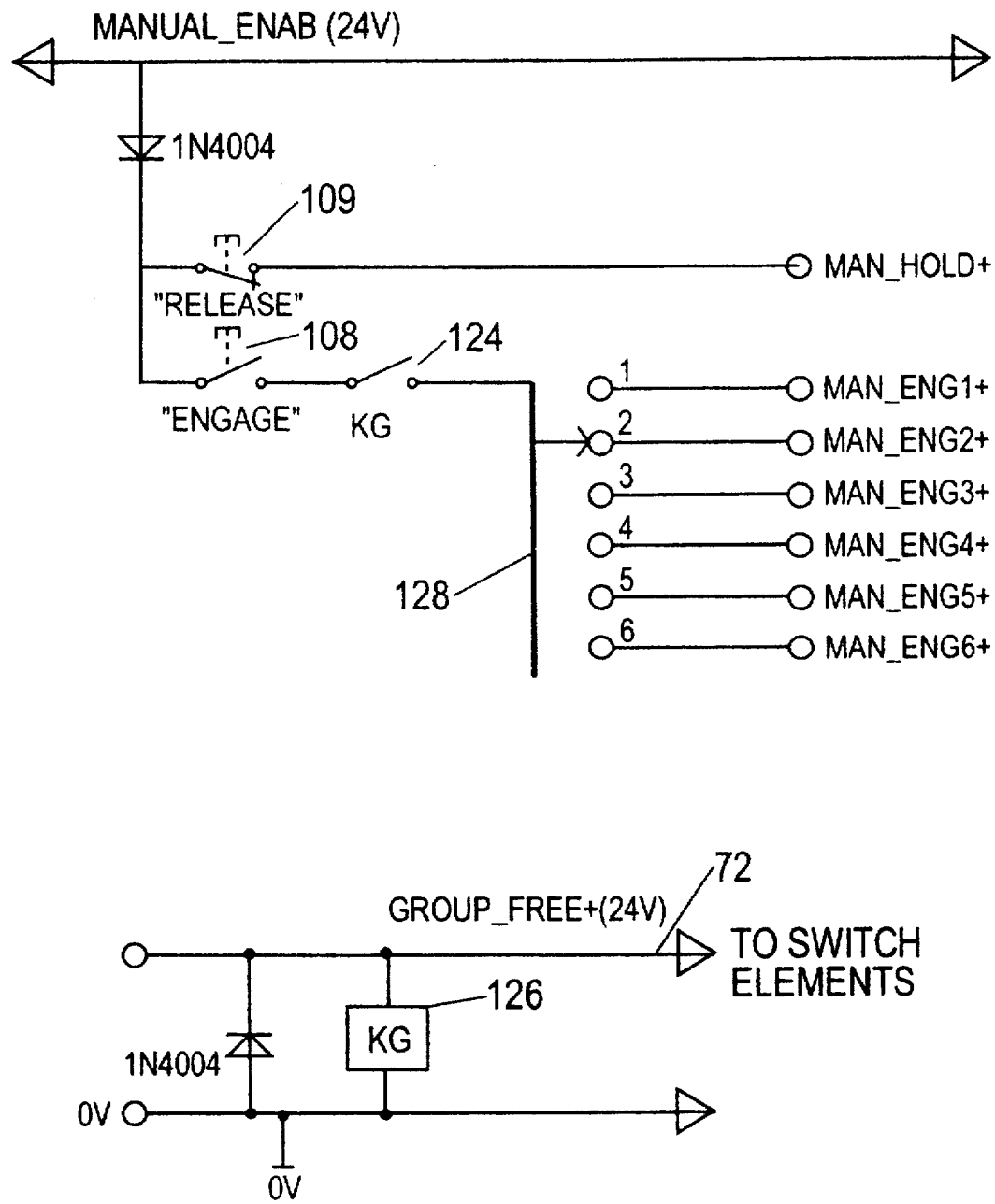
Figure 14:
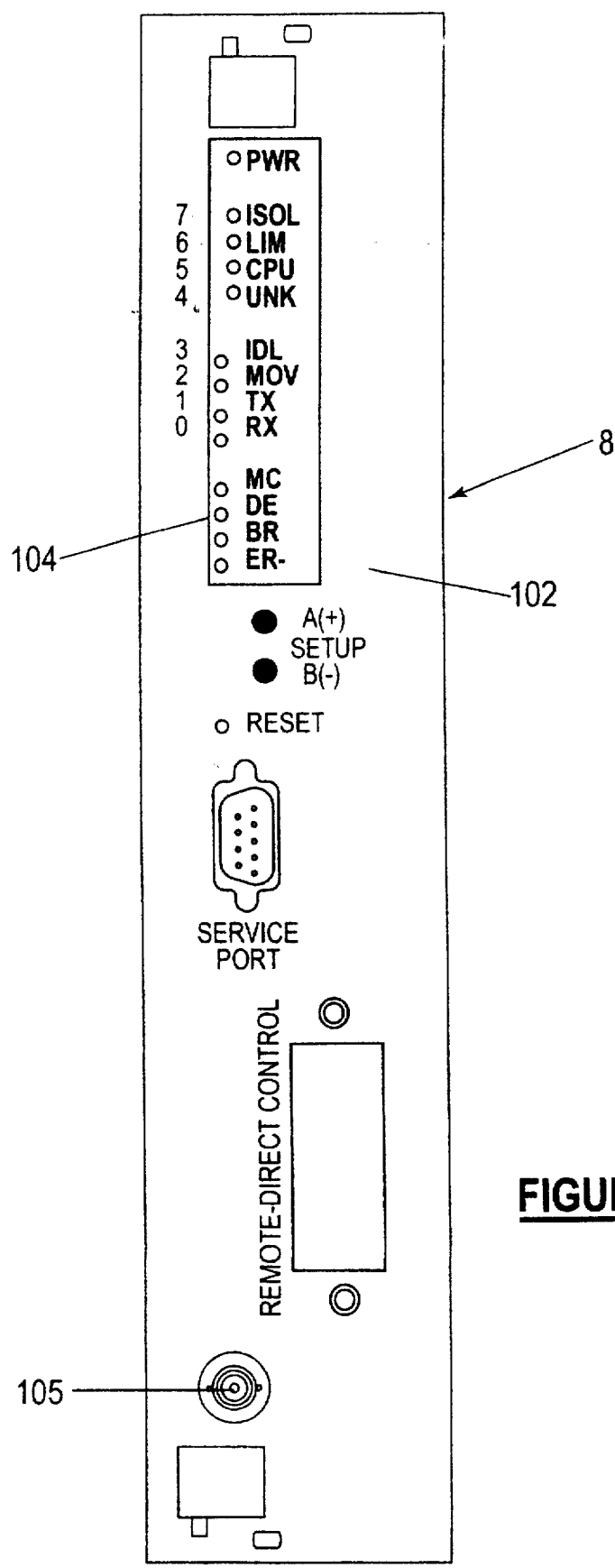
Figure 15A:
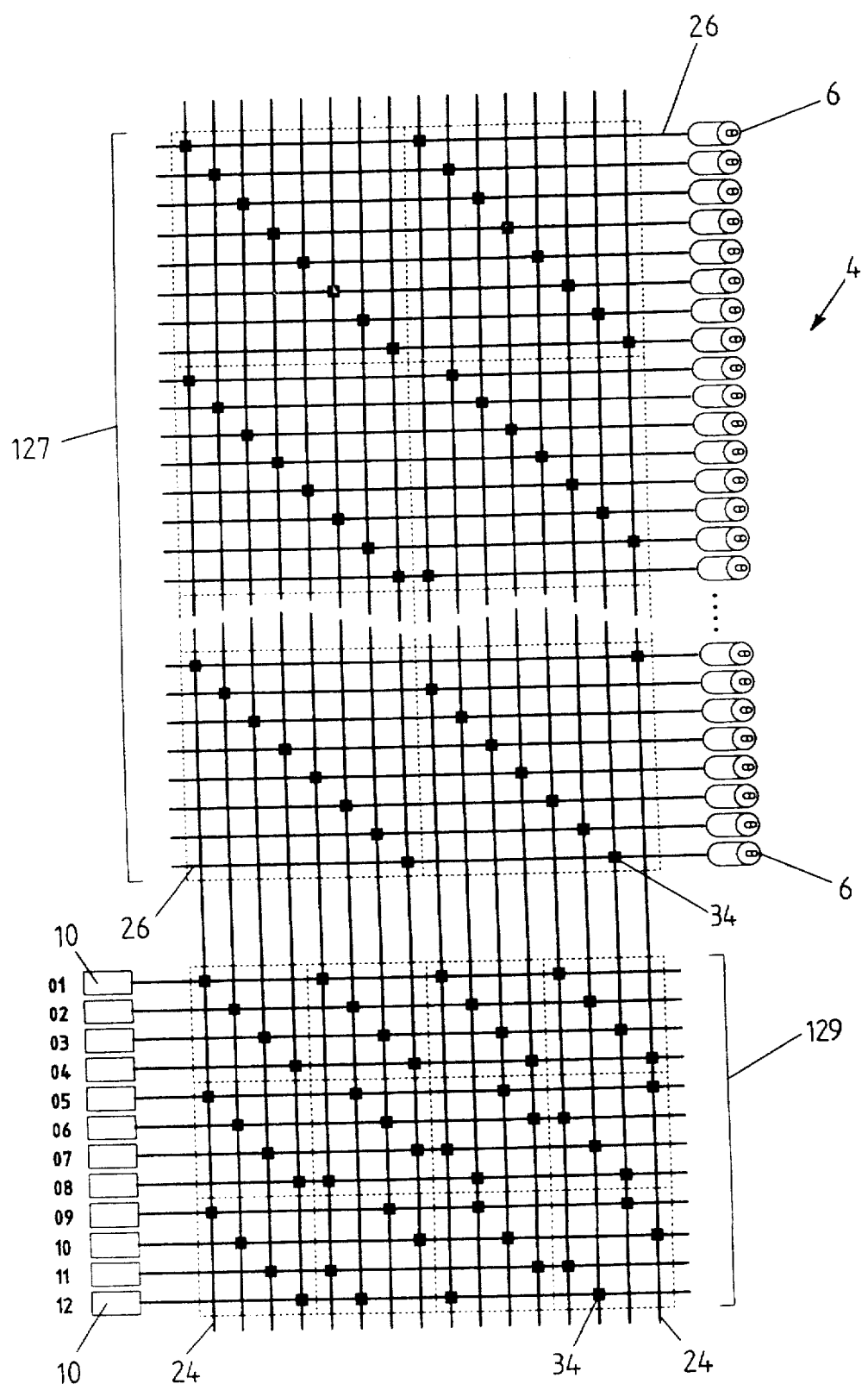
Figure 15B:
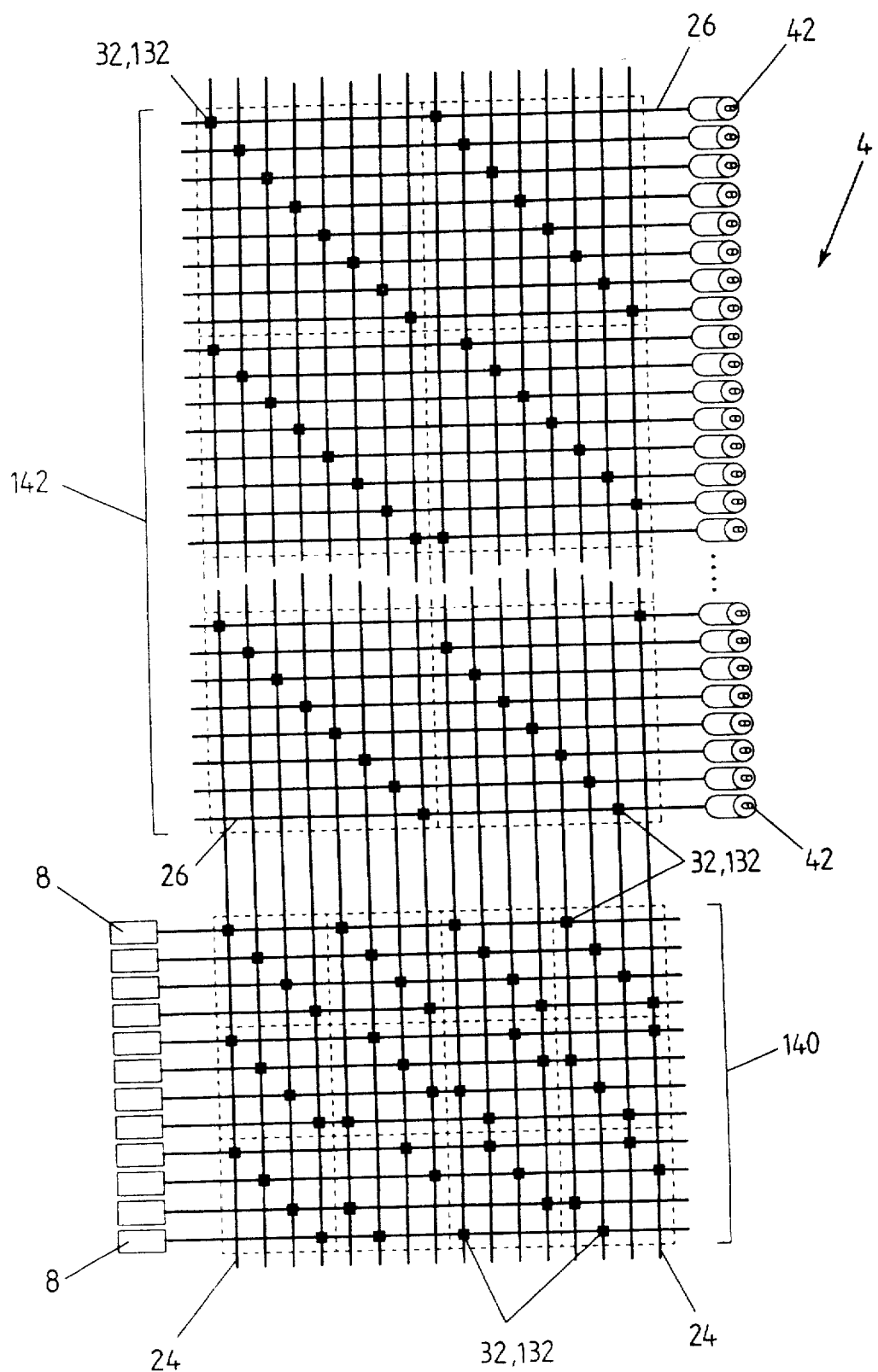
Figure 16:
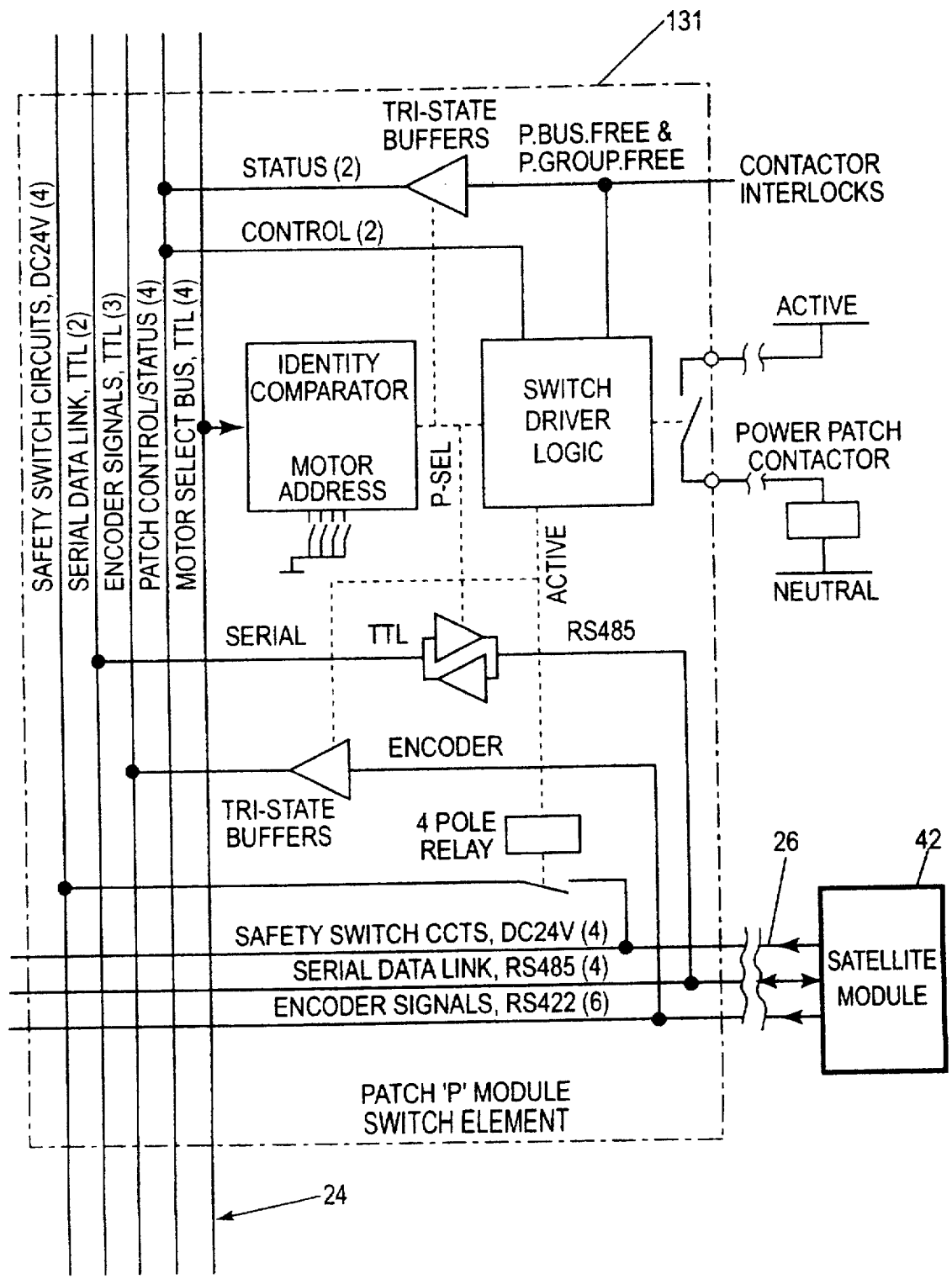
Figure 17:
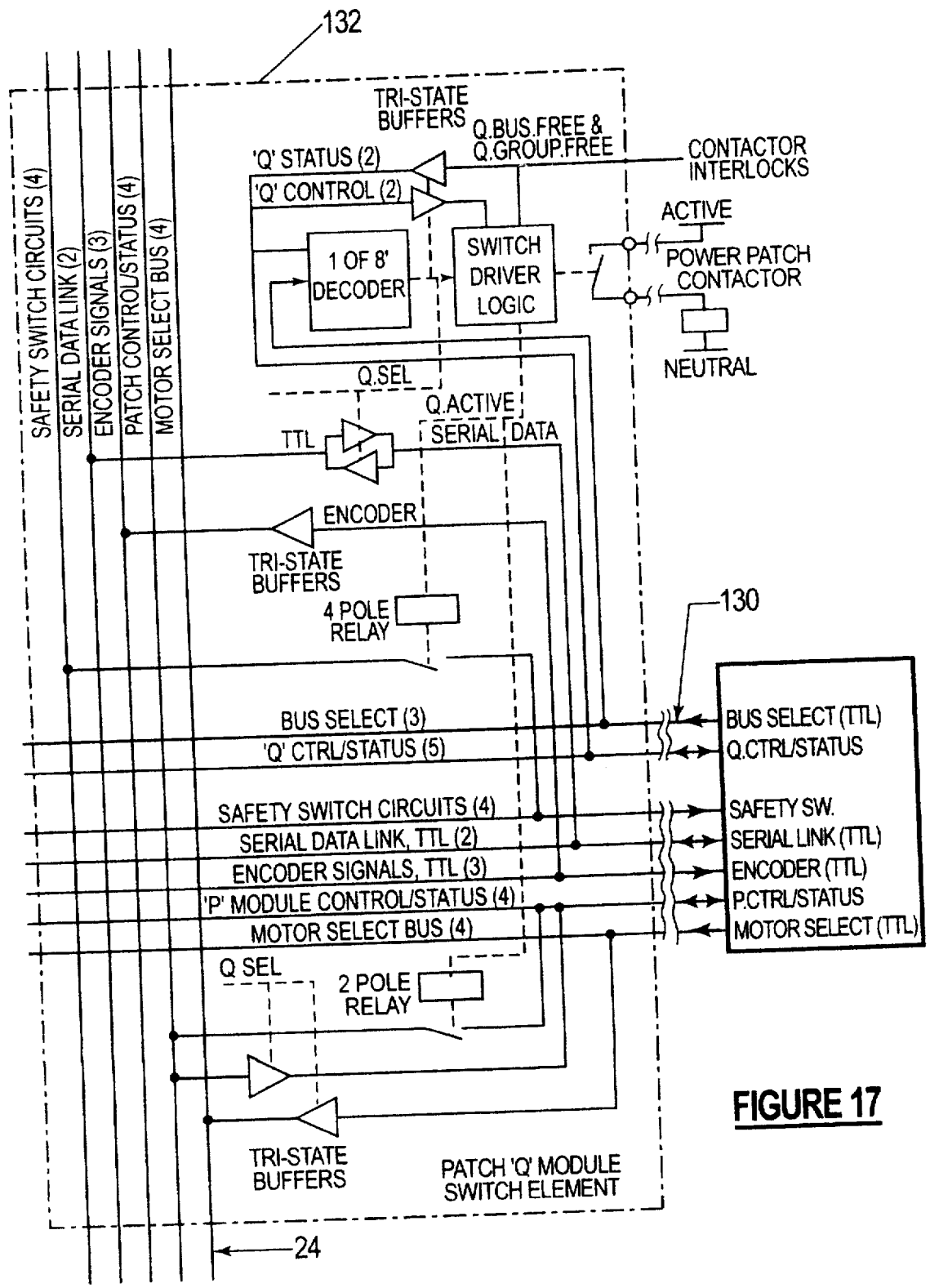
Figure 18:
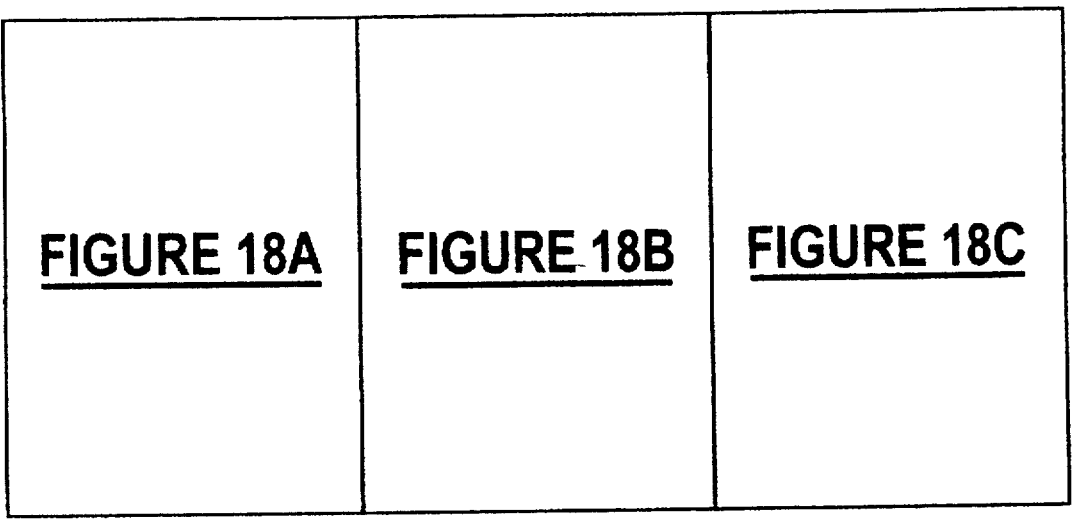
Figure 18A:
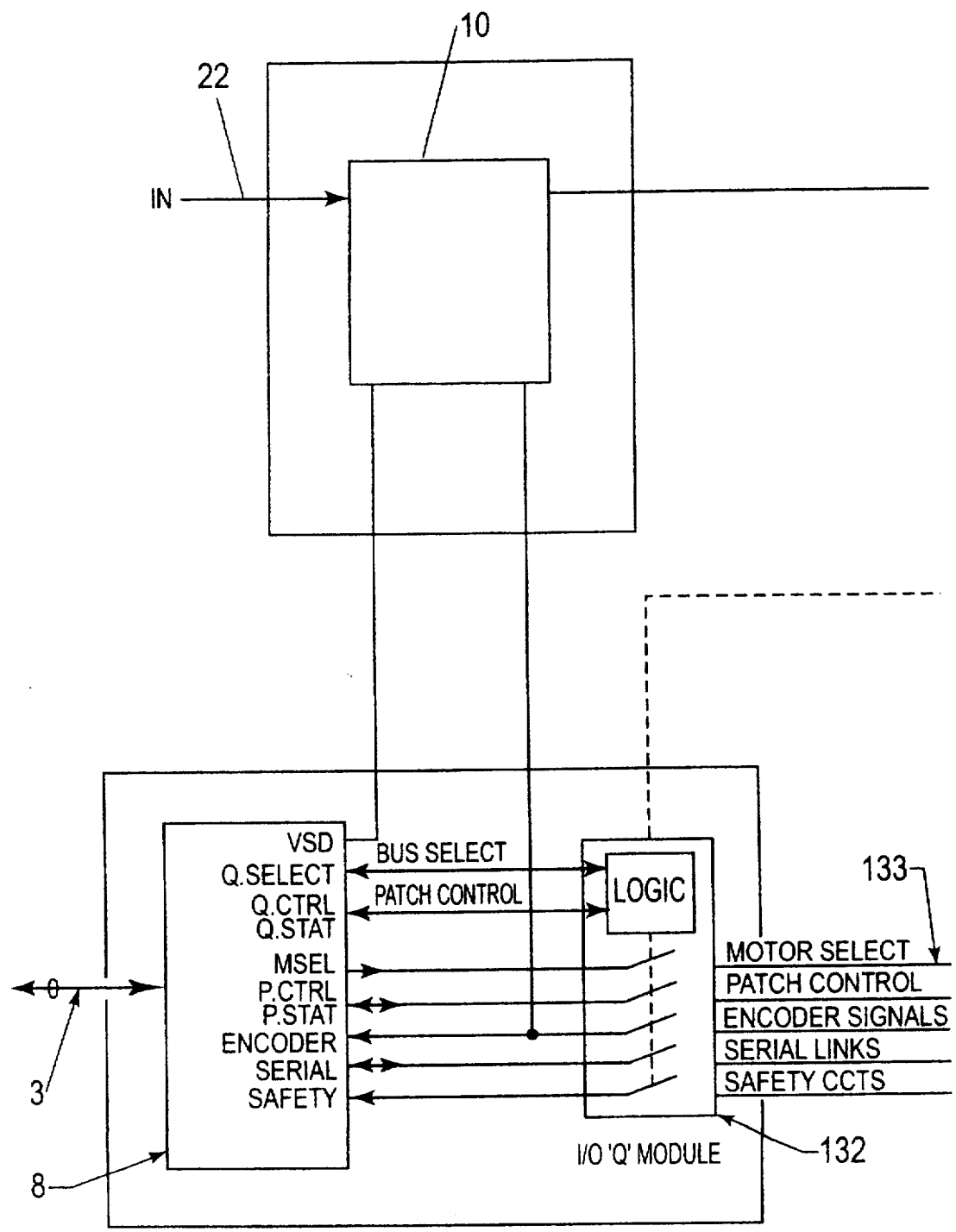
Figure 18B:
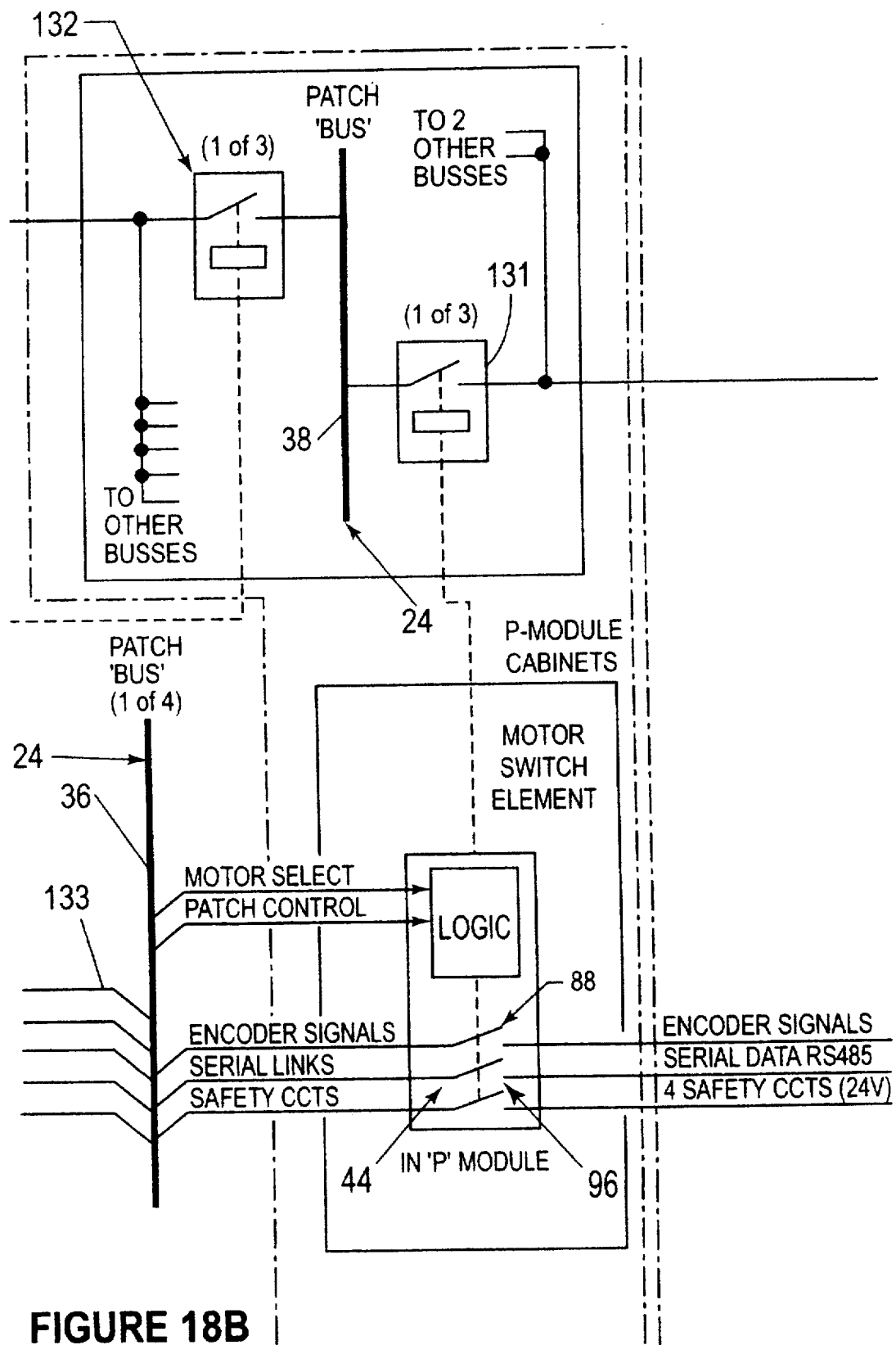
Figure 18C:
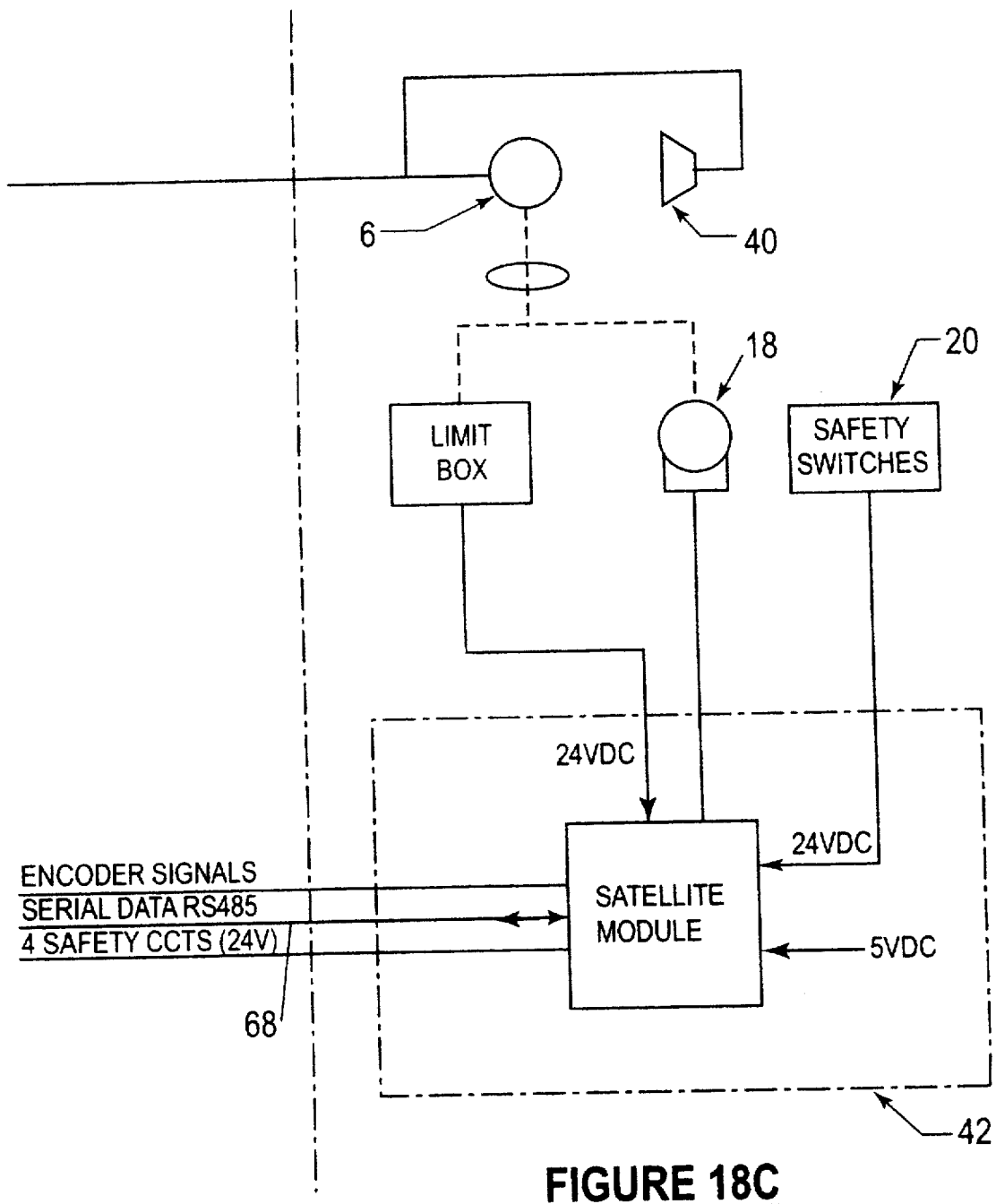
Figure 19:
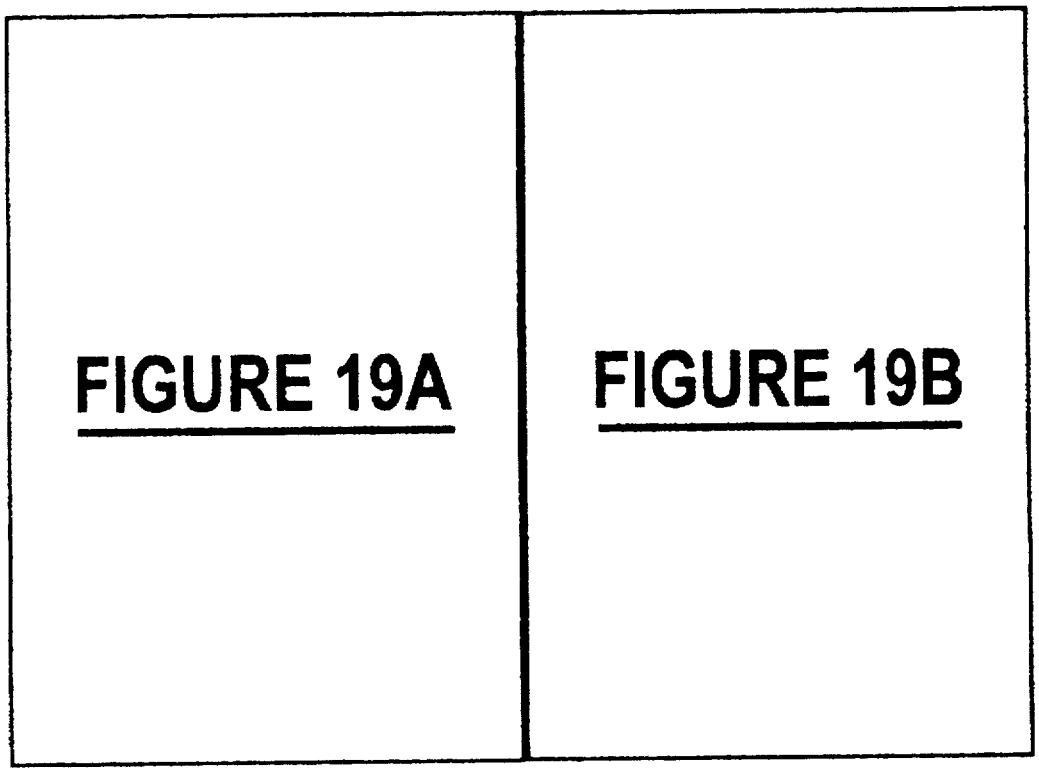
Figure 19A:
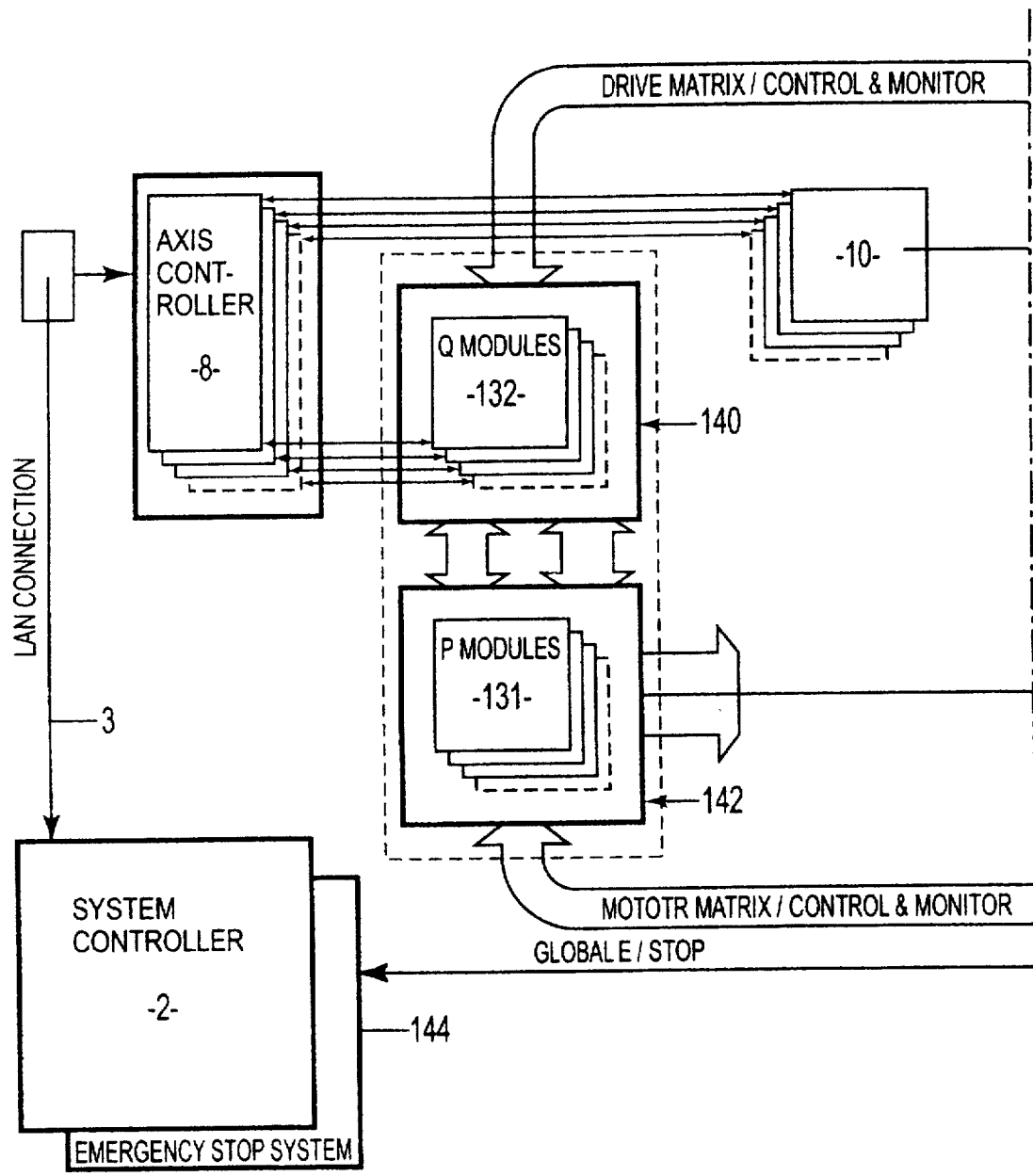
Figure 19B:
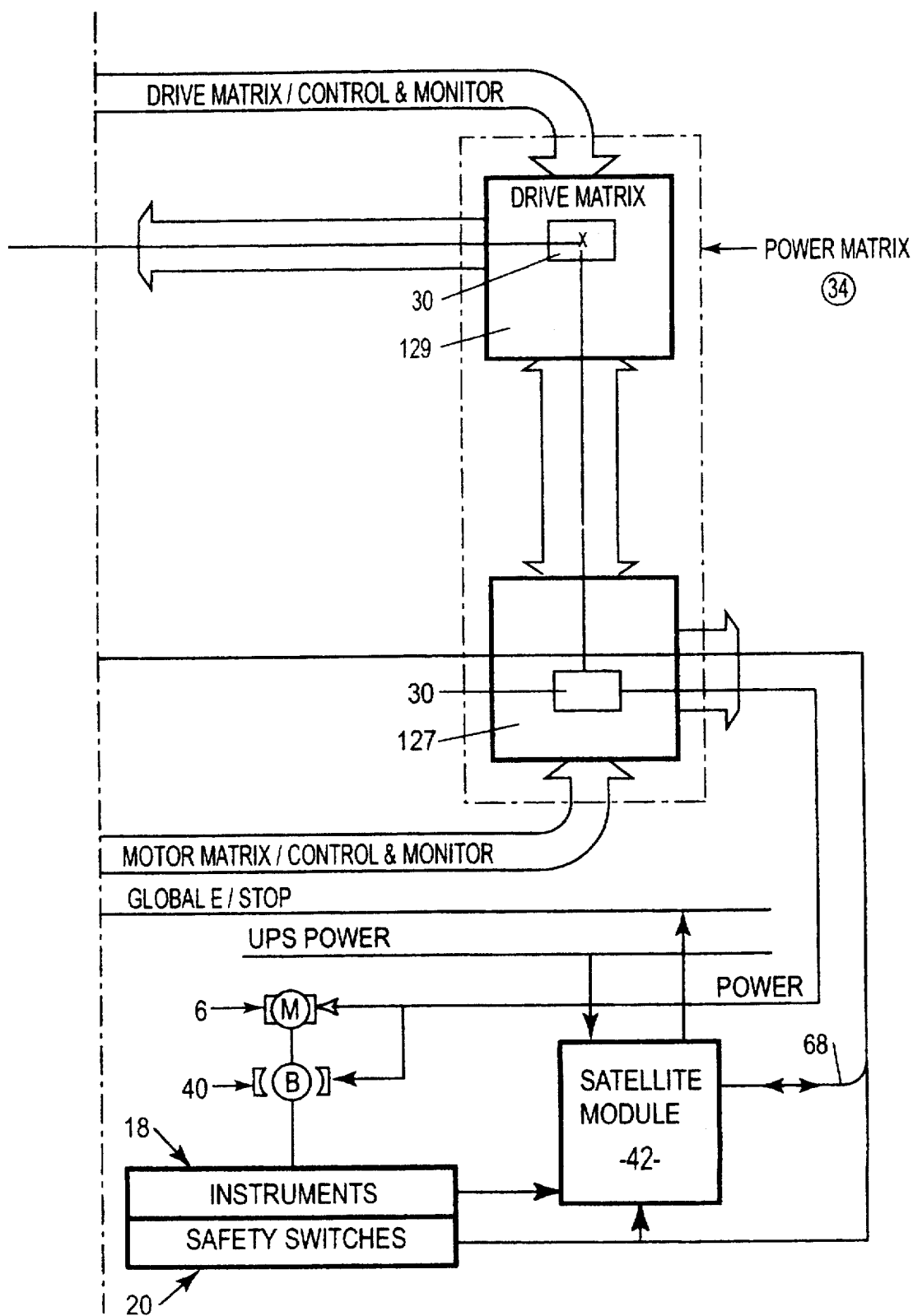
Figure 20A:
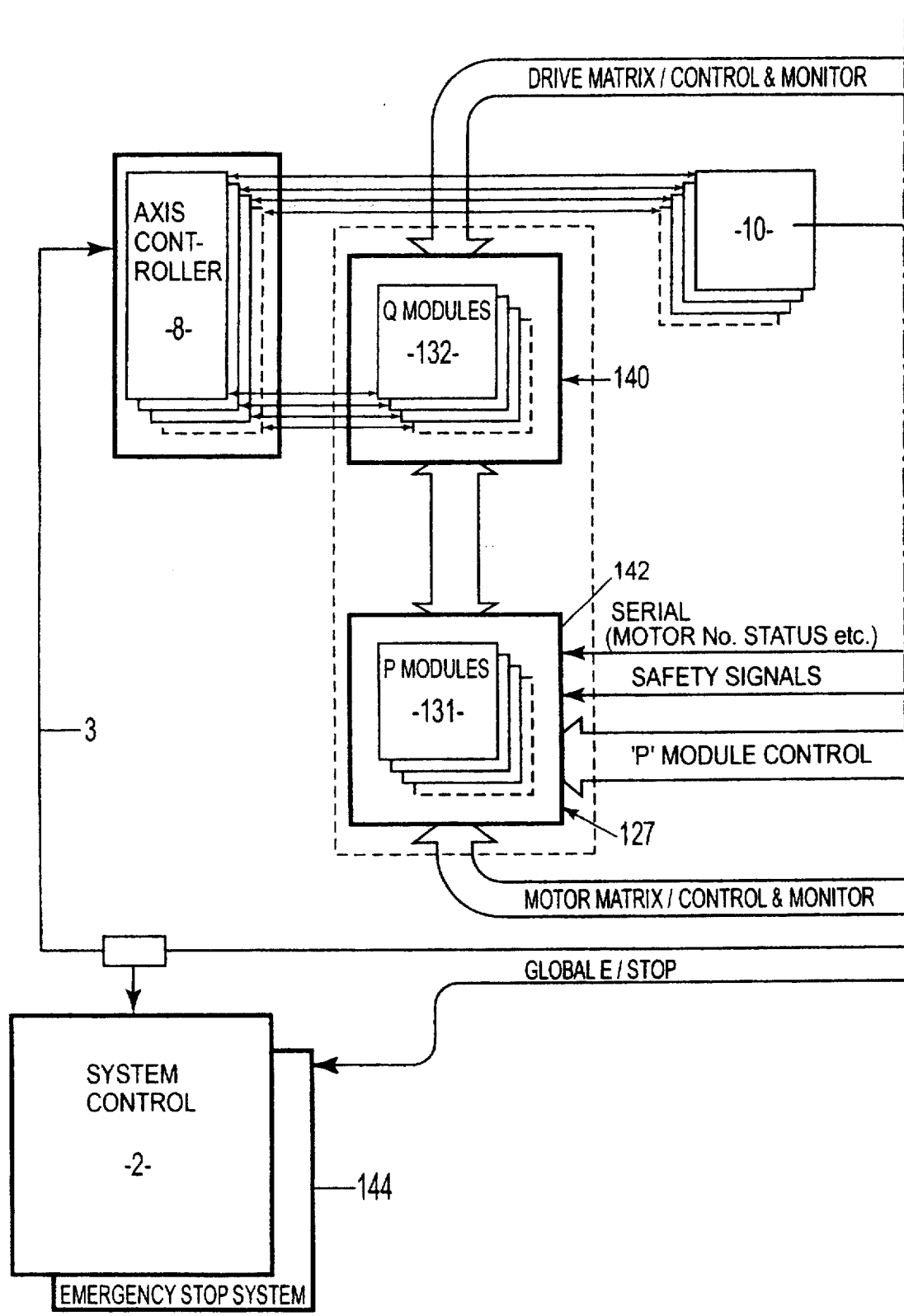
Figure 20B:
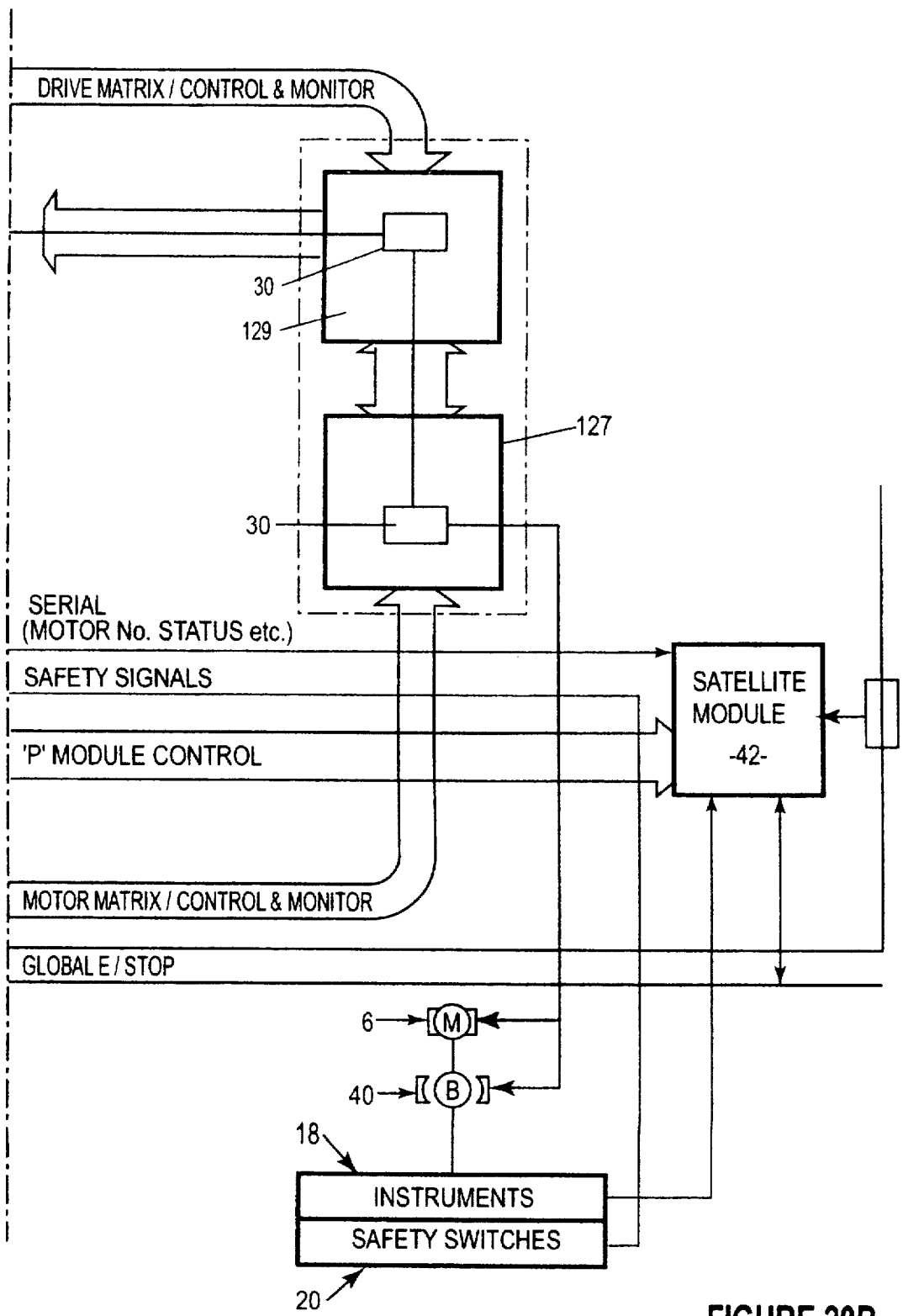
Figure 21A:
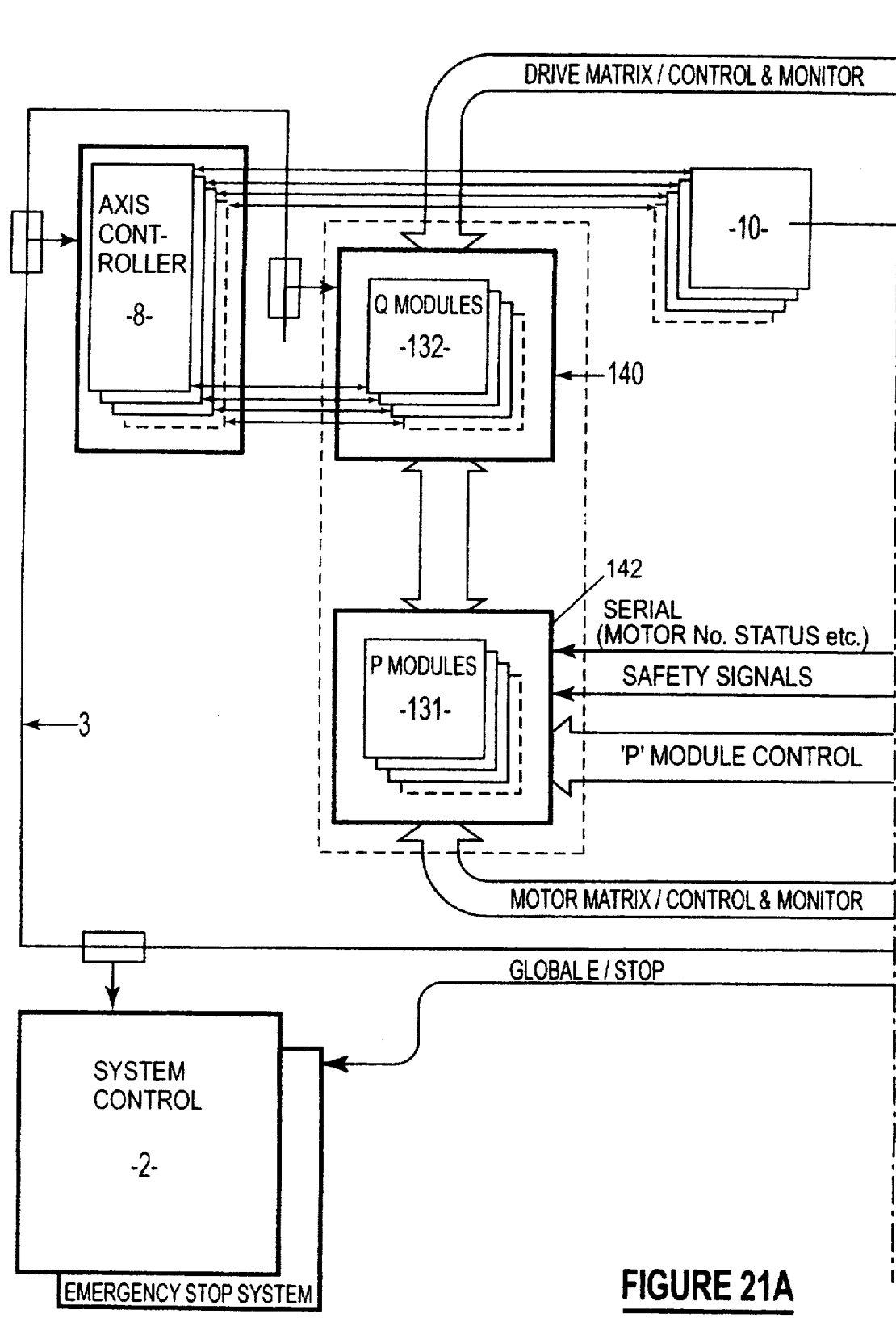
Figure 21B:
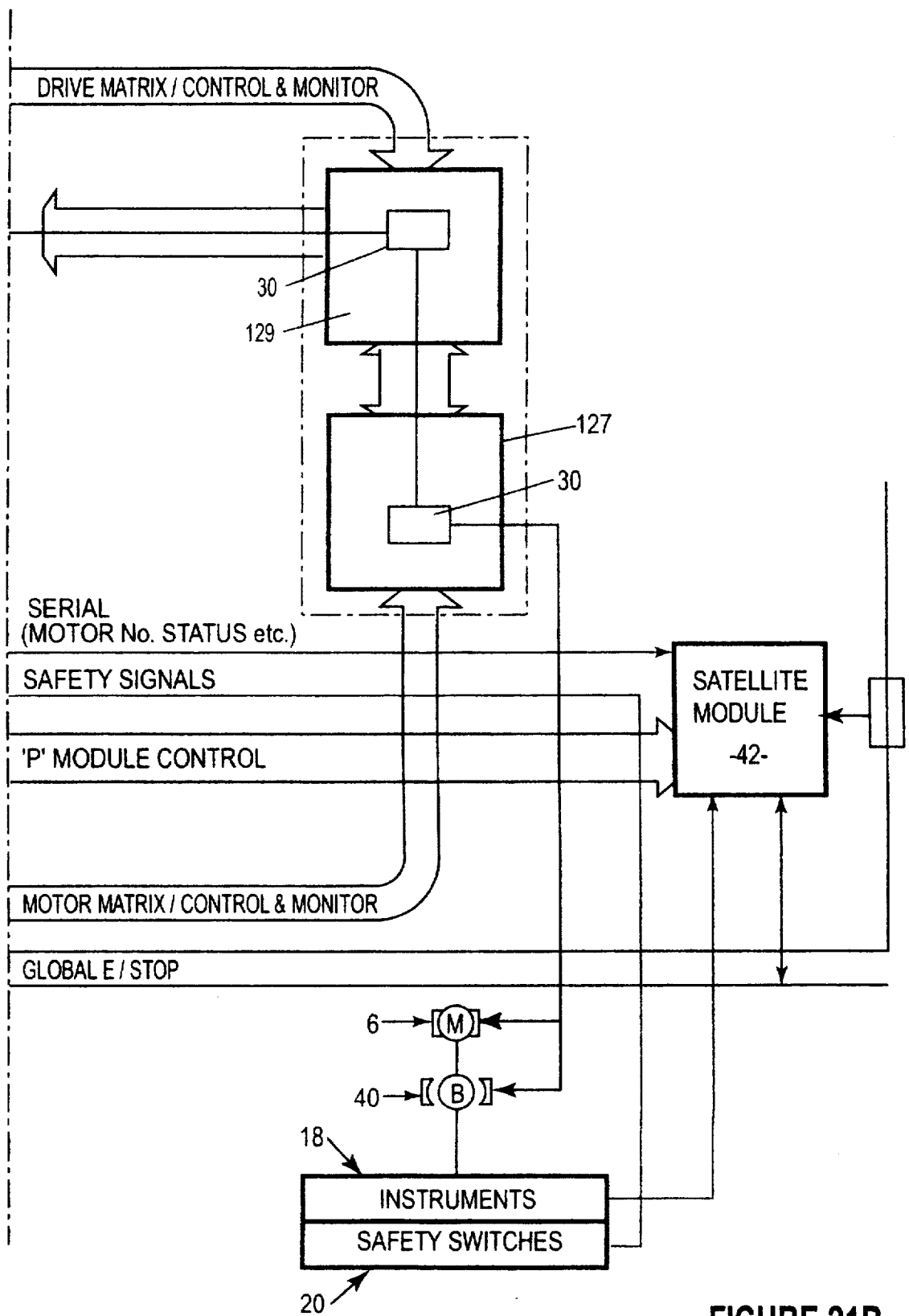
Figure 22A:
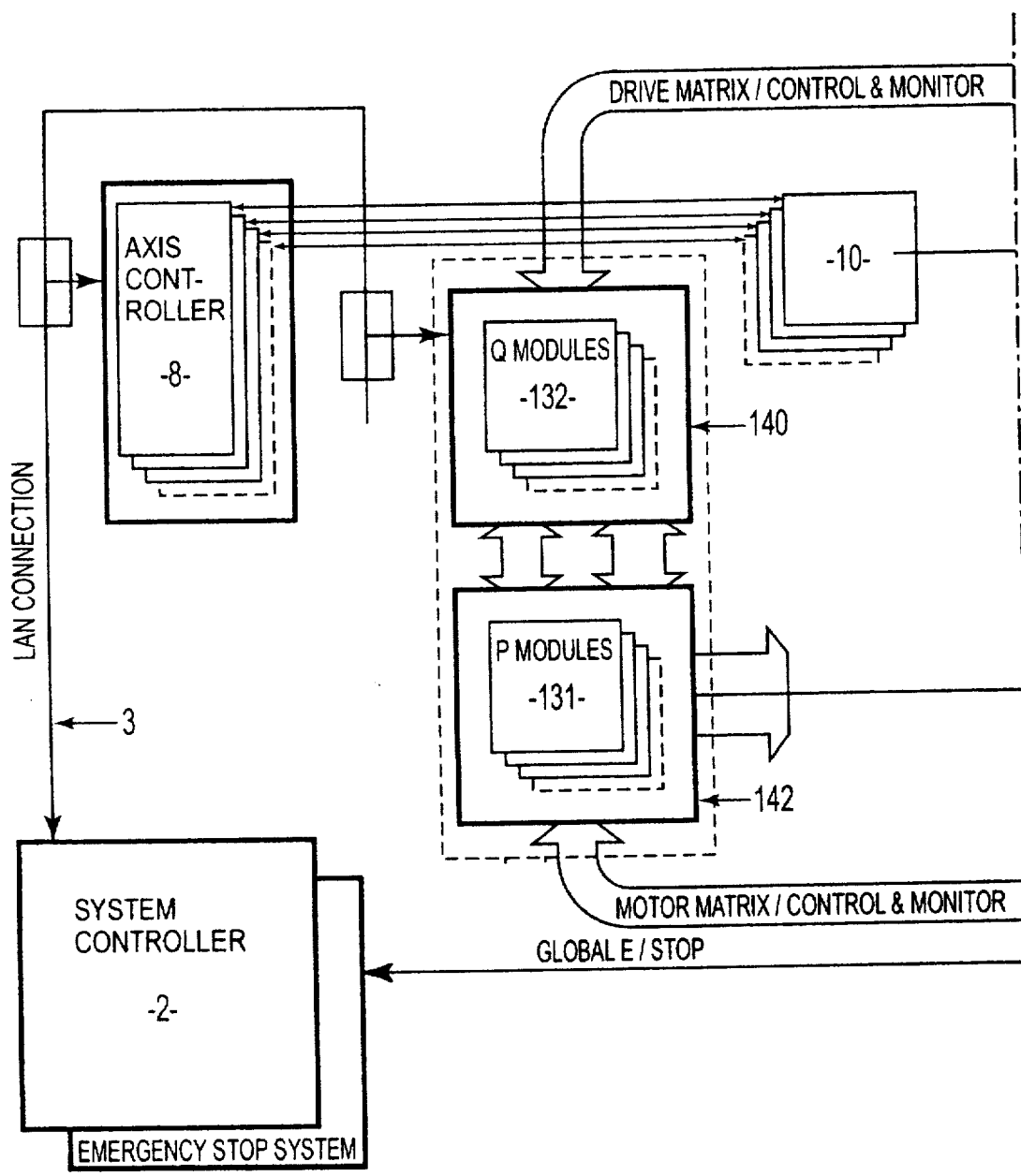
Figure 22B:
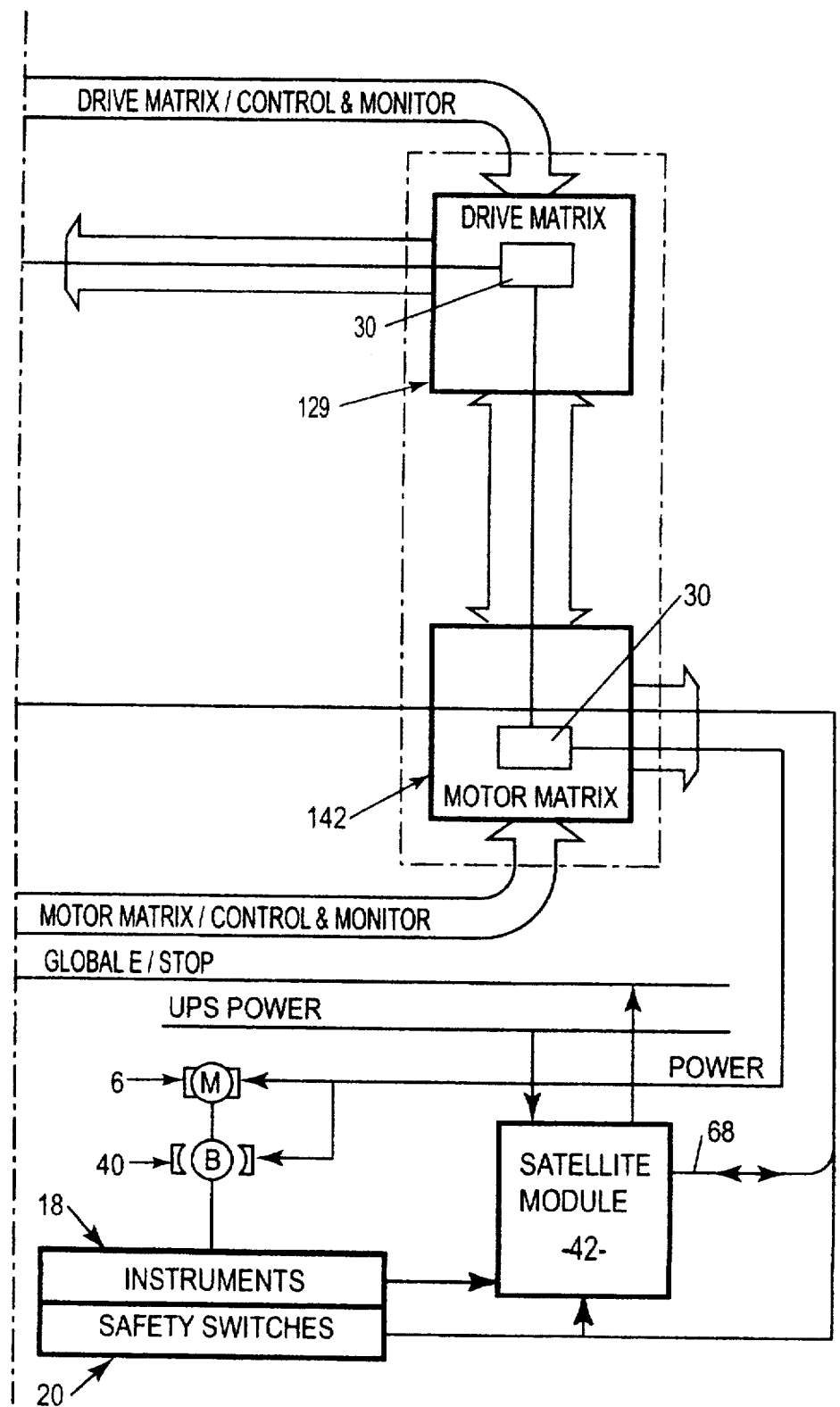
Figure 23:
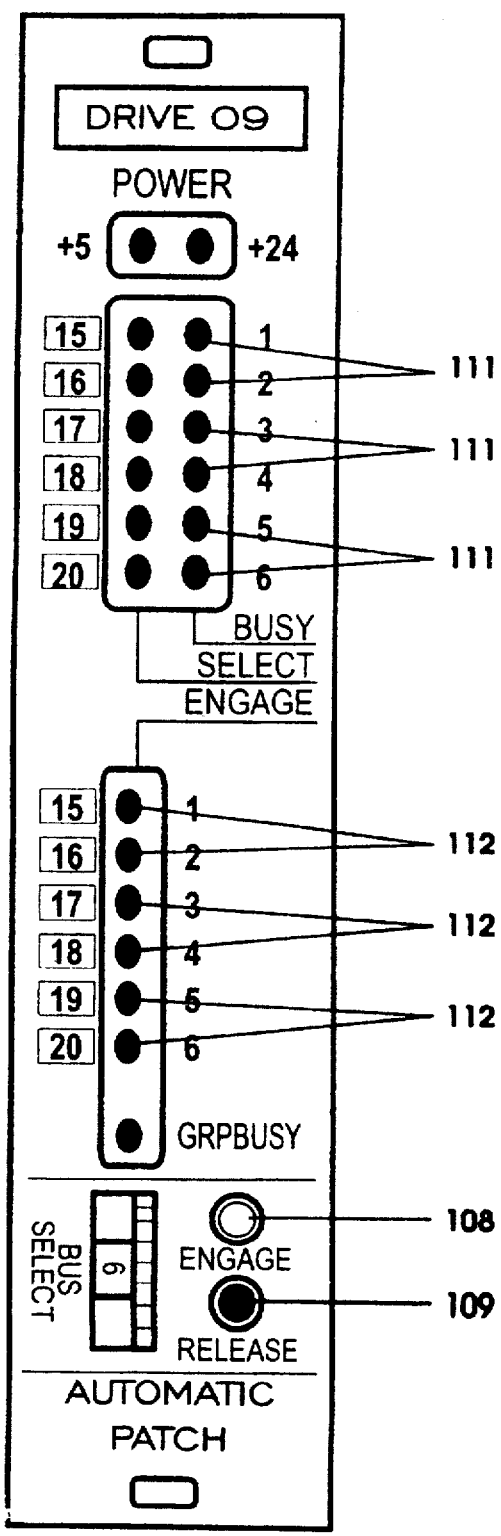
Figure 24:
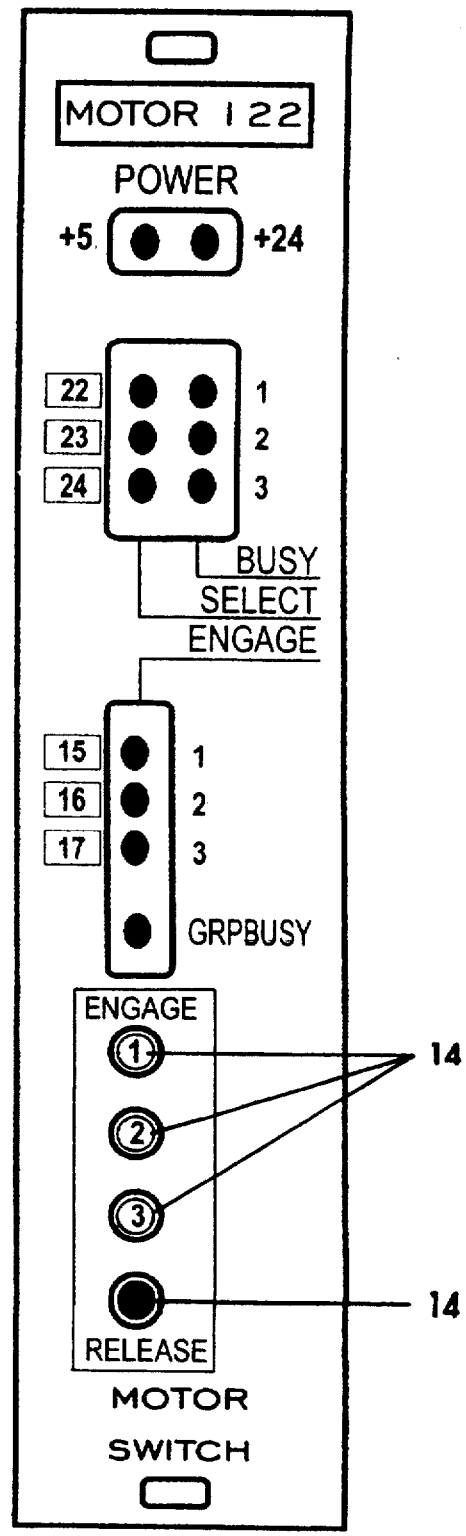

FIG. 13 schematically shows manual switching circuitry;

FIG. 14 shows a typical front panel of an axis controller;

FIG. 15A is a diagrammatic representation of the power switching matrix of a dual-matrix embodiment of the invention;

FIG. 15B is a diagrammatic representation of the signal switching matrix of a dual-matrix embodiment of the invention;

FIG. 16 diagrammatically shows a P patch module for the dual-matrix embodiment;

FIG. 17 diagrammatically shows a Q patch module for the dual-matrix embodiment;

FIGS. 18, 18A and 18B shows the P and Q patch modules connected together;

FIGS. 19, 19A and 19B is an alternative schematic representation of the P and Q patch modules connected together;

FIGS. 20, 20A and 20B illustrates a modified dual-matrix embodiment in which there is a LAN connection from the central controller to the satellite module;

FIGS. 21, 21A and 21B shows an alternative dual-matrix embodiment of the invention in which there is a LAN connection from the central controller to the Q modules;

FIGS. 22, 22A and 22B shows an alternative dual-matrix embodiment having a LAN connection to the Q modules but a serial connection from the satellite modules to the P modules; and FIGS. 23 and 24 show examples of the front panel configurations for the drive switch Q module and motor switch P module for the dual-matrix embodiment.

Figure 1A:
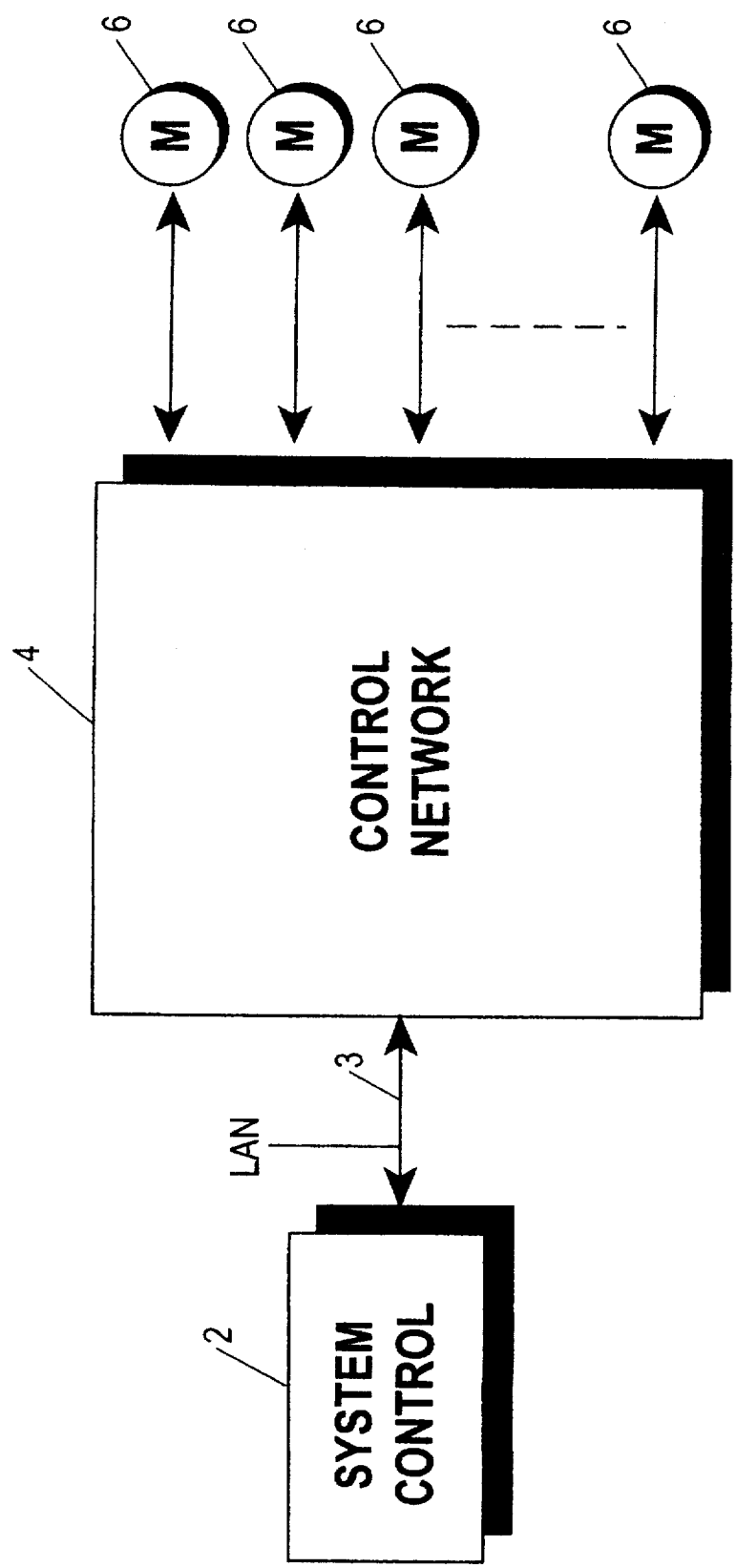
FIG. 1A is a schematic block diagram of a control system of the invention.

FIG. 1A shows a block diagram of a control system of the invention, the control system including a central controller 2 coupled by a LAN 3 to a control network 4 which in turn is coupled to a plurality of electric loads such as motors 6. As will be explained below, the network 4 includes a number of driver devices which are selectively coupled to control the motors 6. The LAN 3 may be of a normal commercially available type such as an ethernet.

FIGS. 2, 2A, 2B and 2C illustrates in more detail a complete control path which is established between the central controller 2 and one of the motors 6 in a typical control system where there is a variable speed drive (VSD) 10 and axis controllers 8. In the control system of the invention there is no permanently connected control path between the motors 6 and the VSDs 10 but temporary connections are established as required by the control network 4 and controller 2. The temporary control path however has the same or similar control elements as the complete control path shown in FIGS. 2, 2A, 2B and 2C.

The complete control path of FIGS. 2, 2A, 2B and 2C includes an axis controller 8 which is coupled to the central controller 2. The axis controller 8 has a termination panel 12 which is coupled to the VSD 10. Output lines 14 from the VSD 10 are coupled to the motor 6 via a switch matrix 28 which forms part of the control network 4 as will be described in more detail below. In the ideal system described above the matrix 28 would not be necessary.

The matrix 28 may be a single, double or other type of matrix as explained below. FIGS. 3 to 14 are concerned with a single matrix embodiment and FIGS. 15 to 22B are concerned with a dual-matrix embodiment.

The motor 6 may comprise a three phase motor. The motor 6 includes an encoder or resolver 16 which provides velocity feedback signals to the VSD 10 through the matrix 28. A position (or velocity) encoder 18 is also mounted on the motor shaft so as to provide encoded positional (velocity) signals to the axis controller 8 through the matrix 28 and termination panel 12. Various safety limit switches 20 associated with the motor or the equipment which is moved by the motor are provided to generate safety signals which again are coupled to the axis controller 8 via the termination panel 12.

An AC supply 22 is coupled to the VSD 10 via filters 23, fuses 25 and contacts 27. When the motor 6 is to be operated, the control system closes the contacts 27. The VSD 10 provides controlled voltages and/or currents on its output terminals U, V and W appropriate for maintaining a controlled speed and direction of rotation of the motor 6. The axis controller 8 provides input signals to the VSD 10 so as to control such things as the rate of acceleration of rotor speed, maximum constant rotational velocity of the motor, the duration of the period for which constant rotational speed is maintained and the rate of deceleration. These control parameters are important to provide a smooth non-jerky movement of the motor and the equipment coupled thereto. The central controller 2 provides overall control necessary for determining the required sequence of movement of stage equipment such as selecting which motors are to be operated, control of final position of motors, etc. In the illustrated arrangement, a brake 40 is provided to stop rotational movement of the motor 6. It is preferred that the brake is operated in a fail safe way, that is to say it will be applied by means of a spring when power is lost to the brake.

Figure 1B:
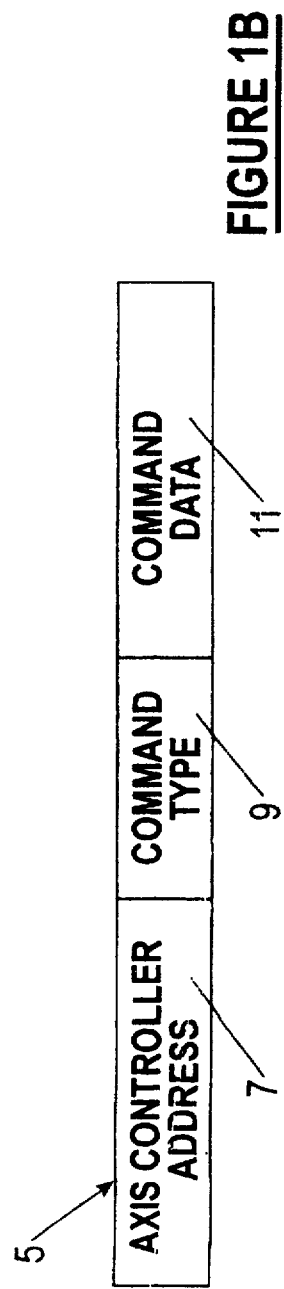
FIG. 1B shows a signal packet generated by the central controller.
Figure 2:
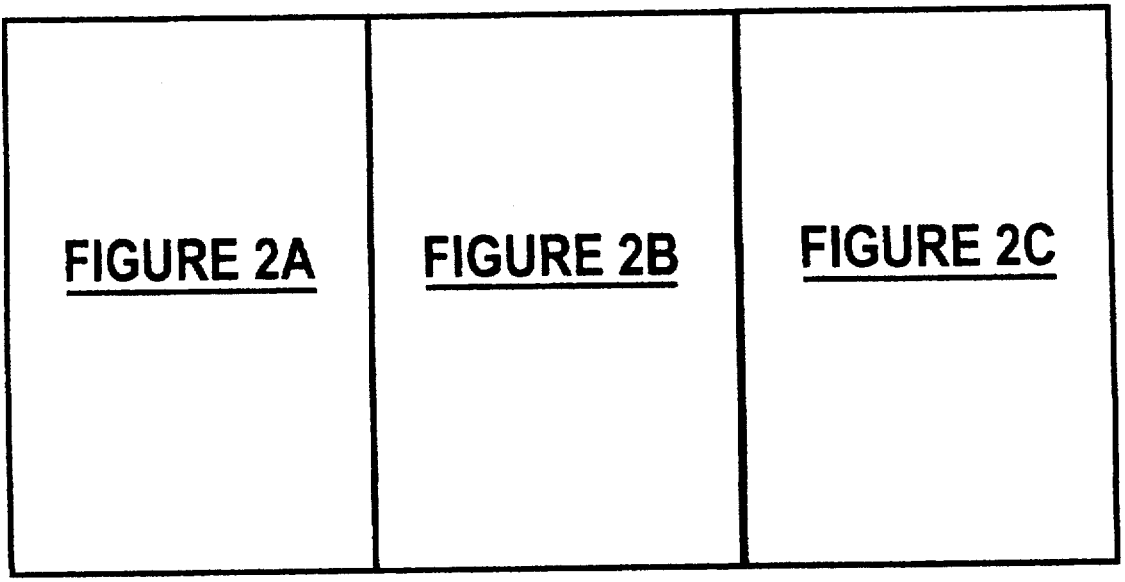
FIGS. 2, 2A, 2B and 2C shows in more detail a typical control system for a theatrical winch motor.
Figure 2A:
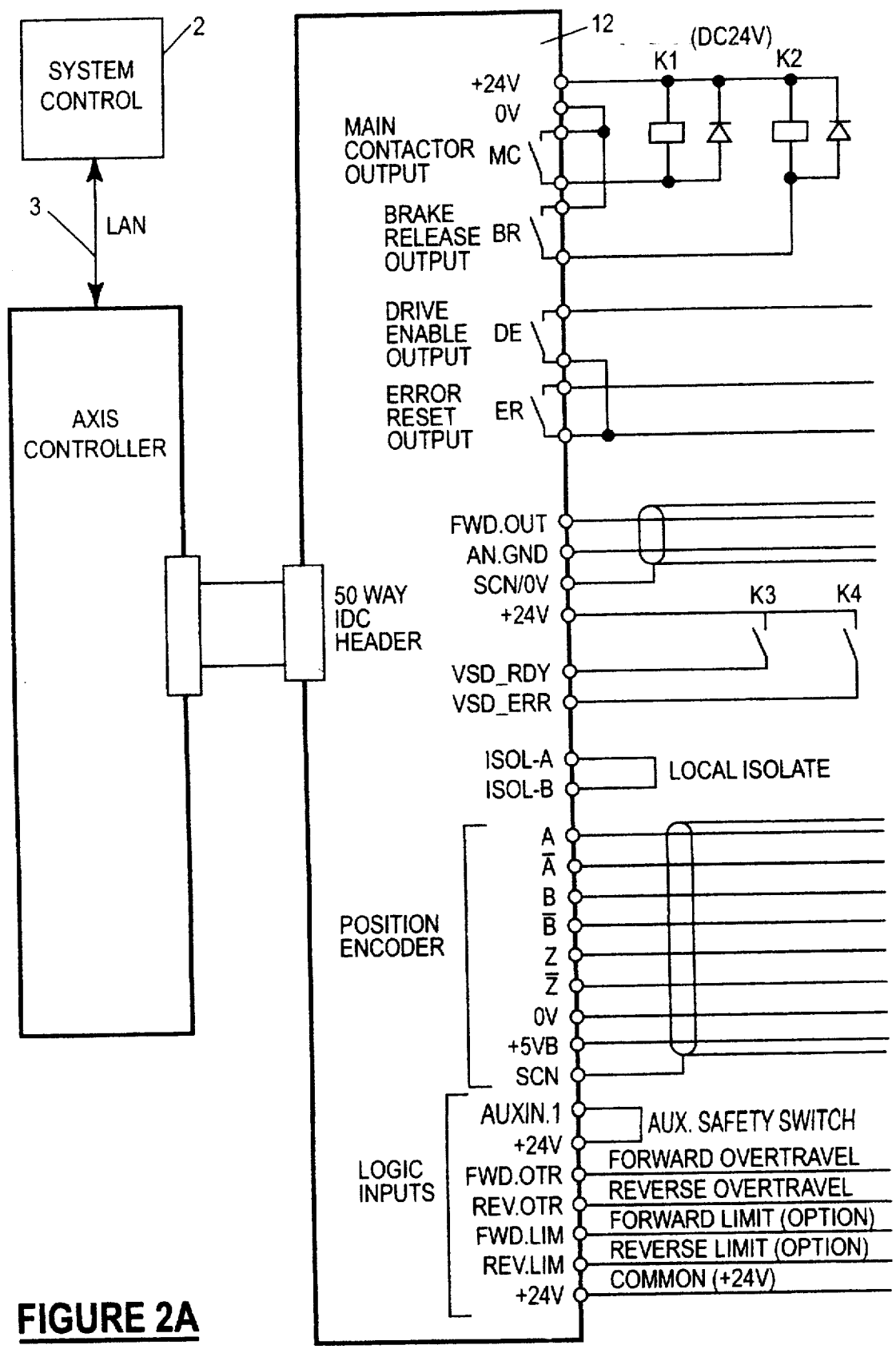
Figure 2B:
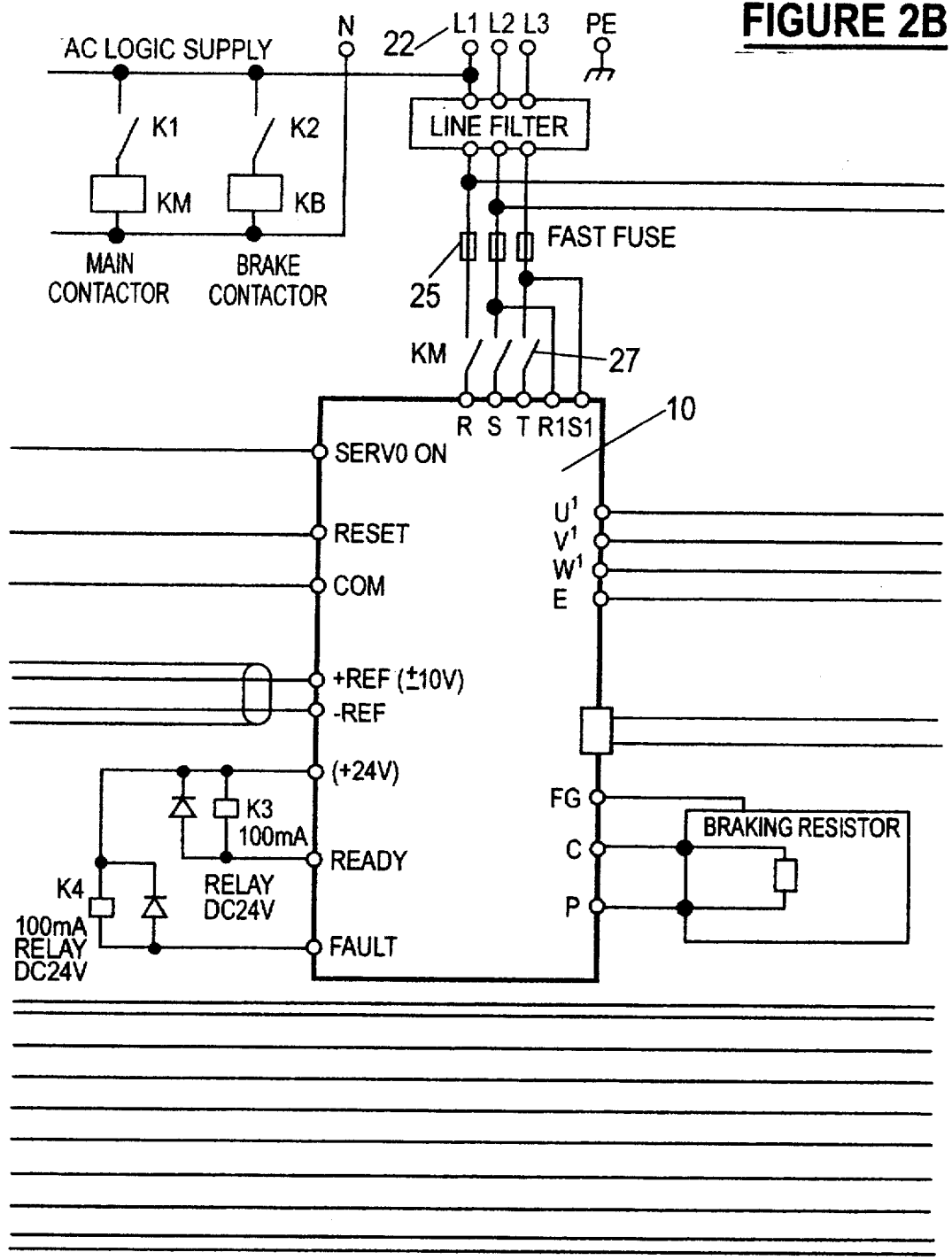
Figure 2C:
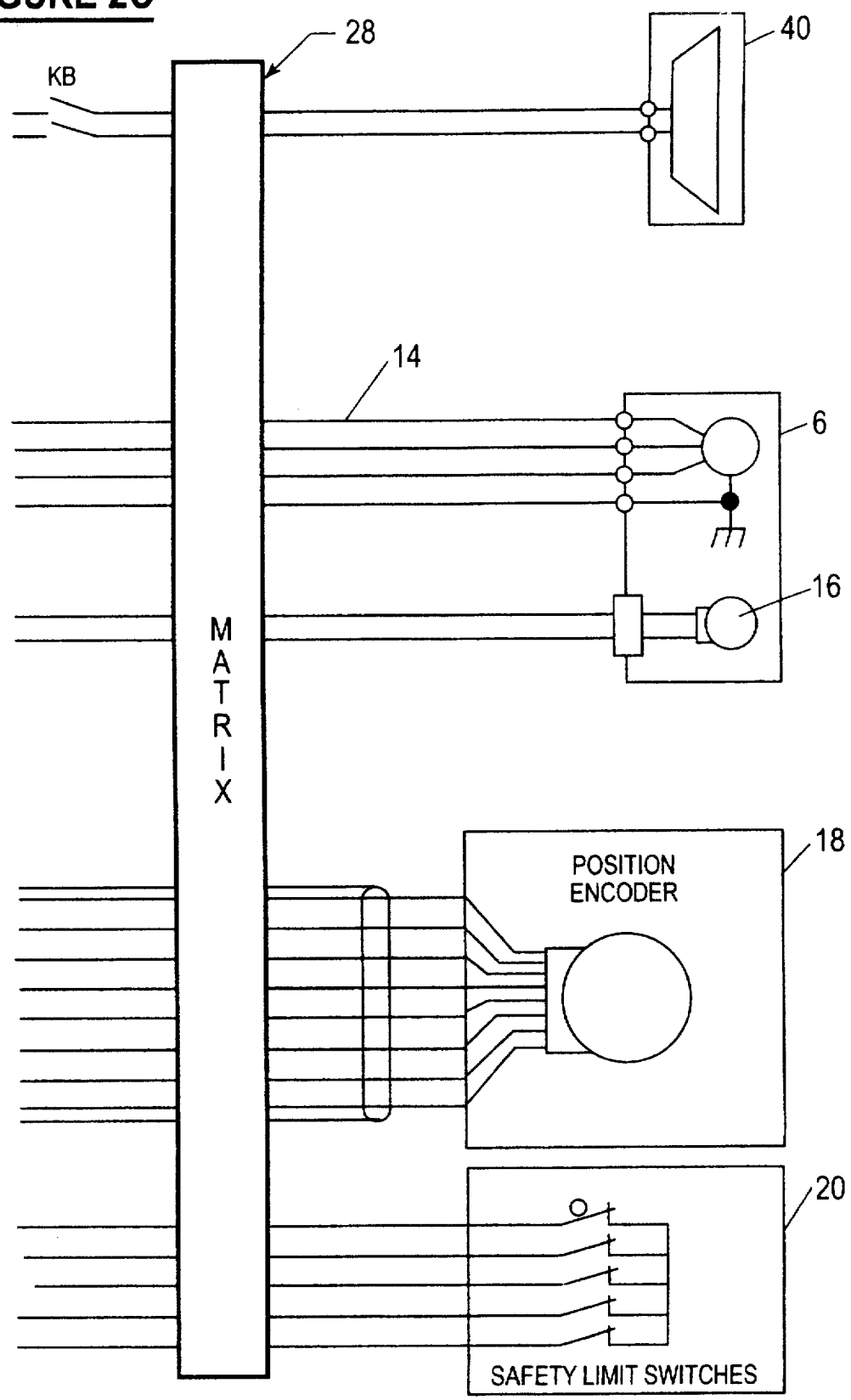

Generally speaking control systems of the type shown in FIGS. 2, 2A, 2B and 2C are well known and commercially available and therefore need not be described in detail. For instance, the controller 2 may comprise a Bytecraft .STATE 3. SYSCON (Product No. 811-060), the axis controller 8 may comprise WINCON 3 (No. 811-046) and the VSD 10 may comprise ABB (Model ACS-600) or a SIEMENS drive. The Bytecraft products referred to above may incorporate software and hardware elements of the LAN 3. It also includes an interface to deal with additional signals for communication with the matrix 28. The present invention is primarily concerned with the architecture of the matrix 28 which operates to establish control paths which include an axis controller 8, VSD 10 and motor 6, in an installation where there are a lesser number of axis controllers 8 and VSDs 10 compared with the number of motors 6. The central controller 2 is arranged to generate signal packets 5 of the type illustrated diagrammatically in FIG. 1B. The signal packets include an address field 7, command type field 9 and command data field 11. The packets 5 are transmitted from the central controller 25 2 via the LAN 3 and are received by the axis controllers 8, as will be described hereinafter. The axis controllers 8 generate communication packages which are sent via the LAN 3 to the central controller 2 containing information relating to the states of the motors 6 to which connections have been made through the matrix 28.

Figure 3:
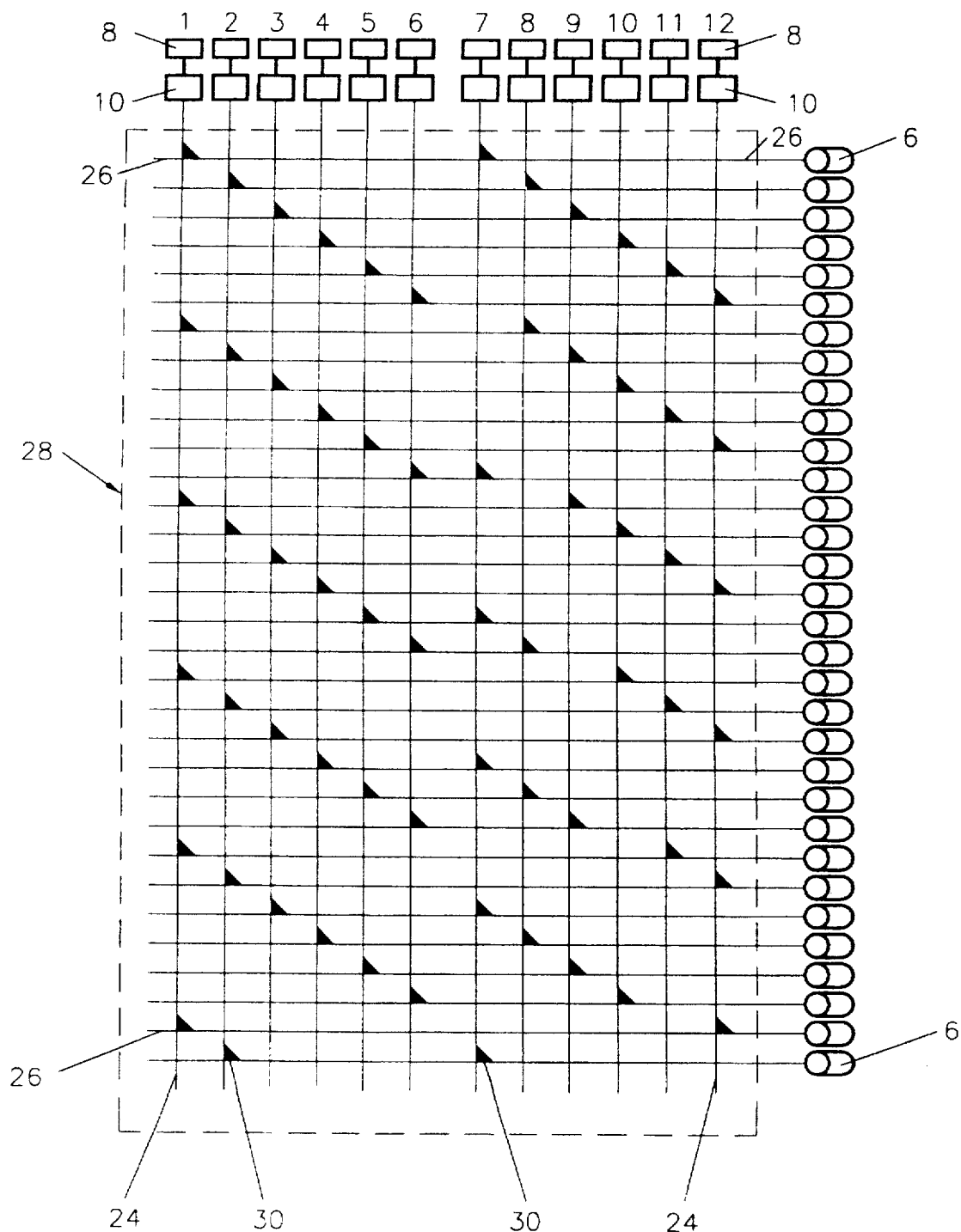
FIG. 3 shows a motor-drive patch matrix of the invention.
Figure 4:
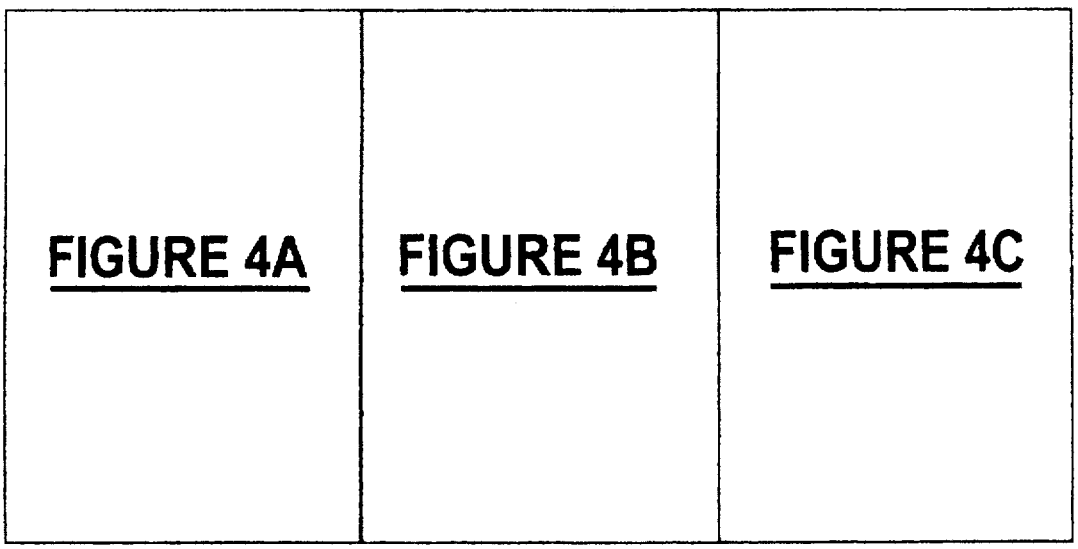
FIG. 4 is a block diagram illustrating part of the control system of the invention.
Figure 4A:
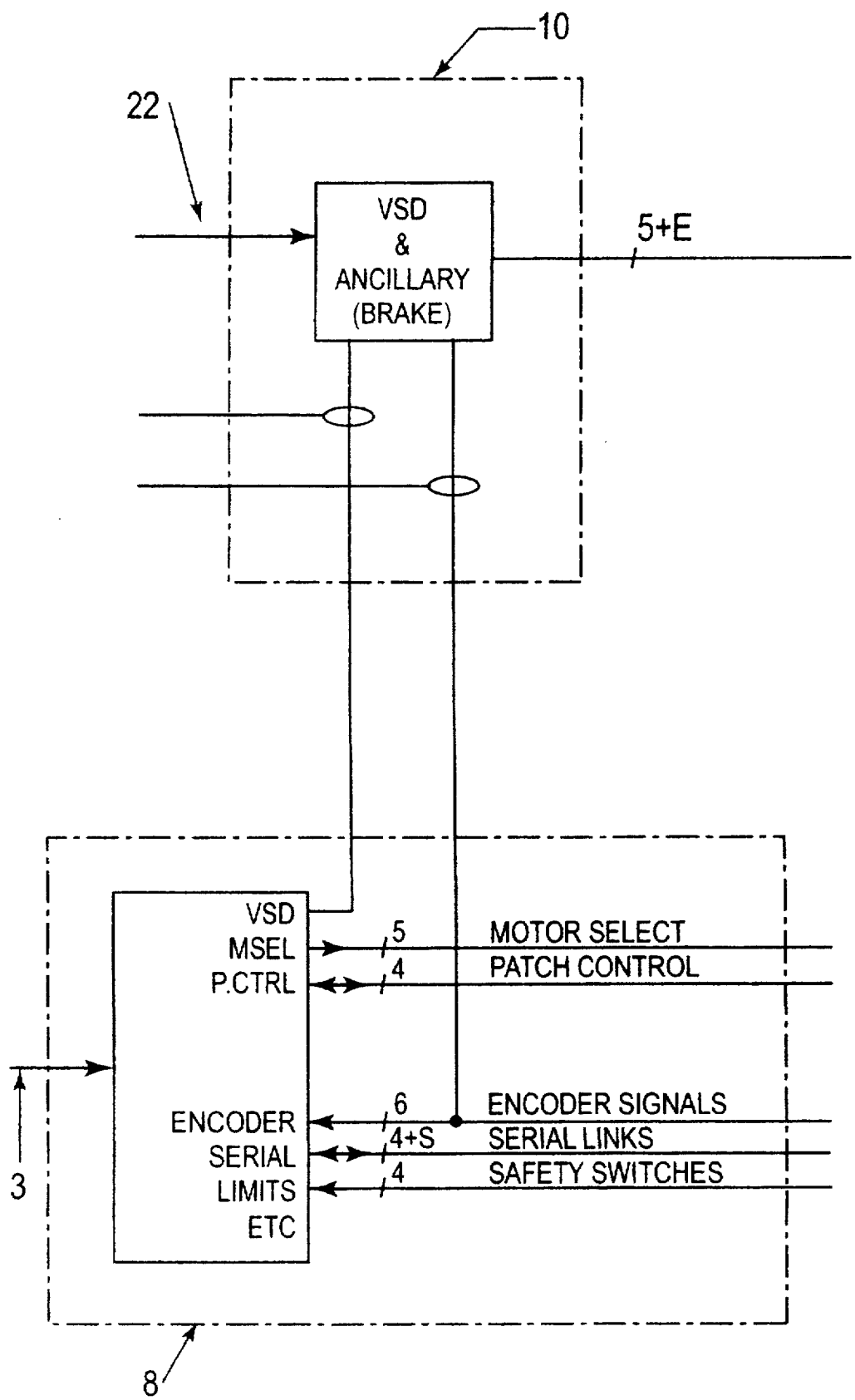
Figure 4B:
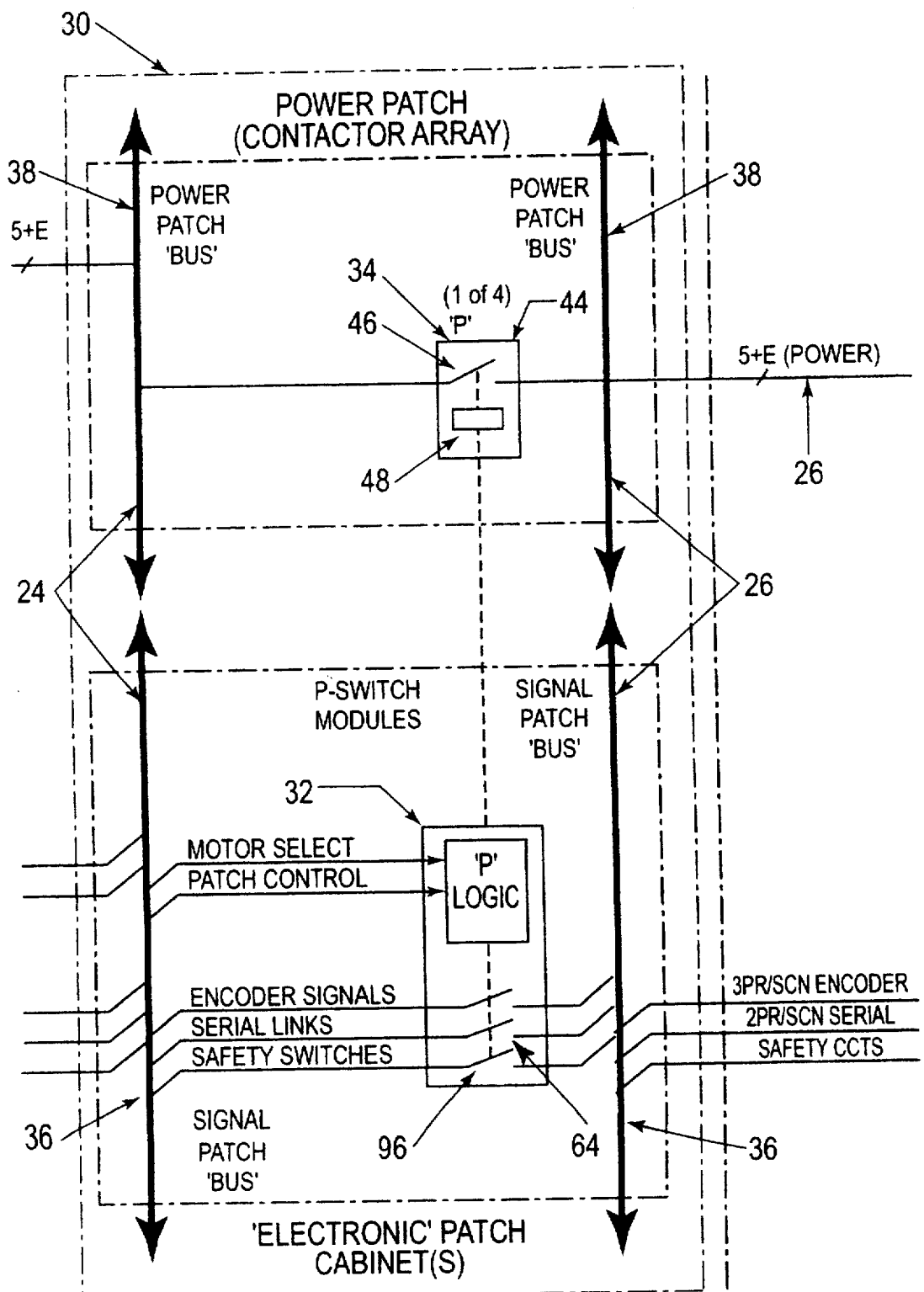
Figure 4C:
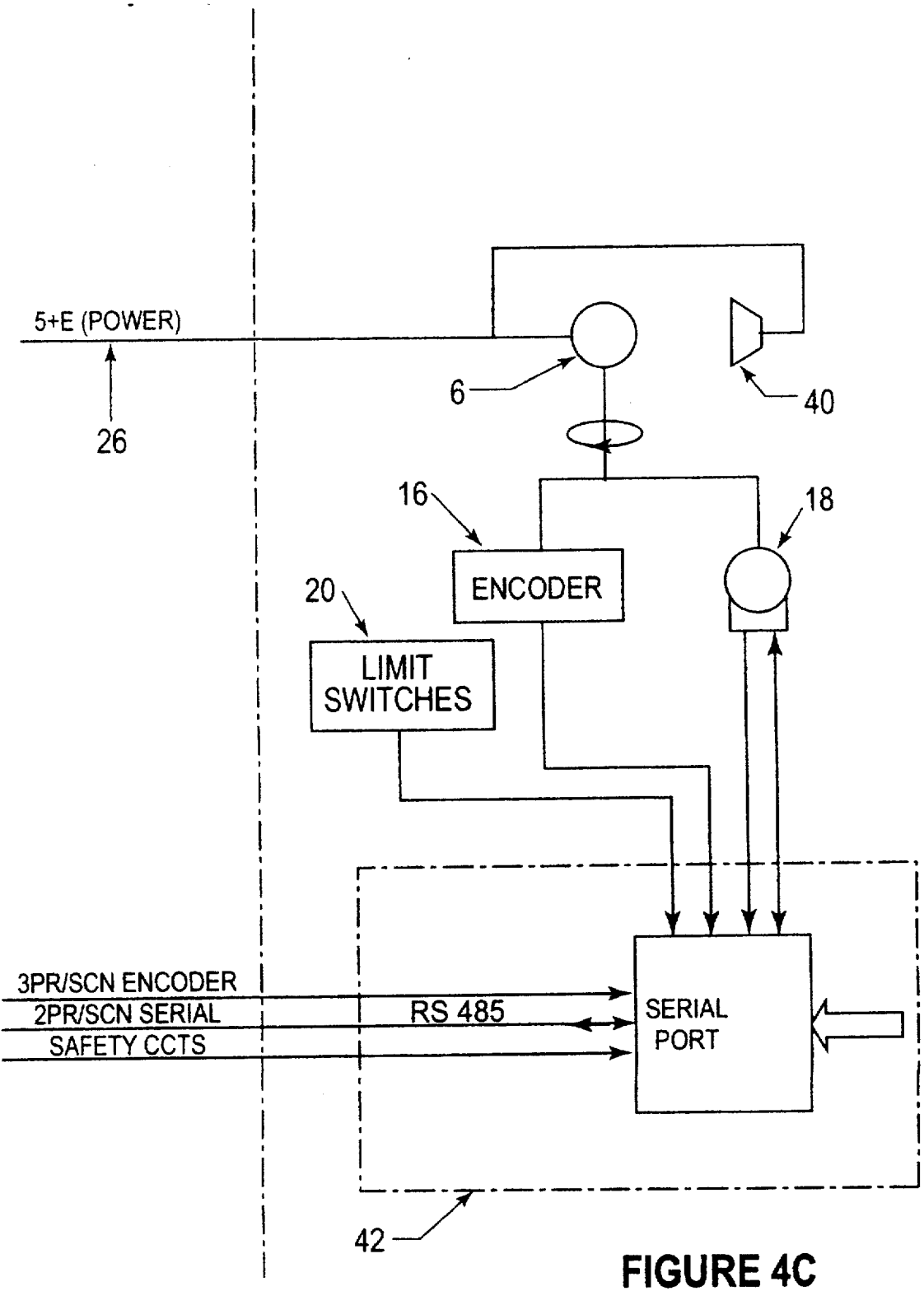

FIG. 3 illustrates diagrammatically part of the network 4 and in particular the switch matrix 28 which is an example of a single matrix configuration. In this arrangement, there are twelve axis controllers 8 each coupled to a respective VSD 10, the VSDs 10 being for controlling thirty-two winch motors 6 which can be connected together by buses which form part of the matrix 28, as will be described below. Each of the axis controllers 8 is coupled to a winch control patch bus 24 represented by columns in the matrix and each of the motors is connected to a motor bus 26 represented by rows in the matrix. The buses 24 and 26 can be regarded as a two dimensional matrix, as shown in FIG. 3, with a selected number of patch switches 30, comprising a signal switch element and a power switch element. In the illustrated example there are two patch switches 30 in each patch module in the motor buses 26. As shown in FIG. 3, each patch switch 30 is coupled in one of the winch control patch buses 24. In the illustrated arrangement, there are five or six of the patch switches 30 provided on each patch bus 24. The patch switches 30 are used to provide interconnections between the winch control patch buses 24 and the motor buses 26. The patch switches 30 can be independently controlled and in practice comprise a number of switches, as will be described below. The number of switches in each motor bus 26 or module can be varied in accordance with control requirements.

The switches 30 are used to provide the connection between the VSDs 10 and the motors 6, it being noted that there is no direct (i.e. permanently established) communication path needed from the central controller 2 directly to the switches 30. It will be appreciated from the foregoing that when a particular motor needs to be operated, it can be coupled through its motor bus 26 and switches 30 to one of two VSDs 10. If one of those VSDs 10 is available, the appropriate coupling is made so that the motor can be operated as required.

Each patch switch 30 itself comprises an electronic patch switch 32 and power patch switch 34, as diagrammatically illustrated in FIGS. 4, 4A, 4B and 4C. Preferably, the signal switching elements 32 common to a motor signal bus 26 are incorporated into one Patch Switch Module. In the example matrix of FIG. 3, there are two (2) switch elements per patch module. The electronic patch switch 32 is concerned with switching control signals whereas the power patch switch 34 is concerned with switching in the heavy current supply lines which are required for the motor 6 and brake 40. The electronic patch switch 32 includes a plurality of electronic switches for switching various control lines and the power patch switch 34 includes a plurality of switches for switching in a number of heavy current lines.

FIGS. 4, 4A, 4B and 4C illustrates in more detail a selected connection between one of the VSDs 10 and its associated axis controller 8 to the motor 6 through the patch switches 32 and 34. The winch control patch bus 24 and the motor bus 26 include signal buses 36 and power buses 38 which are respectively connected to the switches 32 and 34. The signal bus 36 communicates control signals whereas the power bus 38 handles heavier currents required for operation of the motor 6 and brake 40 through the power patch switch 34.

It will also be seen from FIGS. 4, 4A, 4B and 4C that a satellite processor module 42 is provided for each of the motors 6. The satellite module 42 is coupled to monitor the safety switches 20 and the incremental encoder 18 and to provide local storage of data relevant to the motor 6 to which it is coupled. This is important because the axis controllers 8 are shared between the various motors and therefore do not monitor and or store all of this information for the motors to which they could be connected. System security is enhanced by monitoring this data locally at the motor rather than trying to store this information elsewhere for input to the axis controllers 8 when required. Because the functions performed by the satellite module 42 are restricted, it does not need to have powerful processing capabilities.

The power patch switch 34 includes a power relay 44 having contacts 46 and relay coil 48. Operation of the relay coil 48 is controlled by the electronic patch switch 32, as will be described below. It is preferred that the power relay 44 includes seven sets of contacts which are used as follows. Three of the contacts are used for three-phase power to the motor 6, another two are used for single phase power to the brake 40 and two further auxiliary (low current) contacts are used for providing status signals which indicate when the patch switch or patch bus 24 to which the switch 30 is connected is being operated, as will be described in more detail below.

Figure 5:
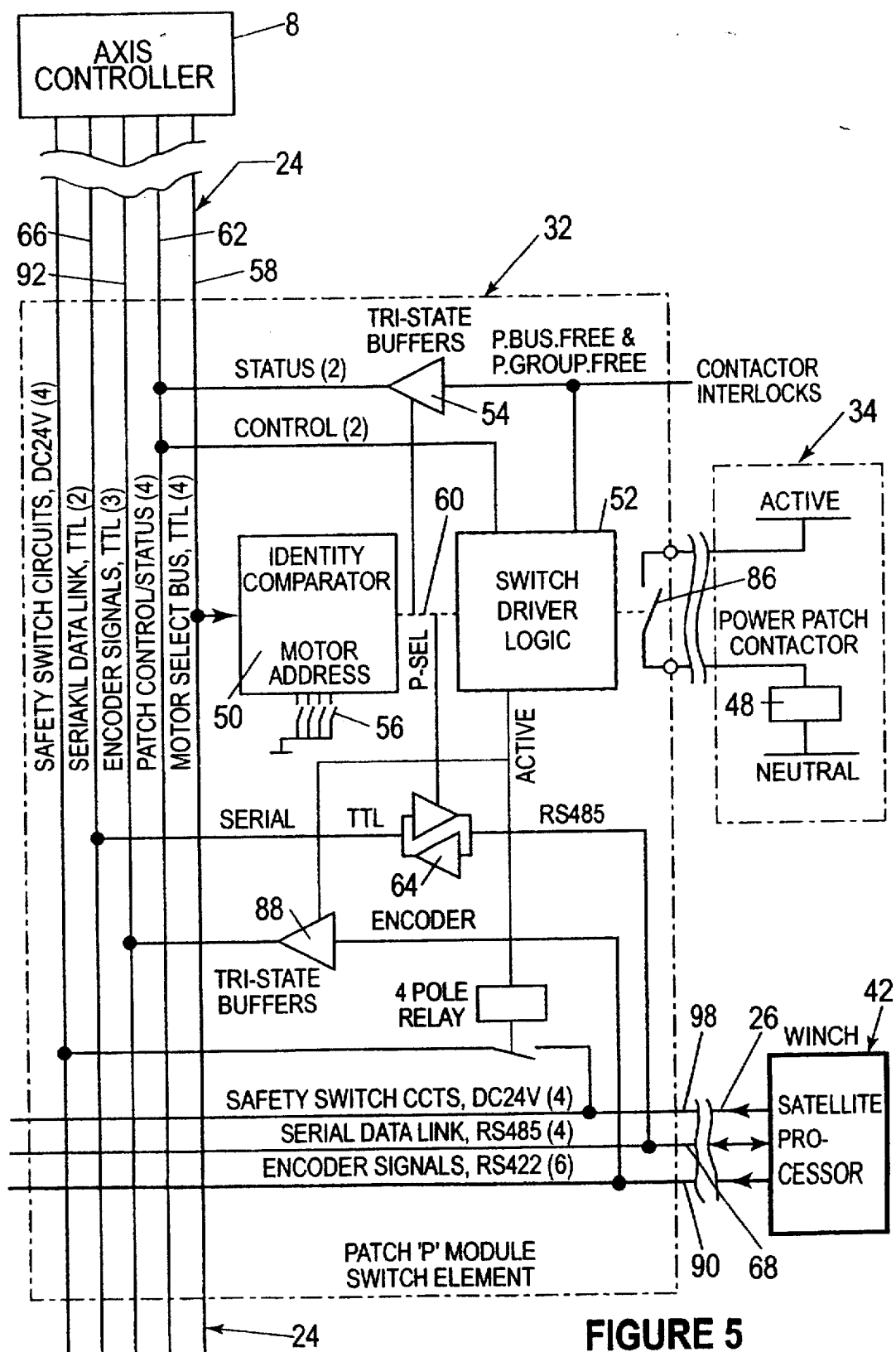
FIG. 5 is a block diagram showing in more detail an electronic patch switch element.
Figure 6:
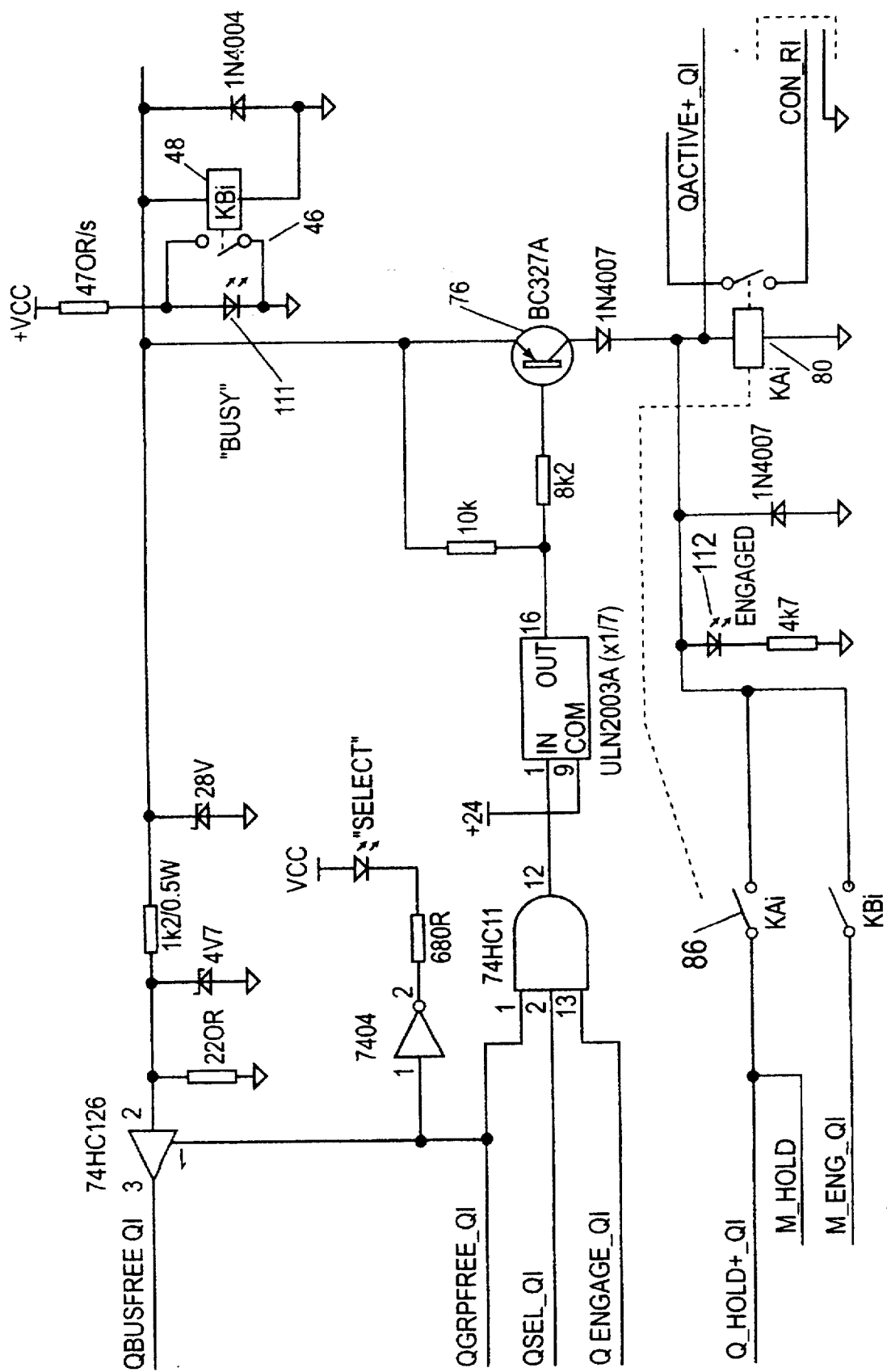
FIG. 6 is a block diagram schematically showing the matrix switch logic circuitry.

FIGS. 5, 6, 7, 7A and 7B illustrate in more detail the signal patch switch 32, or parts thereof. Each switch element 32 includes an identity comparator 50, a contactor driver logic circuit 52, tri-state buffers 54 and relay contacts which allow signals to be selectively coupled between the winch control patch bus 24 and the motor bus 26. The switch 32 includes a DIP switch 56 which can be set so as to define a unique address for each patch switch 30 on a given winch control bus 24. In the illustrated arrangement, the address may be a digital number in the range 0 to 31. The axis controller 8 generates the address signal for a motor select bus 58, which forms part of the bus 24, when a particular motor is to be activated. More specifically, the central controller 2 defines which of the motors 6 is to be used and the axis controller 8 receives appropriate information from the central controller 2 and operates to translate this into the address signal for inputting to its motor select bus 58. When the identity comparator 50 detects a match with the address on the motor select bus 58 it generates on its output 60 a P_SEL signal. The P_SEL signal is coupled to the input of the contactor driver logic circuit 52 and other switch components as will be described below. When a patch switch 32 is selected, a serial data link 68 is connected between the axis controller 8 and the satellite processor module 42 associated with the selected motor 6. In this way, the status of any motor, bus 24 or 26, electronic patch switch 32, can be monitored by the axis controllers 8 without affecting the state of the power patch switches 34. This provides a useful monitoring function which is inherently safe because it can be utilized without changing the state of the switches 34. Moreover, this arrangement enables the absolute position of any motor axis to be read or set by virtue of the serial data links 68 established between the satellite processor modules 42 and the axis controllers 8. As shown in FIG. 5, tri-state buffers 64 are used to interconnect the serial data links 66 and 68 which form part of the buses 24 and 26 respectively. The buffers 64 are coupled to the output 60 of the comparator 50 and are therefore only enabled when the P_SEL signal is present.

During the period when a patch switch 32 is selected, a patch status signal PGRP_FREE is applied to a patch status bus 62 which forms part of the winch control patch bus 24. The PGRP_FREE status signals indicate to the axis controller 8 that power patch contacts 46 forming part of a group common to a motor 6, is energized, as will be described in more detail below.

While a patch switch 32 is selected, it will respond to other control signals from the axis controller 8 to which it is coupled. Also, while it is selected, the serial data communications link to the satellite processor allows the axis controller to monitor the status of the motor. The status information can include the absolute position of the axis of the motor, the state of various safety switches and any other sensors which are connected to the motor's satellite processor 42.

Figure 7A:
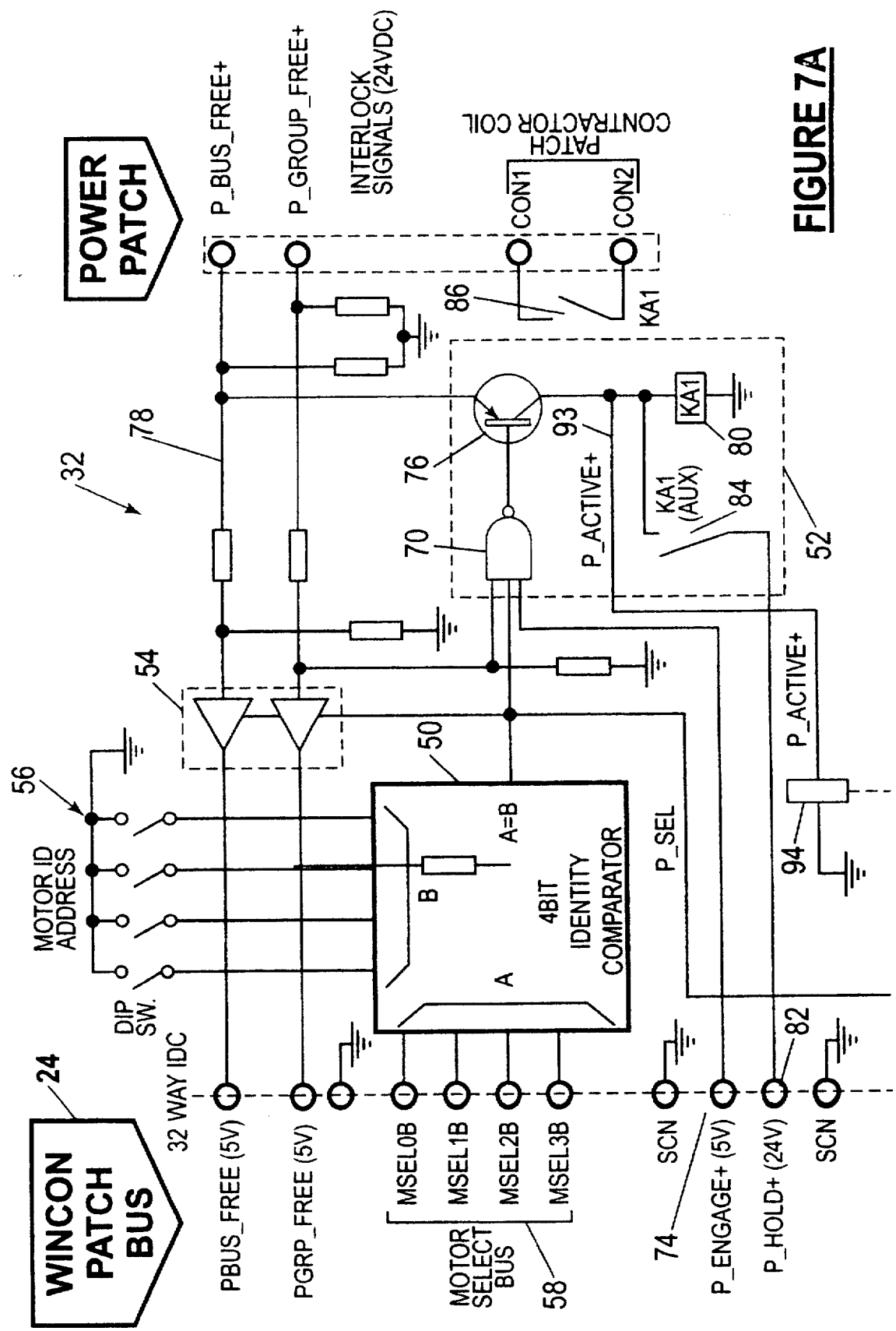
Figure 7B:
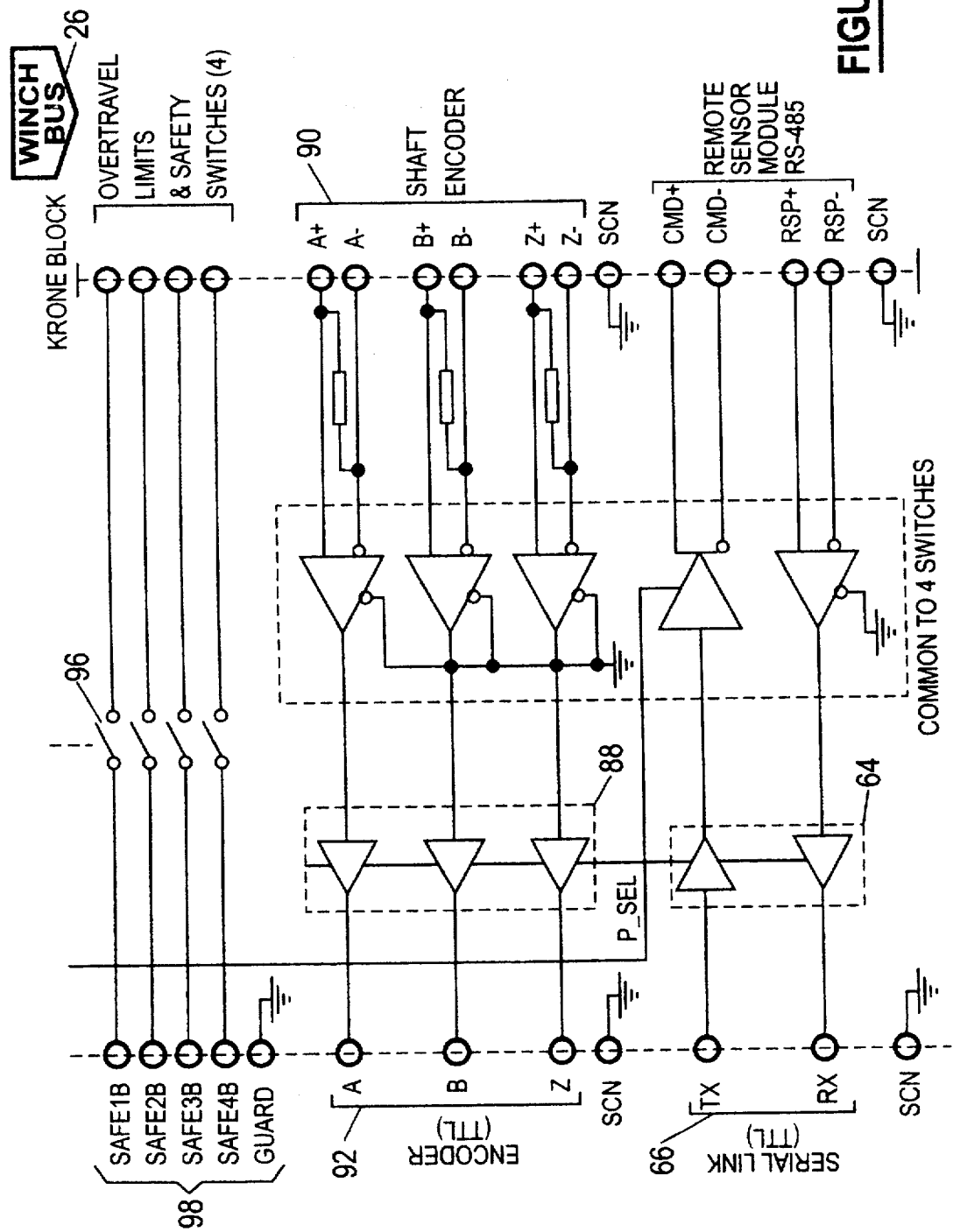

FIGS. 7, 7A and 7B shows the electronic patch switch 32 in more detail. In the illustrated circuit, the contactor driver logic 52 includes a NAND gate 70, one input of which is coupled to the output 60 of the identity comparator 50. Another input of the gate 70 is coupled to a signal line 72 which carries the PGRP_FREE status signal. The final input to the gate 70 is via a signal line 74 which is connected to the bus 24 and carries an engage signal P_ENGAGE which is generated by the axis controller 8 while the patch switch 30 is to be selected. The output of the NAND gate 70 is used to control the base of a relay driver transistor 76, the emitter of which is connected to a control line 78 which in turn is connected to the bus 24. The control line 78 carries status signal PBUS_FREE thereon and is therefore indicative, in the illustrated arrangement, of whether one or other of the two patch switches 34 in a motor bus 26 has been engaged. The power patch interlocks, PBUS_FREE and PGRP_FREE, will only be active (+24V) if no power patch switches 34 have been engaged on the matrix row and matrix column representing the node (switch element 30) selected.

Only when the appropriate signal conditions are present on the three inputs to the NAND gate 70 and the correct PBUS_FREE status signal on the line 78 can the relay driver transistor 76 turn on and so activate a relay coil 80. The axis controller 8 also provides a relay hold signal P_HOLD on control line 82 which is connected to the bus 24. Accordingly, the patch relay coil 80 can be activated only when the appropriate PBUS_FREE, PGRP_FREE signals are present on the motor bus 26 and P_HOLD signals are provided on the bus 24 by the axis controller. When the axis controller provides a pulsed P_ENGAGE signal on line 74 the transistor 76 will turn on and so activate the coil 80. This closes the contacts 84 which operate to keep the coil 80 activated whilst the P_HOLD signal is maintained on the bus 24 by the axis controller.

The patch relay coil 80 includes a second pair of contacts 86 which are used to control the power patch switch 34, as indicated in FIGS. 5, 7, 7A and 7B. The contacts 86 are used to control the power patch relay 44, as shown in FIGS. 4, 4A, 4B and 4C. As mentioned above, in one convenient circuit realization, the relay 44 has seven pairs of contacts, three of which are used for controlling three phase power to the motor 6, one of which is used for controlling single phase power to the brake 40 and the remaining contacts used to generate control signals.

As seen in FIGS. 7, 7A and 7B the switch driver logic 52 also controls tri-state buffers 88 which allow communication of encoder signals from lines 90 and 92 in the buses 24 and 26 respectively. The encoder signals 90 comprise the signals derived from the incremental encoder 18 through the satellite processor module 42, as shown in FIGS. 4, 4A 4B, and 4C. The buffers 88 are only enabled when a P_SEL signal is present which occurs when the patch switch 30 has been activated.

The patch switch 32 also includes a safety switch relay having a coil 94, the contacts of which 96 are provided in four safety switch lines 98. The coil 94 is controlled by the switch driver logic 52 so that it is only closed whilst the switch 30 is activated. More particularly, it will be seen that the coil 94 is coupled to line 93, the arrangement being such that the coil 94 will only operate to close the contacts 96 when the P_ACTIVE signal is present on line 93. When the coil 94 is operated it enables transmission of signals on the safety switch lines 98. The safety switch lines 98 are "hard wired", i.e. relay contacts are employed in the patch switches 30 to connect these signals from the satellite processor module 42 and safety switches 20 to the axis controllers 8. This is inherently safer than arrangements in which the switch circuits are not "hard wired" i.e. which utilize solid-state electronic switching devices. The axis controllers 8 monitor the safety signals independently from processor software and it is essential for the connections to be properly made before operation of the motors can commence. A break in any of these connections will result in the motor being unable to move. Thus the system is fail safe. The safety circuits are therefore independent of all electronic controls (such as those generated by the axis controllers 8) and software in the central controller 2.

Figure 8A:
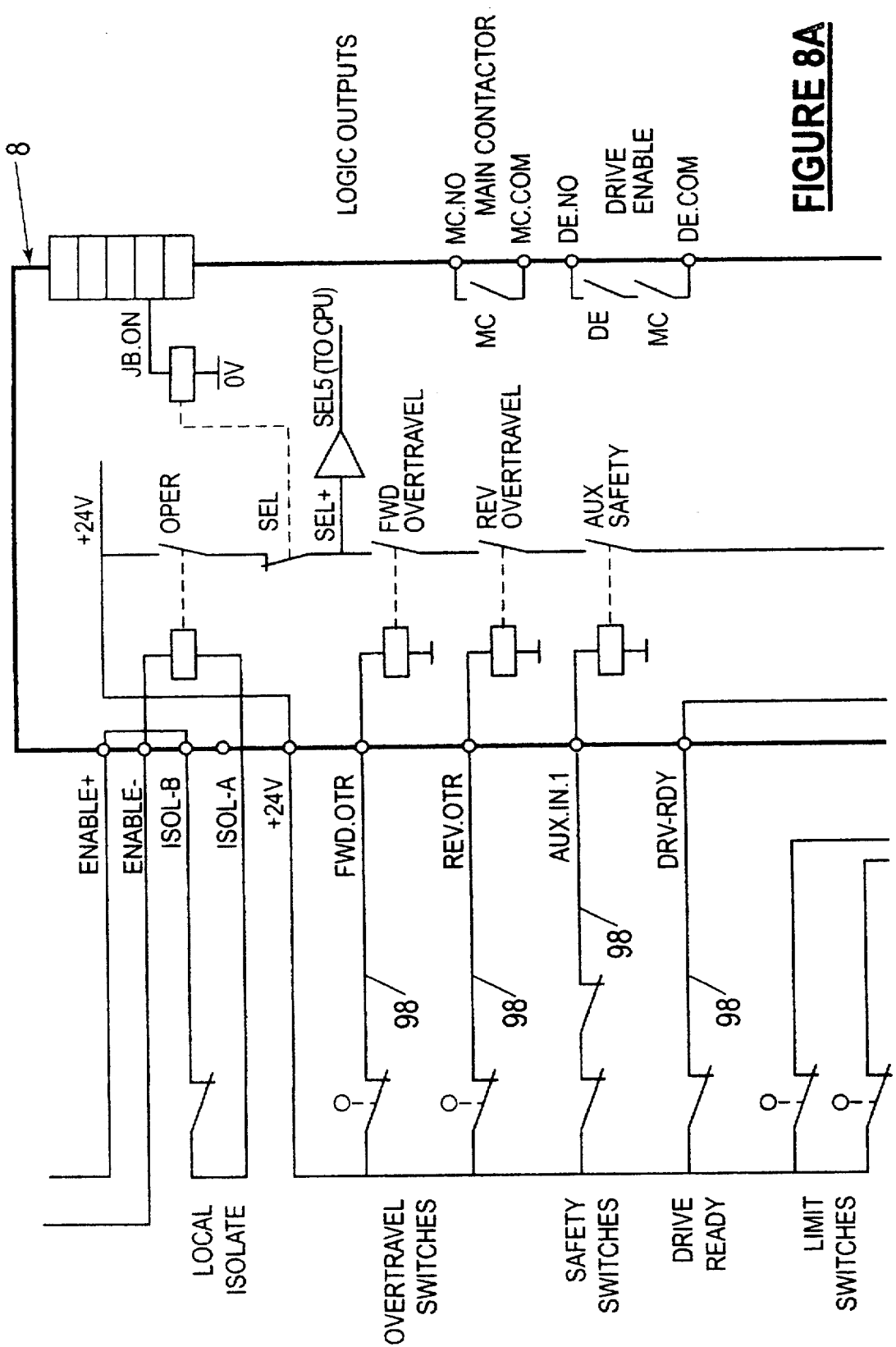
Figure 8B:
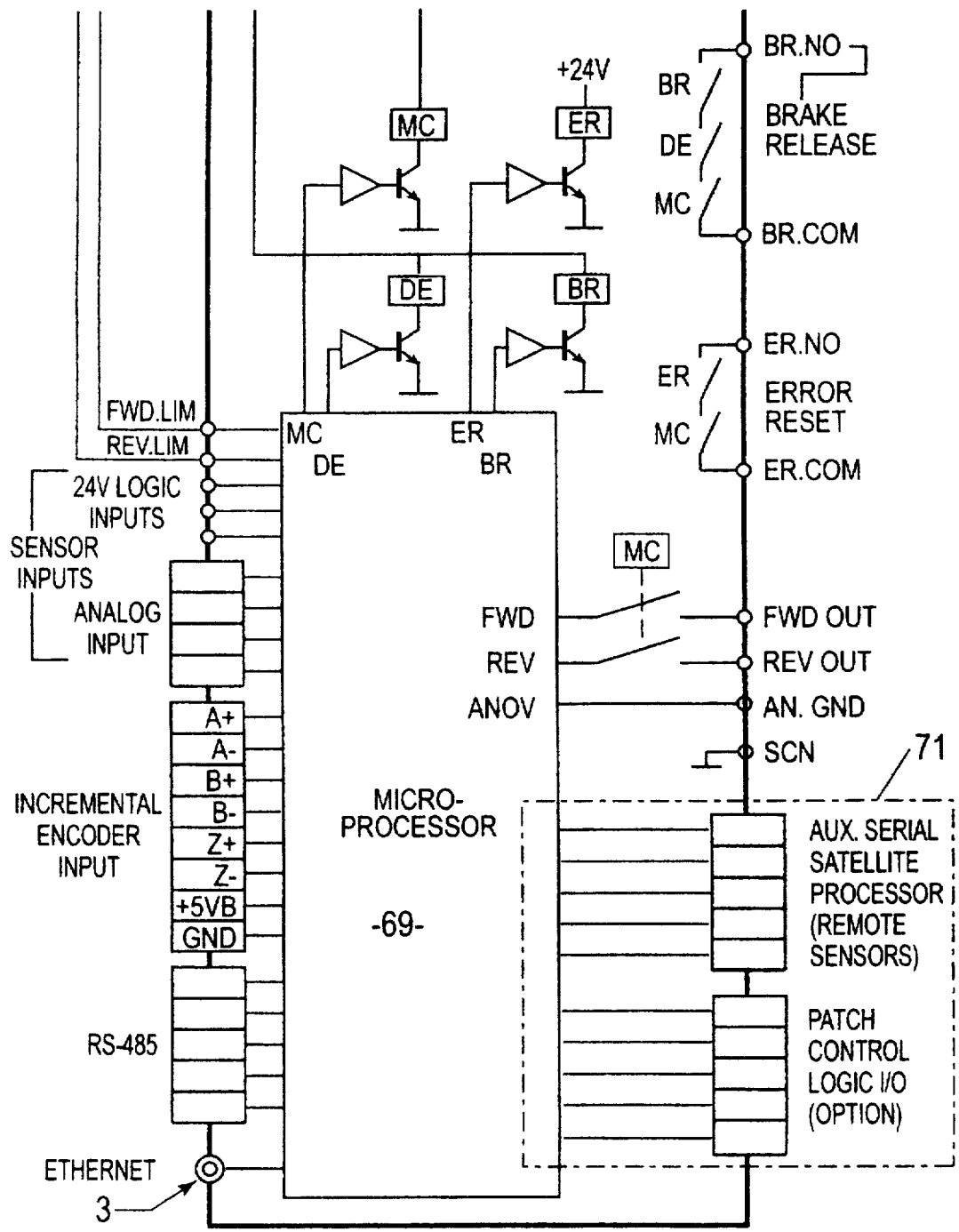
Figure 9:
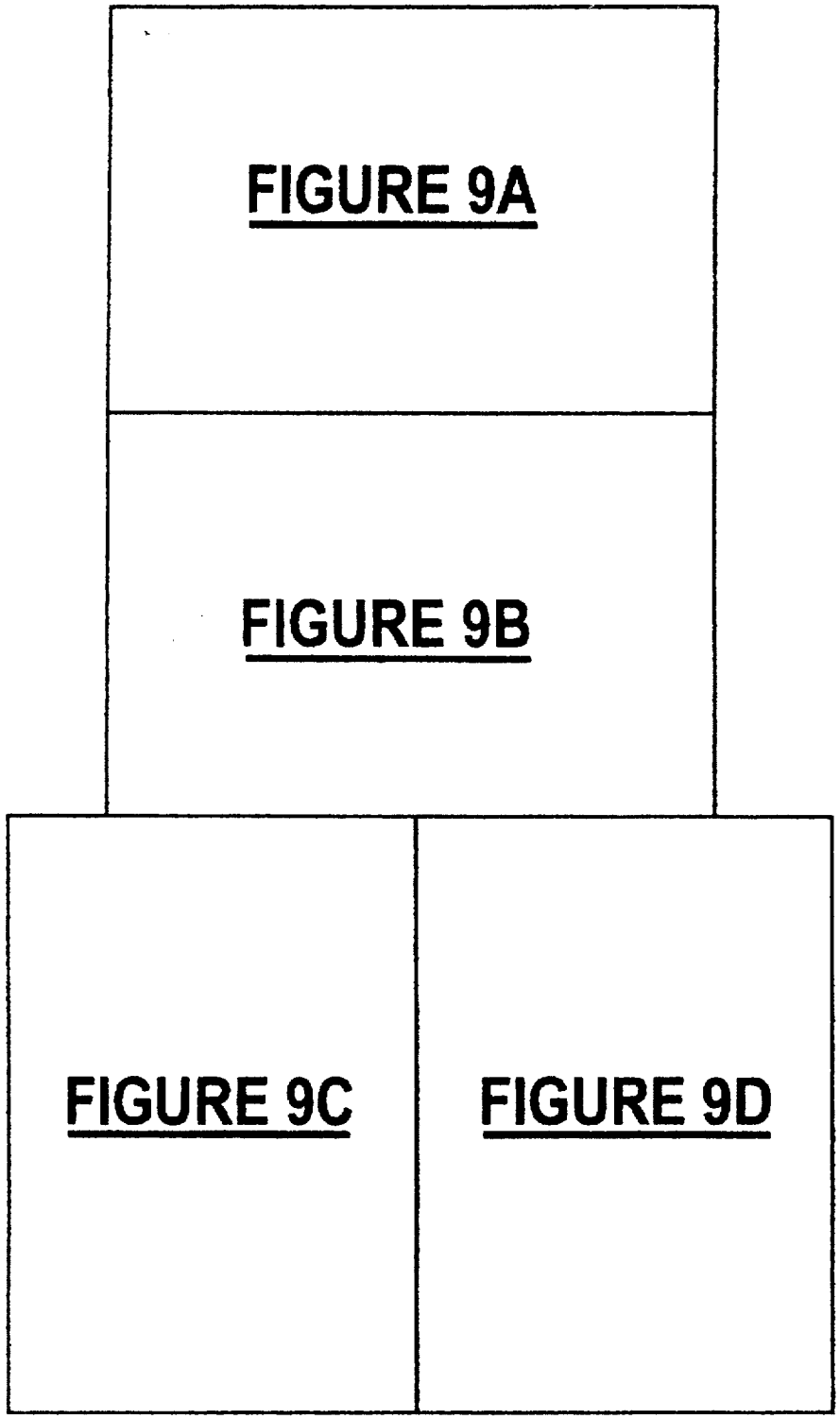
FIG. 9 is a more detailed diagram showing further details of part of the axis controller.
Figure 9A:
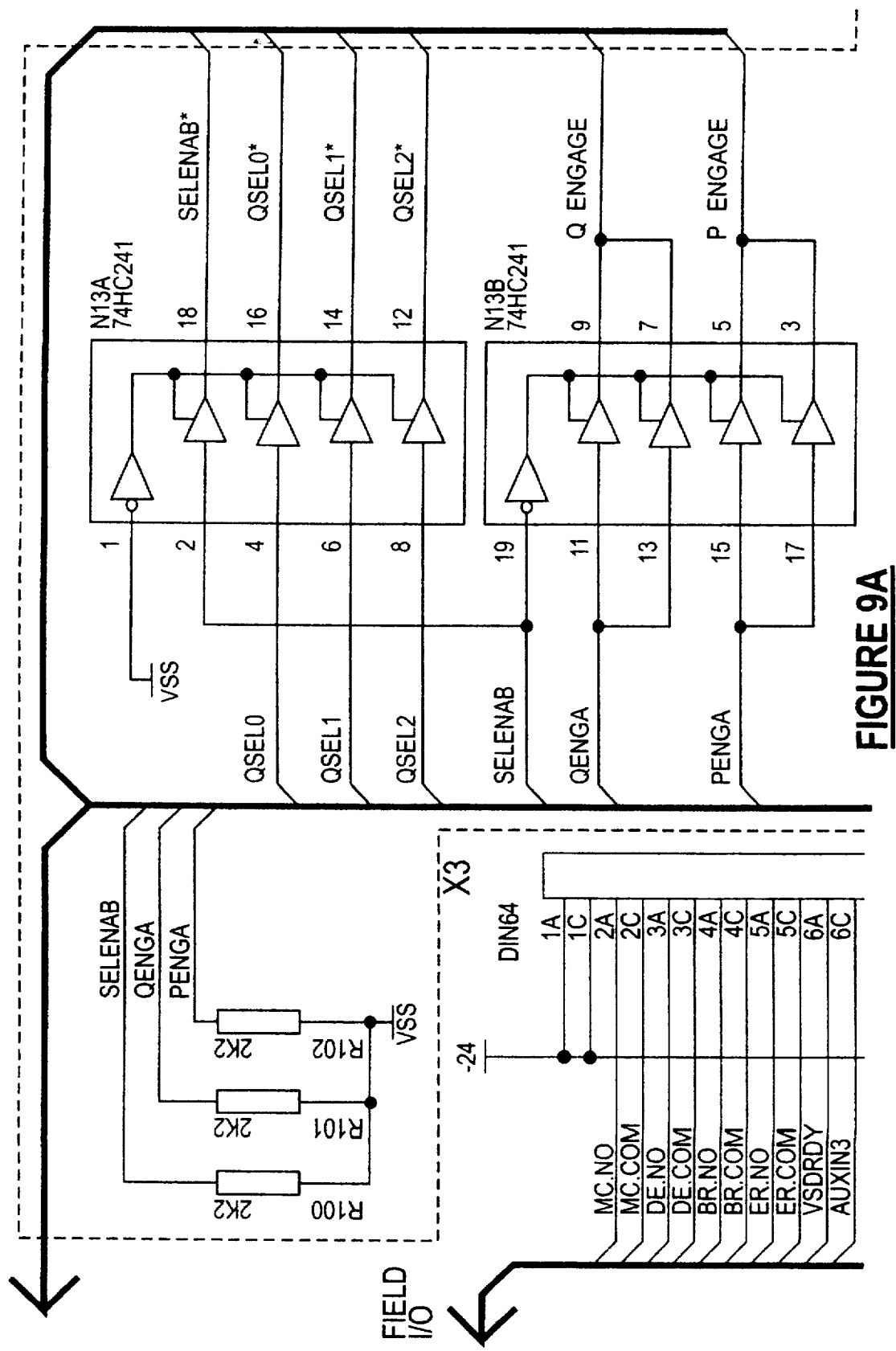
Figure 9B:
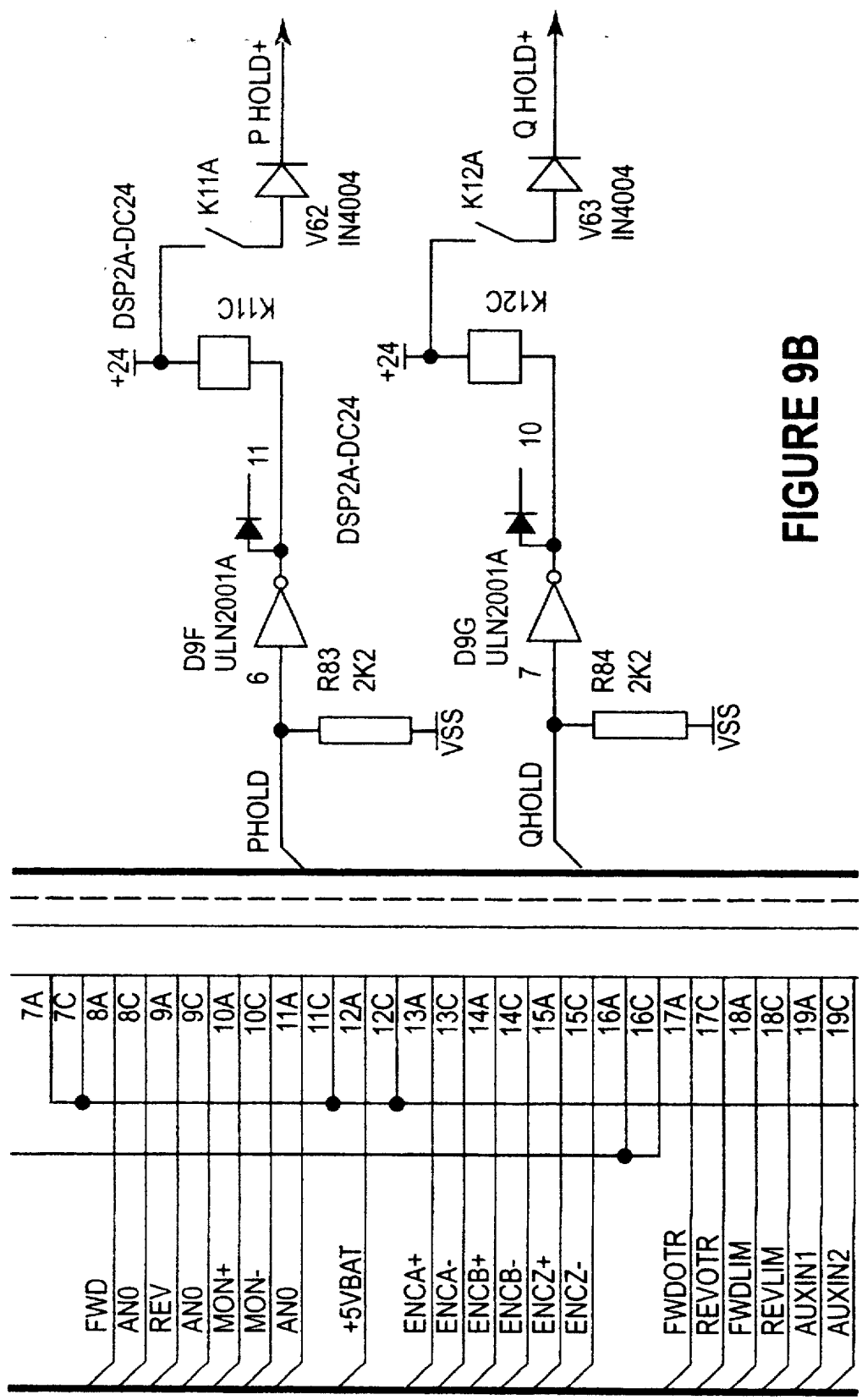
Figure 9C:
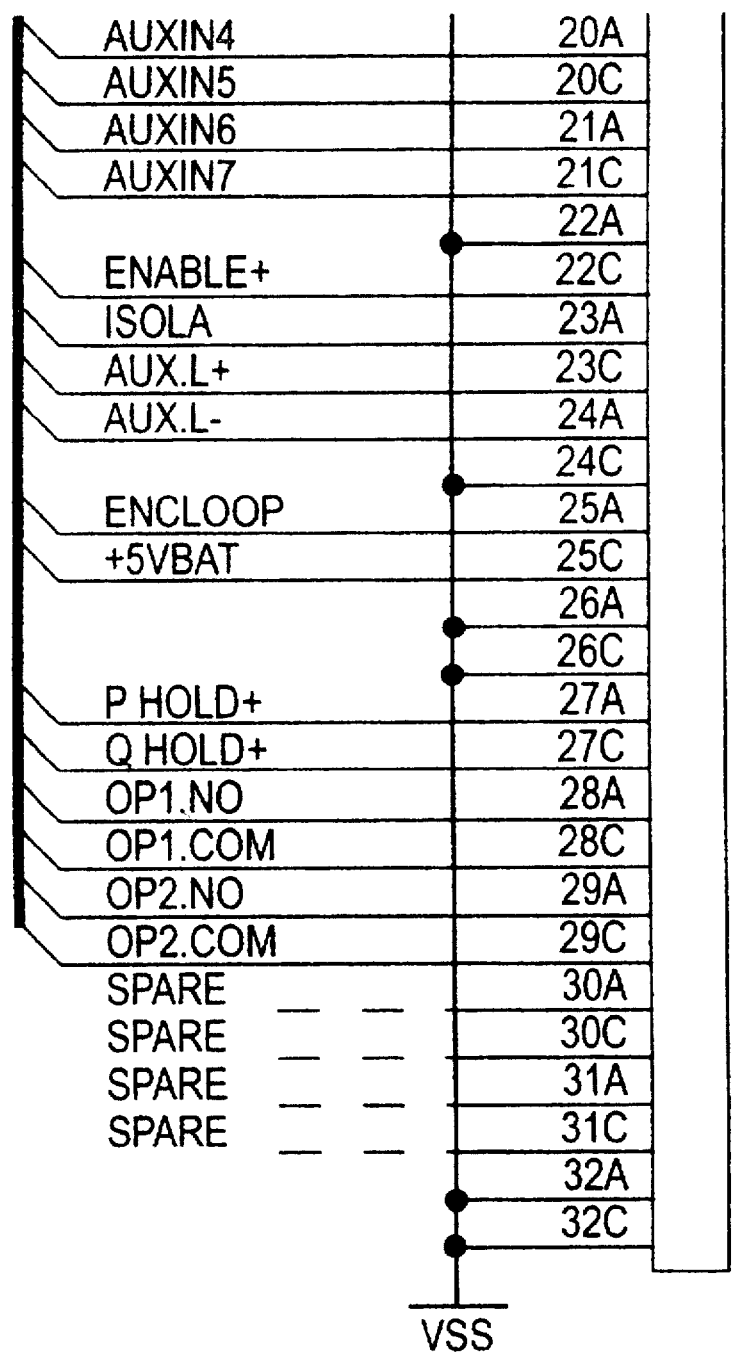
Figure 9D:
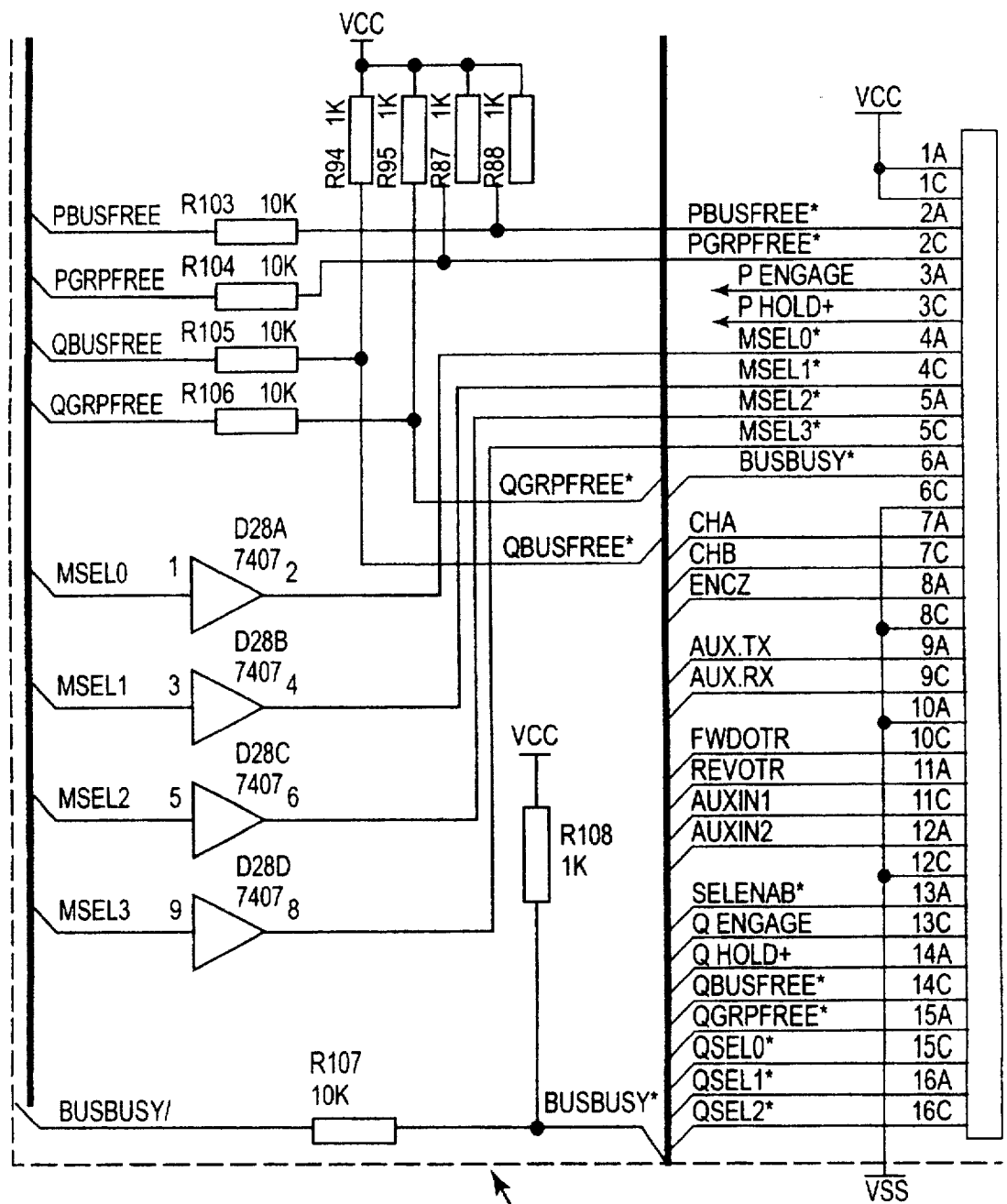

FIGS. 8, 8A, and 8B shows a block diagram of the main circuit components for a typical axis controller 8. Axis controllers are well known in the art and therefore details of this circuit need not be described. Generally speaking, known axis controllers can be utilized in the system of the invention with very little modification. Essentially, the modification requires the addition of interface logic 71 to a microprocessor 69 in the axis controller 8. The axis controller requires additional signal lines in order to provide control signals for the signal matrix 28. FIGS. 9, 9A, 9B, 9C, and 9D diagrammatically shows one implementation for the interface logic 71. The operation of the logic 71 is straightforward and need not be described in detail. The axis controller 8 preferably has a number of additional signal lines through the logic 71 in order to control the matrix. The additional signals will be described later with reference to an example of a dual-matrix embodiment. After receipt of a system controller command packet by the axis controller the microprocessor 69 checks the command type field 9 and also interprets the command data in the field 11. It then generates the appropriate patch switch 30 control signals in accordance with the instructions in data field 11.

FIG. 10 diagrammatically illustrates the satellite processor module 42. The satellite processor 42 includes a microcontroller 73 having inputs coupled to the encoder 18 and safety switches 20 (which may include other sensors such as for sensing other parameters such as over travel of a winch to which the motor is connected, a crossed wire on a winch drum or slack winch wire or the like). The microcontroller 73 communicates with axis controllers 8 via the serial data links 68 and 66 via an RS-485 asynchronous full duplex protocol type link 75. The main function of the satellite processor module 42 is to continuously maintain data relating to the absolute position of the motor axis to which it is coupled. It also monitors safety switches and other sensors fitted to each of the motors and/or winches, independently of the axis controllers 8. The satellite processor modules 42 and the sensors connected to them are preferably powered from a battery-backed power supply 100 so as to avoid problems which might occur if power were temporarily lost to the satellite processor modules 42.

Figure 11:
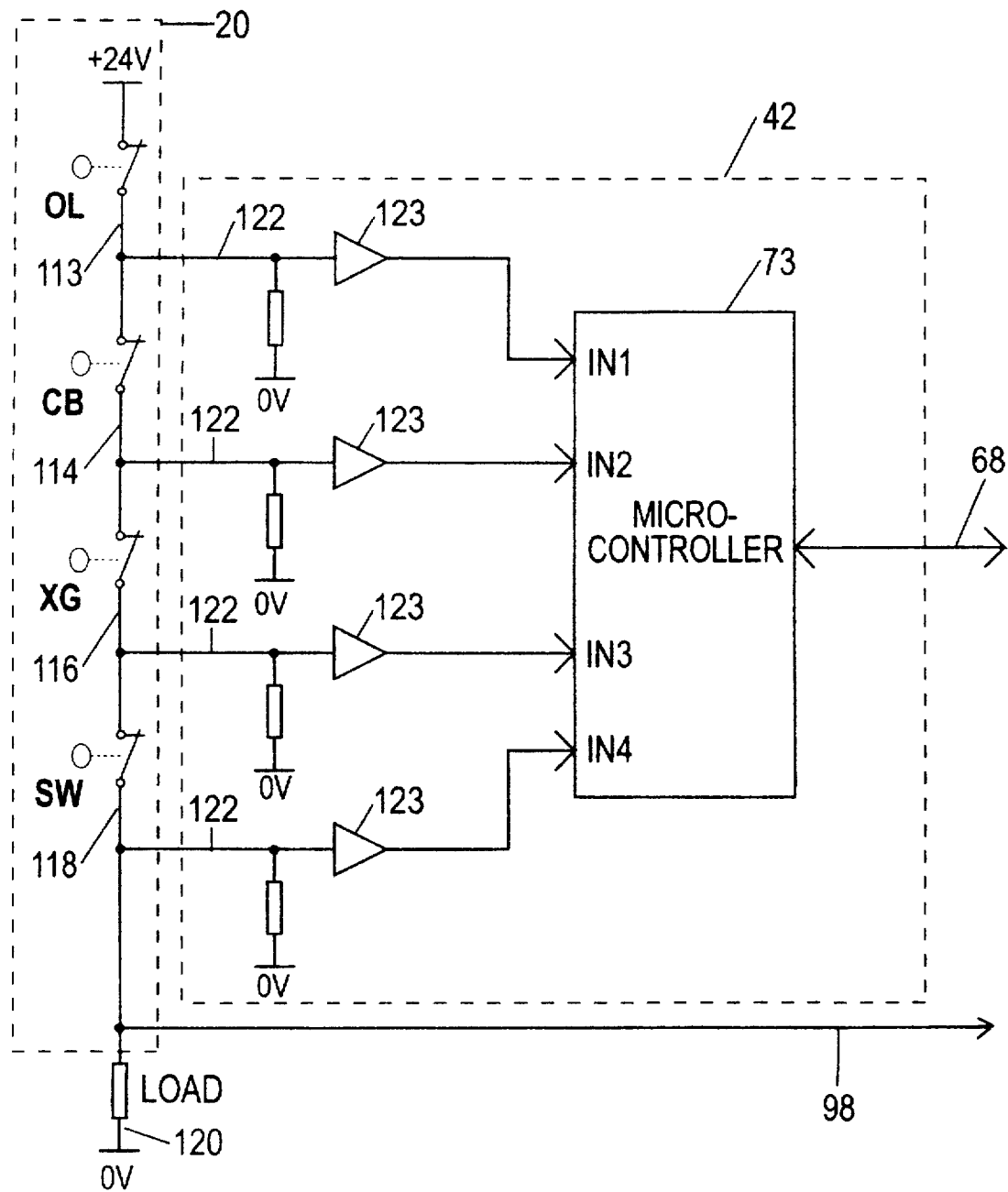
FIG. 11 shows an example of safety switch circuitry.

FIG. 11 diagrammatically illustrates one example of the way in which the safety switches 20 are connected to the microcontroller 73. In this arrangement, four safety switches 113, 114, 116 and 118 are connected in series via a load 120 to a +24V supply. Safety input lines 122 are coupled as inputs to the microcontroller 73 via buffer amplifiers 123. In the normal arrangement, all of the switches are closed and thus all of the logic inputs to the satellite processor are high. If, however, one of the switches opens, the circuit will be broken and the microcontroller 73 will be able to identify which of the switches 113, 114, 116 and 118 has opened. If two or more switches go open at the same time, the microcontroller 73 cannot tell which ones are open but it should always be able to identify which switch opened first. This will enable an operator to rectify the fault which caused the corresponding safety switch being closed. The next switch which remains open can then be identified by the microcontroller 73 and the operator should again be able to rectify the fault. In a typical arrangement, the switch 113 may indicate overload on the winch motor 6, the switch 114 indicates a chain break in a winch, the switch 116 may indicate a "crossed groove" on the winch drum and the switch 118 indicates a slack wire in a winch.

Optionally, the satellite modules 42 may be located in close proximity to their respective motors rather than in say the winch control room where typically the axis controllers 8, VSDs 10 and patch switches 30 would be situated. This has the benefit of reducing the amount of cabling from the control room to the location of the motors.

Figure 12:
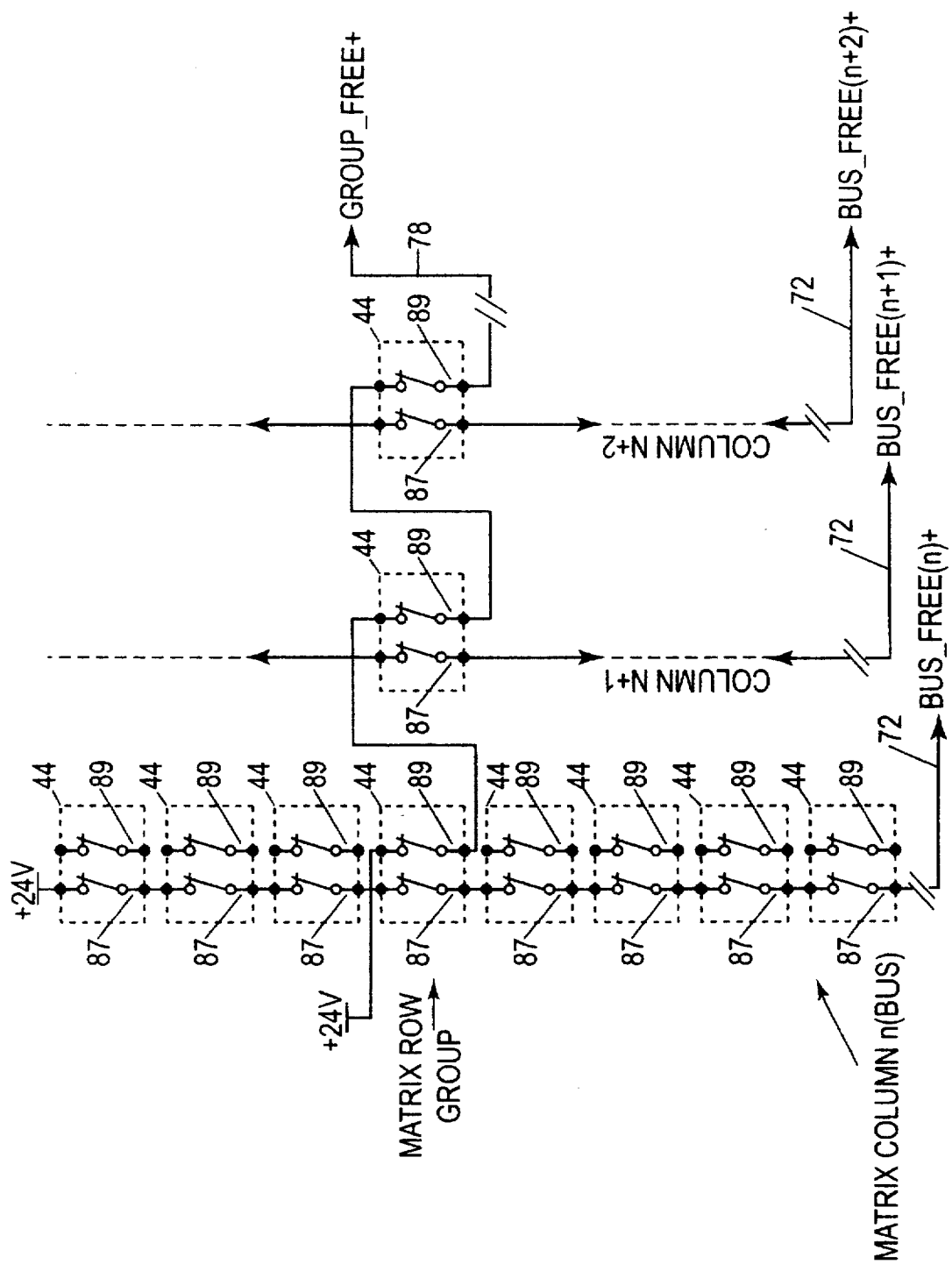
FIG. 12 is a diagrammatic representation of the power patch interlock circuitry.

FIG. 12 diagrammatically illustrates how two further pairs of auxiliary normally closed contacts 87 and 88 of the power patch relays 44 are used to generate the PBUS__FREE and PGRP__FREE signals on the lines 72 and 78. This can conveniently be effected by arranging for the auxiliary contacts of the power patch relays to be of the normally closed type so that when the relay 44 is activated the contacts 87 and 89 will be open. The signal line 78 of the three patch switches 34 common to a matrix row [in either the motor matrix or the drive matrix of a dual-matrix implementation] are effectively connected in series and, when one of the switches of the group has been selected, its contacts in the line 78 will be open and this state indicates that the group is not free. Similarly, the auxiliary contacts in the line 72 of all of the switches 34 common to a matrix column will effectively be connected in series and when one of the switches 30 in the column has been activated, the auxiliary contacts will open and this state indicates that the patch bus 28 is not free.

Thus, the power patch interlocks, PBUS__FREE and PGRP__FREE, will only be true if no power patch contactors are engaged on the matrix row and matrix column representing the node (switch element) selected. As diagrammatically shown in FIG. 12, PBUS__FREE is derived from a series connection of auxiliary contacts of all contactors on the matrix column, i.e. all contactors under the control of a particular axis controller 8. PGRP__FREE is derived from a series connection of auxiliary contacts of all contactors on the matrix row, i.e. all contactors associated with a particular winch motor 6.

In summary, a combination of conditions needs to be satisfied before a power patch switch 30 can be engaged:

(a) The control system power supply (24V DC) must be operating;
(b) The axis controller power supplies (5V and 24V DC) must be operating;
(c) The axis controller must have its P__HOLD signal (24V DC) applied to the bus 24;
(d) The patch switch 32 must be selected via the motor select bus 58;
(e) The correct safety interlock status signals PBUS__FREE, and PGRP__FREE must both be present on the lines 78 and 72; and
(f) The axis controller must pulse the P__ENGAGE signal on patch bus for coupling to the line 74.

The patch switches may, optionally, be operated manually, i.e. without involving the axis controller logic. FIG. 13 diagrammatically illustrates one circuit arrangement for connecting the operator control switches 108 and 109 which are used during manual operation. It will be noted that the engage switch 108 is connected in series with interlock contacts 124 which are controlled by an interlock relay 126. The interlock relay 126 is powered from the line 78 which carries the PGRP__FREE signal. This provides a safety interlock because the engage switch 108 will not be operative unless the PGRP__FREE signal on line 78 is present, thereby providing safety interlock even during the manual operation. The arrangement includes a switch 128 which may comprise a rotary or thumb wheel selector for selection of the desired patch bus to be engaged.

FIG. 14 diagrammatically illustrates a front panel 102 for an axis controller 8. It will be seen that the panel includes indicating lamps 104 for indicating the state of various signal parameters. It also includes an ethernet connector 105 for coupling to the LAN 3.

The principles of the invention are applicable to dual-matrix systems. Examples of the dual-matrix systems will now be described with reference to FIGS. 15 to 22B. In the single matrix example described above, a patch single switch closure on a matrix node will connect a winch motor to a VSD 10. The performance/cost ratio of a patch system can be dramatically improved by extending the concept to the dual-matrix configuration.

FIG. 15A diagrammatically illustrates the power switching part of a dual-matrix configuration in which there is a motor switch matrix 127 and a drive switch matrix 129. The dual-matrix configuration can be arranged to provide appropriate connections between the axis controllers 8 and the VSDs 10 and the motors 6. As in the case of a single matrix configuration, in the dual-matrix configuration, the temporary connections between the axis controllers 8 and the VSDs 10 and motor 6 are established by the control network 4. In order to achieve this, the dual-matrix configuration is established by arranging for a motor matrix 127 to be established in the upper rows and a drive matrix 129 for the VSDs 10 to be established in the lower rows. The patch buses 24 comprise the matrix columns which extend from the motor matrix to the drive matrix.

Inputs to the rows of the drive switch matrix 129 are derived from VSD's 10. In the drive switch matrix 129, populated patch switches 34 are indicated by means of squares in the matrix. In the drive switch matrix 129 there are four switch elements 34 in each row and three patch switch elements 34 in each column. In the motor switch matrix 127, there are two patch switch elements 34 in each row and three in each column. Outputs from the rows in the matrix 127 are coupled to the motor bus 26 for connection to the motors 6. Each of the patch switches 30 in the matrices 127 and 129 can be similar to the power patch switch 34 of the single matrix embodiment.

FIG. 15B shows diagrammatically another part of the dual-matrix embodiment. More particularly, this drawing shows matrices used for switching of signals and the general form is similar to that shown in FIG. 15A. FIG. 15B includes a drive signal switch matrix 140 and a motor switch matrix 142. Inputs to the rows of the matrix 142 are from axis controllers 8. Outputs from the matrix 142 are to the satellite processor modules 42. The patch switches 30 in the matrices 140 and 142 are analogous to those described previously. In the matrices 140 and 142, the patch switches 30 can be implemented in accordance with the patch switch 132 (Q module switch element) diagrammatically illustrated in FIG. 17. FIG. 16 is a block diagram showing schematically a signal patch switch element 131 which can be used for the patch switches 32 in the motor signal matrix 142. The switch 131 operates analogously to the switch 32 shown in FIG. 5 and need not be described in detail.

It will be appreciated by those skilled in the art that the operation of the dual-matrix configuration is analogous to that of the single matrix example referred to above, assuming that appropriate control signals are provided by the axis controllers 8 for selecting both the motors 6 and VSDs 10. In order to effect a power path between a selected motor 6 and VSD 10, one of the patch switches 34 in each of the motor matrix 127 and drive matrix 129 would need to be closed on the same bus 24.

Various algorithms could be adopted for selecting the motors and VSDs to be coupled for a particular control function. In the system of the invention, the selection of the motors to be coupled and the patch switches to be closed in the matrix or matrices is determined by the central controller 2. The central controller 2 preferably also stores the overall state of the matrix, that is to say stores information regarding which patch switches are closed in the matrix. The central controller 2 also operates a routing algorithm in order to select which switches should be closed in order to establish a connection between a VSD and a motor. This information is also stored in the central controller. The central controller also stores information regarding any failed components in the system so that these can be bypassed. Set out below is a simple routing algorithm for a dual-matrix scheme:

Finding a set of paths through the dual-matrix for a group of machines.

Start:

For each motor in the group.
Find the first available bus which could be connected to the motor (populated matrix node).
If there is an available bus for the motor.
Try a limited number of times to find an available drive for bus.
If a drive can be found for the bus.
Mark the motor, bus and drive as allocated, "busy" (not free).
If no bus or drive were allocated.
Pick a random bus which is associated with the current motor.
Pick a random drive which is associated with the selected bus.
Deallocate the bus connected to the selected drive.
Deallocate the drive connected to the selected bus.
Try again to allocate a bus and drive to the current motor.
If there were any motors which were deallocated
Go back to start and repeat for the motors without a connection.
Repeat a finite number of times before deciding there is no path.

The central controller 2 may include stored information relative to the matrix or matrices to which it is coupled. This will enable it to carry out the routing algorithm required in practice. In some circumstances, it may be convenient to install in the central controller 2 a program which can generate the matrix information tables so that on commissioning the equipment the central controller can be loaded with information which is appropriate for the matrix which has been established. Also this would enable the equipment to be altered if the matrix were changed.

A computer program listing in the programming language C is given in Appendix I. This routine implements a patch "routing algorithm" based on the foregoing outline. This program would refer to matrix tables stored in the central controller or generated by software in the central controller.

The dual-matrix scheme not only raises the probability of finding a route between each motor and a drive for large groups of motors, using fewer switches than a single matrix, but also offers a high degree of fault tolerance due to the ability to assign a drive to one of several buses. This means that any group of motors can be assigned a drive, even when some drives or axis controllers may be out of service.

In the illustrated example (FIG. 15), up to seven motors chosen at random can be assigned a VSD 10, with a 100% probability of finding a patch route for each. The probability drops to 99.7% for groups of eight motors and to 85.6% for twelve motors.

It can be shown that the probability of successfully finding a path through the matrix is influenced by several inter-related features of the design of the matrix. The matrix is largely specified by "R" (the number of patch buses 24), "P" (the number of buses available to each motor) and "Q" (the number of buses available to each drive) and finally, the pattern of population of cross points within the matrix.

Since "P" is the number of switches per motor, then it must be an integer value and it should also be equal for each motor in order that the matrix be regular. It can be shown that the probability of success is improved greatly when "P" is 3 when compared with when "P" is 2. Increasing P beyond 3 yields marginal benefit when contrasted with the additional cost and complexity of constructing the matrix. For the example shown in FIG. 15, extending the configuration to twenty-four buses and three switches per motor (P=3), the probability increases to 100% for eleven motors and 99.5% for twelve motors.

Similarly, "Q" must also be integer. Since there are many more motors than drives, then increasing "Q" does not have the same cost impact on the matrix and thus "Q" is typically larger than "P". Because "P" and "Q" share common buses, then "P" and "Q" must be factors of "R", the number of buses. Further, "R" must be larger than the minimum number of motors which must be able to be patched in at any one time. Finally, the cross point population of the matrix is selected so that where possible, no two motors share the same combination of bus connections.

The optimal configuration of the matrix for a given application is designed with these guidelines and optimized with the computer simulation of thousands of routing attempts.

As mentioned previously, the axis controllers 8 can be similar to known axis controllers but having additional signal processing capabilities for handling communications with the matrix 18 whether single or dual. For a dual-matrix system of the type shown in FIGS. 15A and 15B, the additional signals to be handled by the axis controller include:

OBUS_FREE Input signal (when high) indicates to axis controller and Q-module that the patch bus for that particular Q-module Switch is in fact free.

QGRP_FREE Input signal (when high) indicates to an axis controller 8 that no other Q-switch in that particular Q-module has been selected. That is, axis controller 8 can only select one patch bus at a time.

Q_ENGAGE Output signal (when pulsed high) commands a particular selected Q-module switch to activate itself fully and also to activate its associated power contactor. This forms the first part of a path through the power contactor matrix.

O_HOLD Output signal that must be high to allow the 0_ENGAGE signal to activate the selected Q-switch element. This signal remains high whilst the particular Q-switch is activated. If this signal goes low then the particular Q-switch and power contactor will be disengaged.

PBUS_FREE Has same function as Q-matrix QBUS_FREE but is on a P-module. Signal is routed via Q-module and patch bus to P-module.

PGRP_FREE Has same function as Q-matrix OGRP_FREE but is on a P-module. Signal is routed via Q-module and patch bus to P-module.

P_ENGAGE Has same function as Q-matrix Q_ENGAGE but is on a P-module. Signal is routed via Q-module and patch bus to P-module.

P_HOLD Has same function as Q-matrix Q_HOLD but is on a P-module. Signal is routed via Q-module and patch bus to P-module.

MSEL0-3 Binary nibble output signals routed via Q-module/patch bus to nibble comparators on each P-module. If nibble matches a particular P-module DIP switch setting then that P-module is SELECTED (not ENGAGED as yet however).

BUSBUSY Input signal (when high) to axis controller to indicate that a particular signal bus is in fact engaged by another axis controller/Q-module.

SELENAB Output signal that allows an axis controller/Q-module to assert a particular bus-busy signal when that Q-module switch is selected. Indicates to other Q-modules on bus that bus is currently selected.

CHA Input encoder signal that originates from winch motor position encoder (First quadrature encoded channel signal). Routed from satellite processor module 42 via P-module-Bus-Q-module.

CHB Input encoder signal that originates from winch motor position encoder 18 (second quadrature encoded channel signal) and is routed from satellite processor module 42 via P-module-patch bus-Q-module.

ZMARK Input encoder signal that originates from winch motor position encoder 18 (encoder "zero-position" indicator pulse). Router from the satellite processor module via P-module-patch bus-Q-module.

TXD Transmitted serial data to the satellite processor module 42. Allows commands and general control of the satellite processor module.

RXD Received serial data from the satellite processor module 42. Allows status of satellite process or module to be read also used for handshaking and acknowledgement of commands.

FWDOTR Forward overtravel safety signal. It is routed from the satellite processor module 42.

REVOTR Reverse overtravel safety signal. It is routed from the satellite processor module 42.

AUXIN1 First auxiliary safety signal. It is routed from the satellite processor module 42.

It can also be used as backup safety signal.

AUXIN2 Second auxiliary safety signal. It is routed from the satellite processor module 42. It can be used as backup safety signal.

QSEL0-2 3 bit encoded output signal used to select one (or none) of six Q-switches on a Q-module PCB. This is SELECT only, not engage.

Some additional processing is carried out by the microprocessor 69 which is included in the axis controller 8. The axis controller interprets the command types in the command type field 9. Four of these command types are outlined below.

1. Set Motor ID command:

The satellite processor module 42 can be down loaded with the motor (batten) number. This command should specify the low-level patch bus address and P-module address to connect to the required winch. Signal patch must be connected via P and Q modules. Signal is communicated via serial TXD and RXD lines.

2. Configure Axis command:

The satellite processor module 42 will be down loaded with any parameters specific to its winch motor such as the axis absolute position. Signal is sent via patch TXD and RXD lines. Whenever the axis controller 8 establishes a patch route to the satellite processor module 42, it must read the motor number stored in the satellite processor module and verify that the number is the same as that in the command packet.

3. Matrix Poll command:

Requests an axis controller 8 to activate a signal route to a specified satellite processor module 42, without engaging any power patch contactors. The patch bus to be used will be dictated by the central controller 2. The axis controller 8 will check for bus contention and other anomalies. This is done via the BUSBUSY line. If the route can be made then the bus is selected via SELENAB and QSEL0-2 lines. The axis controller will get winch motor position and status from the satellite processor module via TXD/RXD and respond to the central controller 2. The signal route is kept until a subsequent poll command changes it.

4. Matrix Pre-move command:

A pre-move command will instruct the axis controller 8 to engage a patch route to a specified winch, using a specified patch bus. This is done using the QIP_ENGAGE and Q/P_HOLD signals. The patch switch elements should be SELECTED beforehand. The axis controller 8 will check for contention and other anomalies via BUSBUSY and integrity or actual existence of RXD signal. If the route can be made, the axis controller 8 will attempt to engage the two power contactors required and verify the patch (using the interlock monitoring signals Q/P BUS_FREE and GRP_FREE). The axis controller 8 will initialize its winch motor position and status as read from the satellite processor module 42 and respond to the central controller 2.

The axis controller 8 normally includes a service port CLI which may be extended to include patch diagnostics and commands to drive the patch manually for fault detection or local control of the various winch motors 6 without control signals from the central controller 2.

Referring now to FIGS. 18, 18A, 18B, and 18C, each axis controller 8 is connected directly to one VSD 10 and one Q-Module, each of which comprises six of the patch switches 132, only one of which is shown in FIGS. 18, 18A, 18B, and 18C for clarity of illustration. Similarly, a P module is made up from three of the patch switches 131 and again only one is shown in FIGS. 18, 18A, 18B, and 18C. The entire system comprises a plurality of controllers 8, VSDs 10, Q-Modules and P-Modules, all of which are controlled by the central controller 2 via signals sent over the LAN 3. There is no direct connection for control or status signalling to the P-Modules from the axis controllers 8. These signals are themselves routed to the selected P-Module from the axis controller 8 via its attached Q-Module using the patch switches of the patch buses. The control and status signals from the VSDs 10 to the P Modules are switched onto the patch signal buses by the Q Modules. Once a patch switch 132 (Q module) is closed in the drive matrix, one of sixteen modules in the motor matrix can be selected. The actual number depends on the detailed patch design. This is effected by the MOTOR SELECT signal bus 133 (4 lines). The axis controller 8 having addressed the desired motor switch element 131 (P-Module), then engages the motor switch thereby completing the patch route. Separate interlocks from the motor contactor matrix and drive contactor matrix prevent more than one switch from being energized in any row or column in each matrix.

The ability of the axis controllers 8 to poll winch status by connecting to satellite processor modules 42, without the need to disturb the power patch, is retained in the dual-matrix scheme. However, it is preferred to include means to prevent two or more axis controllers 8 sharing a common patch bus from addressing the same bus simultaneously. While this eventuality could not result in a fault in the power patch, because of the safety interlocks, it would create contention between two or more satellite processor modules 42 attempting to transmit on the same serial link in the patch signal bus.

FIGS. 19, 19A, and 19B is an alternative representation of the circuit shown in FIGS. 18, 18A, 18B, and 18C. This representation shows the motor switch matrix 127 and drive switch matrix 129 of FIG. 15A together with the drive switch matrix 140 and motor switch matrix 142 of FIG. 15B.

FIGS. 20, 20A, and 20B shows schematically a modified form of dual matrix embodiment. In this embodiment, the LAN 3 extends directly from the central controller 2 to the satellite processor module 42 to thereby enable the central controller 2 to establish complete system status based upon information transmitted to it by the LAN from the satellite processor modules 42. It will be appreciated that this system status can be gathered entirely independently of the patch switches in the matrix and therefore can be used to provide additional system reliability checks. Also in this embodiment, the patch switches 131 of the P modules are controlled directly by the satellite processor module 42 via P module control bus 135 rather than via signals from the axis controllers 8 via the matrixes 127 and 129. In this scheme there is a one to one correspondence between the patch switches in the P modules and the satellite processor modules 42. The functions of the switches 131 of the P module and the satellite processor module 42 could be combined into a single module. In this embodiment, the topology is more readily understandable and results in fewer conductors in the signal matrix buses.

FIGS. 21, 21A, and 21B shows schematically a further modified form of dual-matrix embodiment. This arrangement is essentially similar to FIGS. 20, 20A, and 20B except that the LAN 3 is extended so as to provide direct control from the central controller 2 to the Q modules.

FIGS. 22, 22A, and 22B shows schematically a further modified form of dual-matrix embodiment. In this embodiment, the central controller 2 directly controls the patch switches 132 of the Q modules via the LAN 3. The satellite processor modules 42 control the patch switches in the matrices 127 and 142 from the satellite processor module 42 via the serial data link 68, as in the case of FIGS. 19, 19A, and 19B.

FIGS. 23 and 24 show examples of the front panel configurations for the drive switch Q module and motor switch P module comprising groups of the patch switches 132 and 131 respectively. As diagrammatically shown in FIG. 23, the front panel of the drive switch Q module may include an engage switch 108 and a release switch 109 for manually engaging or disengaging the patch switches 132 therein. The panel may include indicating LEDs 111 and 112 for indicating the states of the patch switches 132. As described previously, the circuit diagram of FIG. 6 illustrates the manner in which indicating LEDs 111 and 112 are connected in or to be illuminated to indicate the states of the patch switches 132. More particularly, each LED 111 is coupled to contacts 46 of the power patch switch 34 and is thereby illuminated when the selected motor bus 26 is busy. Each LED 112 is effectively connected in parallel with a relay coil 80 and will be illuminated when a switch element within the module has been engaged which corresponds to when the P_ACTIVE signal is present.

FIG. 24 diagrammatically illustrates a front panel of a motor switch P module which includes a number of patch switches 131 therein. The panel may include indicating LEDs for indicating the states of the switches therein. The panel may include a number of engage switches 140 and a release switch 142 for manually engaging or disengaging the patch switches 131 therein.

It will be appreciated by those skilled in the art that the control system of the invention has many advantages which can be summarized as follows:

1. The patch control logic is distributed in the control network 4 rather than being centralized in the central controller 2.
2. Each axis controller 8, in addition to its motion control function, is also responsible for the control and monitoring of a number of patch switches 30. The axis controller is capable of addressing a number of patch switches on its winch control patch bus 24.
3. A single module is dedicated to each motor 6. Each patch switch 30 within the module is controlled and monitored by a different axis controller 8. (In FIG. 3, a patch switch module comprises two switches 30, but the number may vary from system to system).
4. The patch matrix topology can be optimized for each application, i.e. the number of VSDs required and the number of patch switches 30 per motor can be varied to suit each application.
5. The patch switch module incorporates novel safety interlocks to prevent aberrant switch operation and uncontrolled motor axis motion. More particularly, the signals from critical safety switches are available to the central controller 2 via two paths. They are transmitted in serial format by the serial processor 42 and are also hard wired. This provides enhanced safety.
6. The patch switch module, in conjunction with the axis controller interface logic, provides a mechanism whereby the status of any motor (e.g. its absolute position, safety switch and sensor inputs, etc.) can be monitored without the need to activate or change the power patch switch 34 (i.e. connecting the drive power circuits to the motor). Consequently, the status of motors can be determined without disturbing the currently active power patch 34.
7. The patch switch module can incorporate independent manual backup controls and indicators on the front panel. This allows manual setting up of the patch switches in the event of failure or unavailability of axis controller processor(s).
8. The satellite processor module 42 being situated on the axis side of the matrix enables the use of an incremental position encoder 18. The satellite processor module 42 contains circuitry enabling it to remember at all times the position of the axis of the motor 6 to which it is connected. When a route is established through the matrix between an axis controller 8 and a motor, the satellite processor module 42 transmits the motor access position to the controller 8 prior to commencement of any motion. The axis controller 8 then uses this position in its control algorithm. This results in more reliable operation of the system. In place of the incremental encoder 18 an absolute encoder may be used.

9. The satellite processor module 42 enables the accuracy of the signal matrix route to be confirmed. In preferred embodiments of the invention, auxiliary contacts 87 and 89 in each power patch contactor are used to generate PBUS_FREE and PGRP_FREE signals which are used to provide "row" and "column" proving signals. The technique for generating these signals and the manner in which these are used provides additional system reliability.

10. In preferred embodiments of the invention, it is possible to monitor the background status of motors. This can be accomplished by arranging for the satellite processors 42 to be polled via their serial communications links to gather the status of the motors to which they are coupled.

11. The preferred embodiments of the invention enable the power matrix contacts 46 to be switched independently from switches within the electronic patch switch 32. This means that the signal matrix routes can be established without operating or affecting the condition of power relays. If this were not the case, then background status monitoring of the motors would not be practical because it would necessitate switching power relays frequently and this would result in excessive wear, noise and low speed of operation.

12. Preferred embodiments of the invention can be used to generate a global emergency stop condition. The satellite processor modules 42 are able in certain circumstances to detect illegal motions of a motor axis. If the motor axis is currently patched, i.e. connected via the patch switch 30 to an axis controller 8 and drive 10, the satellite processor could signal this condition to the controlling axis controller 8 and the appropriate action could be taken. If, however, illegal motion was detected in a condition in which a motor axis is not properly patched (such as might occur with a malfunction in the power matrix), then the satellite processor module 42 would normally be powerless to intervene. To guard against this possibility, the satellite processor module 42 can be provided with a Global Emergency Stop output which can be connected to a central emergency stop system. Such a signal can be used to arrest motion of all machinery or all machinery within a defined area. This is diagrammatically represented by the energy stop system 144 shown in FIGS. 19 to 22B.

It will also be appreciated by those skilled in the art that the principles of the invention can be applied in situations other than the control of motors associated with stage equipment.

Many modifications will be apparent to those skilled in the art without departing from the spirit and scope of the invention.

APPENDIX I

SIMULATED ROUTING ALGORITHM

```
#include     <stdio.h>
#include     <sys/types.h>
#ifndef unix
#include     <time.h>
#include     <mem.h>
#endif
#include     "defs.h"
#include     "readfile.h"
/*
*     DEFINES
*/
#define     FREE     -1
#define     USAGE    "%s:[-f<filename>][-t N][-d N][-F N][-S][-R][-Dgrfesdt]\n"
/*
*     STRUCTURES
*/
/*
*     FILE GLOBALS
*/
static int16    awGroup[MAX_GROUP];
static int16    awMotorCount[MAX_MOTORS];
static int8         abFailedDrives[MAX_DRIVES];
static struct
{
    int16  wMotor;
    int16  wDrive;
} asRoute[MAX_BUSES];
static int16    wNumberTests    = 1000;
static int16    wMaxRouteDepth  = 500;
static int8         bSortGroup      = FALSE;
static int8         bRevSort        = FALSE;
static int8         bDebugPrintGroup = FALSE;
static int8         bDebugRouting    = FALSE;
static int8         bDebugFinalRoute = FALSE;
static int8         bDebugFailedRoute = FALSE;
static int8         bDebugSort       = FALSE;
static int8         bDebugRunningDisplay = FALSE;
static int16    wMaxRoutedDepth;
static int16    wNumberOfFails  = 0;
/*
```

APPENDIX I-continued

SIMULATED ROUTING ALGORITHM

```
*   EXTERNALS
*/
extern int16 awPSwitchMatrix[MAX_MOTORS][MAX_P];
extern int16 awQSwitchMatrix[MAX_DRIVES][MAX_Q];
extern int16 wMotors;
extern int16 wNDrives;
extern int16 wPSwitches;
extern int16 wQSwitches;
extern int16 wRBuses;
#ifdef unix
extern char    *optarg;
extern int32 optind;
#endif
/*
*   FUNCTION PROTOTYPES
*/
static void TestRoute(int16 wGroupSize);
#ifndef unix
char   getopts(char *, int, char *[ ], char **);
#endif
/*
*   CODE
*/
void
main(int lArgc, char *pachArgv[ ])
{
    int32     lC;
    int16     WGrpSize;
    FILE      *pFP = stdin;
#ifndef unix
    char   *optarg;
#endif
#ifdef unix
    while ((lC = getopt(lArgc, pachArgv, "f:t:d:D:F:RSh?")) != -1)
#else
    while ((lC = getopts("ftdDFRSh?", lArgc, pachArgv, &optarg)) > 0)
#endif
    {
        switch(lC)
        {
        case 'f':
            if ((pFP = fopen(optarg, "r")) == NULL)
            {
                fprintf(stderr, "Open failure on %s\n", optarg);
                exit(1);
            }
            break;
        case 't':
            wNumberTests = (int16)atoi(optarg);
            break;
        case 'd':
            wMaxRouteDepth = (int16)atoi(optarg);
            break;
        case 'F':
            wNumberOfFails = (int16)atoi(optarg);
            break;
        case 'S':
            bSortGroup = TRUE;
            break;
        case 'R':
            bRevSort = TRUE;
            bSortGroup = TRUE;
            break;
        case 'D':
            switch (*optarg)
            {
            case 'g':
                bDebugPrintGroup = TRUE;
                break;
            case 'r':
                bDebugRouting = TRUE;
                break;
            case 'f':
                bDebugFinalRoute = TRUE;
                break;
            case 'e':
                bDebugFailedRoute = TRUE;
```

APPENDIX I-continued

SIMULATED ROUTING ALGORITHM

```
                    break;
                case 's':
                    bDebugSort = TRUE;
                    break;
                case 'd':
                    bDebugRunningDisplay = TRUE;
                    break;
            }
            break;
        case '?':
        case 'h':
            fprintf(stderr, USAGE, pachArgv[0]);
            exit(1);
            break;
        }
    }
    ReadMatrices(pFP);
    if (pFP != stdin)
    {
        fclose(pFP);
    }
    for (wGrpSize = wNDrives - wNumberOfFails; wGrpSize>0; wGrpSize--)
    {
        TestRoute(wGrpSize);
    }
    exit(0);
}
/*
*   Create the group
*/
static void
CreateGroup(int16 wGroupSize)
{
    int16   wGrpMember, wTemp;
    wGrpMember = 0;
    for (wGrpMember = 0; wGrpMember < wGroupSize;)
    {
        awGroup[wGrpMember] = rand( ) % wMotors;
        for (wTemp = 0; wTemp < wGrpMember; wTemp++)
        {
            if (awGroup[wTemp] == awGroup[wGrpMember])
            {
                break;
            }
        }
        if (wTemp == wGrpMember)
        {
            wGrpMember++;
        }
    }
    if (bDebugPrintGroup)
    {
        printf("\nGroup ");
        for (wGrpMember = 0; wGrpMember < wGroupSize; wGrpMember++)
        {
            printf("%4d", awGroup[wGrpMember] + 1);
        }
        printf("\n");
        fflush(stdout);
    }
}
/*
*   Rip-up a Route to make the routing of the motor possible
*/
static int16
RipUpRoute(int16 wMotor)
{
    int16   wBus, wRippedUpMotor;
    int16   wDrive, wQSwitch;
    for(;;)
    {
        wBus = awPSwitchMatrix[wMotor][rand( ) % wPSwitches];
        if (asRoute[wBus].wMotor != FREE)
        {
            if (bDebugRouting)
            {
                printf("Rip up %3d for %3d Bus %2d Drive %2d\n",
```

APPENDIX I-continued

SIMULATED ROUTING ALGORITHM

```
                        asRoute[wBus].wMotor + 1, wMotor + 1,
                                asRoute[wBus].wMotor + 1, asRoute[wBus].wDrive + 1);
                }
                wRippedUpMotor = asRoute[wBus].wMotor;
                asRoute[wBus].wMotor = FREE;
                asRoute[wBus].wDrive = FREE;
                break;
        }
        else
        {
            int16   wTempBus;
            do
            {
                wDrive = rand( ) % wNDrives;
                wQSwitch = rand( ) % wQSwitches;
            }
            while (awQSwitchMatrix[wDrive][wQSwitch] != wBus);
            do
            {
                wQSwitch = rand( ) % wQSwitches;
                wTempBus = awQSwitchMatrix[wDrive][wQSwitch];
            } while (wTempBus == wBus);
            if (asRoute[wTempBus].wDrive != FREE)
            {
                if (bDebugRouting)
                {
                    printf("Rip up %3d for %3d Bus %2d Drive %2d\n",
                        asRoute[wTempBus].wMotor + 1, wMotor + 1,
                        asRoute[wTempBus].wMotor + 1, asRoute[wTempBus].wDrive + 1);
                }
                wRippedUpMotor = asRoute[wTempBus].wMotor;
                asRoute[wTempBus].wMotor = FREE;
                asRoute[wTempBus].wDrive = FREE;
                break;
            }
        }
    }
    return(wRippedupMotor);
}
static int8
RouteMotor(int16 wMotor)
{
    static  int16   wRouteDepth = 0;
    int16           wPSwitch, wQSwitch, wDrive, wBus;
    int16           wRippedUpMotor, wTemp;
    if (bDebugRouting)
    {
        printf("Route depth %d\n", wRouteDepth);
    }
    if (++wRouteDepth > wMaxRoutedDepth)
    {
        wMaxRoutedDepth = wRouteDepth;
    }
    for (wPSwitch = 0; wPSwitch < wPSwitches; wPSwitch++)
    {
        wBus = awPSwitchMatrix[wMotor][wPSwitch];
        if (asRoute[wBus].wMotor == FREE)
        {
            for (wDrive = 0; wDrive < wNDrives; wDrive++)
            {
                if (abFailedDrives[wDrive] == TRUE)
                {
                    continue;
                }
                for (wQswitch = 0; wQSwitch < wQSwitches; wQswitch++)
                {
                    if (awQSwitchMatrix[wDrive][wQSwitch] == wBus)
                    {
                        for (wTemp = 0; wTemp < wRBuses; wTemp++)
                        {
                            if (asRoute[wTemp].wDrive == wDrive)
                            {
                                break;
                            }
                        }
                        if (wTemp == wRBuses)
                        {
```

APPENDIX I-continued

SIMULATED ROUTING ALGORITHM

```
                    if (bDebugRouting)
                    {
                        printf("Route %3d thru %2d to %2d\n",
                            wMotor + 1, wBus + 1, wDrive + 1);
                    }
                    asRoute[wBus].wMotor = wMotor;
                    asRoute[wBus].wDrive = wDrive;
                    wRouteDepth--;
                    return(TRUE);
                }
            }
          }
        }
      }
    }
/*
 *  No free routes so need to make one
 */
    if (wRouteDepth < wMaxRouteDepth)
    {
        wRippedUpMotor = RipUpRoute(wMotor);
        if (RouteMotor(wMotor))
        {
                if (RouteMotor(wRippedUpMotor))
                {
                    wRouteDepth--;
                    return(TRUE);
                }
        }
    }
    wRouteDepth--;
    return(FALSE);
}
/*
 *  Route the group
 */
static int8
RouteGroup(int16 wGroupSize)
{
    int16   wMemb, wBus;
    int16   wCount;
/*
 *  Clear all route information
 */
    for (wBus = 0; wBus < wRBuses; wBus++)
    {
        asRoute[wBus].wMotor = FREE;
        asRoute[wBus].wDrive = FREE;
    }
/*
 *  Fail the required number of drives
 */
    for (wCount = 0; wCount < wNDrives; wCount++)
    {
        abFailedDrives[wCount] = FALSE;
    }
    for (wCount = 0; wCount < wNumberOfFails;)
    {
        int16   wDrive = rand( ) % wNDrives;
        if (abFailedDrives[wDrive] != TRUE)
        {
            abFailedDrives[wDrive] = TRUE;
            wCount++;
        }
    }
/*
 *  Route the group
 */
    for (wMemb = 0; wMemb < wGroupSize; wMemb++)
    {
        if (!RouteMotor(awGroup[wMemb]))
        {
            return(FALSE);
        }
    }
    return(TRUE);
```

What is claimed is:

1. A control system for controlling a plurality of electrical devices said system including a central controller for controlling functions of said devices, a network coupled between the central controller and said devices, said network including a plurality of device drivers for providing drive signals to said electrical devices, the number of drivers being less than the number of devices characterized in that the network includes intelligent devices which enable communication through the network from the central controller to the devices, said network including a single matrix defined by control patch buses, device buses and said logic elements which are distributed in said matrix and are operable to couple selected buses together to thereby determine, subject to control from said intelligent devices, which devices are coupled to respective device drivers and said network includes patch switches which are selectively provided at nodes in the matrix.

2. A control system as claimed in claim 1 wherein remote processing means is associated with each motor.

3. A control system as claimed in claim 2 wherein the satellite processor stores and provides signals indicative of the state of the motor to which it is coupled.

4. A control system for controlling a plurality of electrical devices said system including a central controller for controlling functions of said devices, a network coupled between the central controller and said devices, said network including a plurality of device drivers for providing drive signals to said electrical devices, the number of drivers being less than the number of devices characterized in that the network includes intelligent devices which enable communication through the network from the central controller to the devices, said network including a dual-matrix defined by control patch buses, device buses and said logic elements which are distributed in said matrix and are operable to couple selected buses together to thereby determine, subject to control from said intelligent devices, which devices are coupled to respective device drivers and said network includes patch switches which are selectively provided at nodes in the matrix.

5. A control system as claimed in claim 1 or 4 wherein each patch switch comprises electronic switch means and power switch means.

6. A control system as claimed in claim 5 wherein the electronic switch means and the power switch means can be independently operated whereby the central controller can monitor said devices without changing the states of said power switch means.

7. A control system as claimed in claim 6 wherein the power switch means includes power contacts for controlling power to said devices and control contacts for generating control signals (PGRP_FREE, QGRP_FREE, PBUS_FREE, QBUS_FREE) indicative of whether a patch switch has been engaged or is in a control patch bus which has been engaged.

8. A control system as claimed in claim 1 or 4 wherein a LAN is coupled to remote processing means associated with each motor.

9. A control system as claimed in claim 8 wherein a control bus is coupled between at least some of said patch switches and said remote processing means.

10. A control system as claimed in claim 1 or 4 wherein a LAN is coupled to at least some of said patch switches.

11. A control system as claimed in claim 1 or 4 wherein each of the devices includes a satellite processor which stores and provides signals indicative of the state of the device to which it is coupled.

12. A stage equipment control system for controlling a plurality of electrical motors, said system including:

a central controller which generates control signals;

a plurality of axis controllers which receive said control signals;

a plurality of electric motors;

a plurality of motor drivers, each coupled to one of said axis controllers, for providing drive signals for said electric motors, there being a lesser number of said motor drivers than the number of said electric motors;

a matrix defined by a plurality of control buses and device buses, configured as a two-dimensional array having a predetermined number of nodes therein, with said motors being coupled at the ends of respective device buses and said motor drivers being coupled at the ends of respective control buses; and patch switches located at predetermined nodes in the matrix, whereby said drive signals can be selectively coupled through the matrix to said motors, by the closure of selected patch switches.

13. A stage equipment control system for controlling a plurality of electrical motors, said system including:

a central controller which generates control signals;

a plurality of axis controllers which receive said control signals;

a plurality of electric motors;

a plurality of motor drivers, each coupled to one of said axis controllers, for providing drive signals for said electric motors, there being a lesser number of said motor drivers than the number of said electric motors;

a dual matrix comprising a motor matrix and a drive switch matrix, the motor matrix being defined by a plurality of patch buses and device buses, configured as a two-dimensional array having a number of motor matrix nodes therein, and the drive switch matrix being defined by said plurality of patch buses and driver buses, configured as a two-dimensional array having a number of drive switch matrix nodes therein, with said motors being coupled at the ends of respective device buses and said motor drivers being coupled at the ends of respective drive buses; and patch switches located at predetermined motor matrix and drive switch matrix nodes in the matrix, whereby said drive signals can be selectively coupled through the dual matrix to said motors, by the closure of selected patch switches.

14. A control system as claimed in claim 13 wherein the central controller is operable to close a first patch switch in the drive matrix in one of said patch buses and a second patch switch in the motor matrix in said one patch bus in order to couple said drive signals to a motor.

15. A control system as claimed in any one of claims 12, 13 or 14 wherein the central controller is coupled to said axis controllers by means of a local area network and the central controller is arranged to generate signal packets.

16. A control system as claimed in claim 15 wherein sensors are coupled to the motor and outputs from the sensors are inputted to the remote processing means of the associated motor.

17. A control system as claimed in claim 16 wherein said processing means includes memory for storing data from the sensors independently of said central controller.

18. A control system as claimed in claim 6 wherein the local area network is coupled to said remote processing means.

19. A control system as claimed in claim 18 wherein the local area network is coupled to at least some of said patch switches.

20. A control system as claimed in claim 18 wherein a control bus is coupled between at least some of said patch switches and said remote processing means.

21. A control system as claimed in claim 15 wherein each command packet includes an address field for the axis controller, a command field and a data field.

22. A control system as claimed in claim 21 wherein each axis controller has processing means therein and wherein the processing means is operable to receive said command packets, check for address matches, to interpret a command type from said command fields and to interpret an instruction from said data field.

23. A control system as claimed in claim 22 wherein the central controller inputs data instructions in said data field for the selection of a particular motor to be coupled to one of said device drivers.

24. A control system as claimed in claim 22 wherein the data instructions in said data field further include instructions for closure of selected patch switches to establish a route from said one device driver to said particular motor.

25. A control system as claimed in claim 24 wherein the processing means in each axis controller, in response to said instructions for closure of selected patch switches, generates patch control signals which are transmitted to the selected patch switches.

26. A control system as claimed in claim 25 wherein the axis controllers check the status of the selected patch switches.

27. A control system as claimed in claim 26 wherein after said selected patch switches have been closed, a communications link is established therethrough between the selected remote processing means and the selected axis controller coupled to said selected patch switches by one of said control patch buses and wherein the selected axis controller generates a status signal packet for communication to the central controller containing information relating to the selected motor.

28. A control system as claimed in claim 12, 13 or 14 wherein each patch switch comprises electronic switch means and power switch means.

29. A control system as claimed in claim 28 wherein the electronic switch means and the power switch means can be independently operated whereby the central controller can monitor said motors without changing the states of said power switch means.

30. A control system as claimed in claim 29 wherein the power switch means includes power contacts for controlling power to said motors and control contacts for generating control signals (PGRP_FREE, QGRP_FREE, PBUS_FREE, QBUS_FREE) indicative of whether a patch switch has been engaged or is in a control patch bus which has been engaged.

31. A control system as claimed in claim 28 wherein the power switch means includes power contacts for controlling power to said motors and control contacts for generating control signals (PGRP_FREE, QGRP_FREE, PBUS_FREE, QBUS_FREE) indicative of whether a patch switch has been engaged or is in a control patch bus which has been engaged.

* * * * *